US009278406B2

United States Patent
Kaga et al.

(10) Patent No.: US 9,278,406 B2
(45) Date of Patent: Mar. 8, 2016

(54) MASH SEAM WELDING METHOD AND APPARATUS

(75) Inventors: Shinichi Kaga, Hitachi (JP); Mitsuru Onose, Tokyo (JP); Noriaki Tominaga, Hiroshima (JP); Takehiko Saito, Hiroshima (JP); Yasutsugu Yoshimura, Kawasaki (JP); Hirotomo Tagata, Hiroshima (JP); Keiichi Sato, Hiroshima (JP)

(73) Assignee: PRIMETALS TECHNOLOGIES JAPAN, INC., Tokyo (JP)

( * ) Notice: Subject to any disclaimer, the term of this patent is extended or adjusted under 35 U.S.C. 154(b) by 249 days.

(21) Appl. No.: 13/641,781

(22) PCT Filed: Sep. 24, 2010

(86) PCT No.: PCT/JP2010/066571

§ 371 (c)(1),
(2), (4) Date: Oct. 17, 2012

(87) PCT Pub. No.: WO2012/039060

PCT Pub. Date: Mar. 29, 2012

(65) Prior Publication Data

US 2013/0168365 A1 Jul. 4, 2013

(51) Int. Cl.
*B23K 9/00* (2006.01)
*B23K 11/36* (2006.01)
(Continued)

(52) U.S. Cl.
CPC .............. *B23K 11/36* (2013.01); *B23K 11/061* (2013.01); *B23K 11/255* (2013.01); *B23K 2201/18* (2013.01)

(58) Field of Classification Search
CPC .... B23K 11/061; B23K 11/255; B23K 11/36; B23K 2201/18

USPC ............... 219/62, 78.16, 81, 82, 83, 84, 105, 219/117.1; 228/160, 170, 171, 172, 173.2, 228/173.6
See application file for complete search history.

(56) References Cited

U.S. PATENT DOCUMENTS 3,313,911 A * 4/1967 Seelofff ...................... 219/105
3,383,490 A * 5/1968 Jewett ....................... 219/86.33
(Continued)

FOREIGN PATENT DOCUMENTS

JP 02-052179 A 2/1990
JP 05-92273 A 4/1993
(Continued)

OTHER PUBLICATIONS

International Preliminary Report on Patentability received in International Application No. PCT/JP2010/066571 dated Apr. 25, 2013.

*Primary Examiner* — Dana Ross
*Assistant Examiner* — Joseph Iskra
(74) *Attorney, Agent, or Firm* — Mattingly & Malur, PC

(57) ABSTRACT

Mash seam welding is performed to weld metal plates with thicknesses of 2 mm or more to stabilize the strength of a joint portion, reduce uneven parts of the joint portion, and ensure high strength and reliability of the joint portion. First, two metal plates, clamped with first and second clamping devices, are placed to overlap each other at their end portions. The overlapping portions (L) of the metal plates are pressed together with a pair of upper and lower electrode wheels while welding currents flow to continuously weld the overlapping portions (L) and join the metal plates. The pressing forces applied to the electrode wheels are controlled so that upper and lower welding forces acting upon the overlapping portions are equal to each other during the time when the overlapping portions are continuously welded.

16 Claims, 40 Drawing Sheets

(51) Int. Cl.
 *B23K 11/06* (2006.01)
 *B23K 11/25* (2006.01)

(56) References Cited

U.S. PATENT DOCUMENTS

| | | | | |
|---|---|---|---|---|
| 3,832,516 A | * | 8/1974 | Baker | 219/81 |
| 4,476,371 A | * | 10/1984 | Schreiber | 219/83 |
| 5,290,990 A | * | 3/1994 | Bischofberger et al. | 219/82 |
| 5,343,010 A | * | 8/1994 | Urech | 219/83 |
| 5,676,858 A | * | 10/1997 | Gantenbein | 219/64 |
| 2002/0011466 A1 | * | 1/2002 | Muller et al. | 219/64 |
| 2009/0302008 A1 | * | 12/2009 | Maruyama | 219/91.1 |

FOREIGN PATENT DOCUMENTS

| | | | |
|---|---|---|---|
| JP | 2006-110577 A | | 4/2006 |
| JP | 2006110577 | * | 4/2006 |
| JP | 2009-082946 A | | 4/2009 |
| JP | 4500883 B2 | | 4/2010 |
| WO | 2006/118197 A1 | | 11/2006 |
| WO | 2010/004656 A1 | | 1/2010 |
| WO | 2010/004657 A1 | | 1/2010 |

* cited by examiner

MASH SEAM WELDING METHOD AND APPARATUS

TECHNICAL FIELD

The present invention relates to a mash seam welding method and apparatus for joining two metal plates with large thickness.

BACKGROUND ART

Mash seam welding is known as a welding method which places two metal plates to overlap each other at their end portions and presses the overlapping portions with a pair of electrode wheels while flowing welding currents to continuously weld the overlapping portions, and simultaneously to cause a joint portion heated at a high temperature and softened to be rolled with the electrode wheels, thereby reducing the thickness of the joint portion.

Conventional techniques of a mash seam welding apparatus for joining metal plates with large thickness are described in Patent Documents 1 and 2, for example.

As a problem with joining of thick metal plates, Patent Document 1 raises a problem that the metal plates (materials to be welded) need to be significantly bent as illustrated in FIG. 13 of Patent Document 1 and a large force is applied to clamp devices, so that the clamp devices are deformed or broken. As means for solving the problem, Patent Document 1 describes that first and second clamp position adjustment means are provided to adjust distances between a joint portion of the metal plates and clamp positions of the first and second clamp devices. When the thicknesses of the metal plates are large, the distances between the joint portion and the clamp devices are set to be large so as to reduce curvatures of the metal plates and reduce force acting on the clamp devices, thereby preventing the clamp devices from being broken.

As a problem with joining of high-strength steel strips, Patent Document 2 raises the problems with reference to FIG. 8 thereof that since pressing forces applied to the electrode wheels need to be high and a corner of the upper metal plate (indicated by reference numeral 20 in FIG. 8 of Patent Document 2) and the electrode wheel contact with each other, the electrode wheel is significantly damaged, and that since a welding current is concentrated in a corner of the lower metal plate (indicated by reference numeral 21 in FIG. 8 of Patent Document 2), welding surface flash (phenomenon in which the corner is melt and dispersed due to the excessive current concentration therein and the spatters remain on the metal plate) is generated, and a desired welding result cannot be obtained. When thick metal plates are to be joined, since the volume of a joint portion becomes large, a current needs to be high and since the rigidity of the metal plates is high, welding force to be applied by the electrode wheels need to be increased, and therefore, the same problem arises from the same principle as the joining of the high-strength steel strips. To address such problems, Patent Document 2 describes that first pressing rolls are provided to press the overlapping portions of the metal plates, and after the overlapping portions of the metal plates are pressed by the first pressing rolls, the electrode wheels are brought into contact with the pressed overlapping portions and applied with electric currents to weld the overlapping portions, thereby suppressing occurrence of scratches on the electrode wheel surfaces and generation of welding surface flash.

PRIOR ART LITERATURE

Patent Document

Patent Document 1: JP-H2-52179-A
Patent Document 2: JP-2006-110577-A

SUMMARY OF THE INVENTION

Problem to be Solved by the Invention

It has been said that, in conventional mash seam welding, the maximum thicknesses of plates to be joined are approximately 3.2 mm due to the problems with generation of welding surface flash and occurrence of scratches on the electrode wheel surfaces, as described as the problems in Patent Document 2.

According to Patent Documents 1 and 2, metal plates with thicknesses of 3.2 mm or more can be joined by suppressing generation of welding surface flash and occurrence of scratches on the electrode wheel surfaces.

More specifically, in the technique described in Patent Document 1, when the thicknesses of the metal plates are large, by setting the distances between the joint portion and the clamp devices to large values, the curvatures of the metal plates are reduced so as to reduce force to be applied to the clamp devices and prevent the clamp devices from being broken. The reductions in the curvatures of the metal plates is considered to resultantly increase a contact area of the overlapping portion of the upper metal plate, so that a current concentration is reduced and generation of welding surface flash is suppressed.

In the technique described in Patent Document 2, after the overlapping portions of the metal plates are pressed with the pressing rolls, the electrode wheels contact the pressed overlapping portions so as to flow the currents and weld the metal plates, and this suppresses occurrence of scratches on the electrode wheel surfaces and generation of welding surface flash.

It is, however, turned out that even when those techniques are applied, the maximum thickness of plates joined by a mash seam welding apparatus is approximately 4.5 mm. The reason is described below.

First, a positional relationship between the clamp devices and the electrode wheels in the conventional mash seam welding is described. As shown in FIG. 13 of Patent Document 1 and FIGS. 3 and 8 of Patent Document 2, conventionally, the upper end position of an outer circumferential portion of the lower electrode wheel is set to match lower surfaces of the material clamping portions of the clamping devices (referred to as pass line hereinafter). During welding, the set position (height) of the lower electrode wheel is fixed, and the upper electrode wheel is forced down with a pressing device such as a hydraulic cylinder or a pneumatic cylinder, so that the overlapping portion is pressed by the upper electrode wheel. The lower electrode wheel is periodically ground due to wear of the outer circumferential surface. As a result, the diameter of the lower electrode wheel is reduced. The height of the lower electrode wheel is corrected by an amount corresponding to the grinding amount with a worm jack or the like so that the upper end position of the outer circumferential portion of the lower electrode wheel is maintained to matches the pass line.

When maintenance of the positions of the clamp devices and the electrode wheels is carried out, the upper end of the outer circumferential portion of the lower electrode wheel may be adjusted to match the pass line of the clamp device, and there is a reason for use of the positional relationship from a view point of maintenance.

When the metal plates have relatively small thicknesses of 2 mm or less, even if the position of the upper end of the outer circumferential portion of the lower electrode wheel is set on the pass line as described above, the metal plates of the overlapping portions are warped and deformed to be parallel to each other upon pressing by the pressing device for the upper electrode wheel, and therefore, there is no problem in many cases.

When metal plates with large thicknesses of 4.5 mm or larger are to be welded, however, since the rigidity of the metal plates is high, the upper and lower metal plates cannot be warped and deformed to be parallel to each other by the welding force applied by the upper electrode wheel. As a result, when the metal plates are welded in that state while welding currents flow, desired joint strength cannot be obtained and the steps of the joined portion are enlarged.

More specifically, when the upper and lower metal plates are not warped and deformed to be parallel to each other in the overlapping portions, a current is concentrated at a corner of the lower metal plate (see reference numeral 16 in FIG. 3 of Patent Document 2 and reference numeral 21 in FIG. 8 of Patent Document 2) in the initial step of the welding process from the starting of passing of the electrode wheels to the finishing thereof in the overlapping portions. In addition, in the overlapping portions of the metal plates that are not warped and deformed to be parallel to each other, a large gap is formed between a corner (end surface) of the upper metal plate and the lower metal plate. Thus, the melting and deformation in the overlapping portions is initiated from the portion of the lower metal plate corner, but not from the center of the overlapping portions. After this portion is jointed, the corner of the upper metal plate is brought into contact with the lower metal plate, but, as described above, since the corner of the upper metal plate has the gap between itself and the lower metal plate at the starting time of the joining, a generation of heat due to a contact resistance between the metal plate materials is delayed. The corner of the upper metal plate contacts the lower metal plate after melting and deformation of portions at the corner of the lower metal plate are progressed. Thus, the joining region near the corner of the upper metal plate is experienced with less amount of heat input and short time of welding at high temperature by the electrode wheel, compared with the joining region near the corner of the lower metal plate.

In the mash seam welding, a molten and solidified portion (nugget) is generated in the central portion of the joint portion, and solid-state joint portions are formed at positions in point-symmetry with respect to the nugget, or at the boundaries in the joint portion connecting the corner of the lower metal plate and the nugget and the corner of the upper metal plate and the nugget. In the welding of the thick metal plates, the welding on the side of the corner of the lower metal plate precedes as described above, so that the length of the solid-state joint portion on the side of the corner of the lower metal plate is short and the time period in which the joint portion is pressed by the electrode wheel is long, and thus the strength of the solid-state joint portion becomes high. Further, the deformation at a high temperature is progressed in the portion near the corner of the lower metal plate, and the step of the joint portion near the corner of the lower metal plate is smaller than the step of the joint portion near the corner of the upper metal plate. Conversely, the length of the solid-state joint portion on the side of the corner of the upper metal plate is large and the amount of heat input thereto is small, so that the strength of the solid-state joint portion is low, and since high temperature deformation is not progressed, the step of the joint portion becomes large.

Accordingly, the joint portion is formed in a vertically asymmetrical shape, and a large step with a high stress concentration factor is formed near the corner of the upper metal plate, and the solid-state joint portion contiguous with that step has low joint strength and becomes the weakest portion of the welded joint.

In the mash seam welding, since the thickness of the joint portion generally increases to approximately 110% to 160% of the thicknesses of the base materials, there is a tendency that the larger the thicknesses of the metal plates becomes, the larger an absolute value of an increase amount of the thickness becomes. Therefore, the thicker the metal plates becomes, the more noticeable vertical asymmetry of the joint portion becomes and the joint strength is significantly reduced.

When the position of the upper end of the outer circumferential portion of the lower electrode wheel is set on the pass line, and the position of the overlapping portions are fixed during the welding, the joint portion is formed in an asymmetrical shape and the welding strength of the joint portion is reduced. It is thus considered that the thickness of the joint portion is predicted in advance and the position of the upper end of the outer circumferential portion of the lower electrode wheel is set to match a lower surface of the joint portion.

The thickness of the joint portion, however, is determined on the basis of many parameters such as conditions for heat input to the joint portion, the welding force, the distance between the clamp devices, and the thickness of the joint portion after joining varies depending on the joining conditions, and it is, therefore, difficult to accurately predict the thickness of the joint portion in advance. In addition, the positions of the upper and lower electrode wheels in the pressing force direction only exist as pinpoint in which the upper end portion of the outer circumferential portion of the lower electrode wheel contacts the lower surface of the joint portion and the upper and lower electrode wheels are located symmetrically about the center of the joint portion of the metal plates held by the clamp devices. Thus, it is difficult to accurately set the positions of the upper and lower electrode wheels in the pressing force direction so that the upper and lower electrode wheels are located symmetrically about the center of the joint portion during the joining, and to form the joint portion in vertical symmetry.

For the aforementioned reasons, the thicknesses of the metal plates to be welded are limited to 3.2 mm or less or up to 4.5 mm at the maximum in the conventional mash seam welding.

An object of the present invention is to provide a mash seam welding method and apparatus which, in mash seam welding of metal plates with thicknesses of 2 mm or more, stabilize the joint strength, reduce the steps of the joint portion, ensure high joint strength and reliability, and thus enable metal plates with thicknesses of more than 4.5 mm to be joined.

Means for Solving the Problem

According to a first aspect of the present invention that solves the aforementioned problems, there is provided a mash seam welding method comprising the processes of: clamping two metal plates with first and second clamping devices, respectively, placing the two metal plates to overlap each other at their end portions, and pressing overlapping portions of the two metal plates with a pair of upper and lower electrode wheels while flowing welding currents to continuously weld the overlapping portions and join the two metal plates, wherein the mash seam welding method further comprises the process of controlling pressing forces applied to the upper and lower electrode wheels so that upper and lower welding forces acting upon the overlapping portions are equal to each other during the time when the overlapping portions are continuously welded while the welding currents flow.

According to a second aspect of the present invention that solves the aforementioned problems, there is provided the mash seam welding method in the first aspect of the invention, wherein the thicknesses of the two metal plates are 2 mm or more.

According to a third aspect of the present invention that solves the aforementioned problems, there is provided the mash seam welding method in the first or second aspect of the invention, wherein the electrode wheel that is one of the pair of upper and lower electrode wheels is controlled such that the one electrode wheel is fed by position control and brought into contact with joining end surfaces of the overlapping portions and welding is started, and after the joining end surfaces are welded, control is switched to pressing force control, wherein the other electrode wheel is controlled such that the other electrode wheel is fed by position control and brought into contact with the joining end surfaces of the overlapping portions, and when or immediately after the other electrode wheel contacts the joining end surface, control is switched to pressing force control and welding is started, and wherein after the joining end surfaces are welded, the one electrode wheel and the other electrode wheel are fed while being synchronized with each other, and during the feeding, the pressing force controls are performed so that the upper and lower welding forces acting upon the overlapping portions are equal to each other.

According to a fourth aspect of the present invention that solves the aforementioned problems, there is provided the mash seam welding method in the first or second aspect of the invention, wherein the electrode wheel that is one of the pair of upper and lower electrode wheels is controlled such that the one electrode wheel is fed and brought into contact with joining end surfaces of the overlapping portions while the position of the electrode wheel is maintained by the pressing force control and by urging a support portion of the electrode wheel against a machine fixed end, and after the electrode wheel contacts the joining end surfaces, welding is started while the position of the electrode wheel is controlled by the pressing force control, and after the joining end surfaces are welded, control is switched to pressing force control in which a constant welding force is applied to the overlapping portions, wherein the other electrode wheel is controlled such that the other electrode wheel is fed by position control and brought into contact with the joining end surfaces of the overlapping portions, and when or immediately after the electrode wheel contacts the joining end surfaces, control is switched to the pressing force control and welding is started, and wherein after the joining end surfaces are welded, the one electrode wheel and the other electrode wheel are fed while being synchronized with each other, and during the feeding, the pressing force controls are performed so that the upper and lower welding forces acting upon the overlapping portions are equal to each other.

According to a fifth aspect of the present invention that solves the aforementioned problems, there is provided the mash seam welding method in any one of the first to fourth aspect of the invention, wherein distances between the overlapping portions and the first and second clamping devices are equal to each other and adjusted depending on the thicknesses of the metal plates.

According to a sixth aspect of the present invention that solves the aforementioned problems, there is provided the mash seam welding method in any one of the first to fifth aspect of the invention, wherein the pair of upper and lower electrode wheels are driven positively and torque control is performed to change drive torques of the electrode wheels depending on the thicknesses of the metal plates.

According to a seventh aspect of the present invention that solves the aforementioned problems, there is provided the mash seam welding method in any one of the first to sixth aspect of the invention, further comprising the process of rolling a joint portion of the metal plates with a pair of upper and lower pressure rollers after the two metal plates are joined, wherein in the process of the rolling, axes of the pair of upper and lower pressure rollers are tilted in a horizontal plane with respect to a straight line perpendicular to a joining line of the joint portion, and steps of the joint portion are rolled in a direction of movement of the pair of pressure rollers while the pressure rollers are driven positively.

According to an eighth aspect of the present invention that solves the aforementioned problems, there is provided a mash seam welding apparatus that clamps two metal plates with first and second clamping devices, respectively, places the two metal plates to overlap each other at their end portions, and presses overlapping portions of the two metal plates with a pair of upper and lower electrode wheels while flowing welding currents to continuously weld the overlapping portions and join the two metal plates, wherein the mash seam welding apparatus comprises: upper and lower pressing devices that apply pressing forces to the upper and lower electrode wheels; and a control device that controls the pressing force applied to the upper and lower electrode wheels by the upper and lower pressing devices so that upper and lower welding forces acting upon the overlapping portions are equal to each other.

According to a ninth aspect of the present invention that solves the aforementioned problems, there is provided the mash seam welding apparatus in the eighth aspect of the invention, wherein the upper and lower pressing devices are hydraulic or pneumatic cylinder devices.

According to a tenth aspect of the present invention that solves the aforementioned problems, there is provided the mash seam welding apparatus in the eighth or ninth aspect of the invention, further comprising distance adjusting devices that adjust respective distances between the overlapping portions and the first and second clamping devices, wherein the distances between the overlapping portions and the first and second clamping devices are equal to each other and adjusted depending on the thicknesses of the metal plates.

According to an eleventh aspect of the present invention that solves the aforementioned problems, there is provided the mash seam welding apparatus in any one of the eighth to tenth aspect of the invention, further comprising pressure roller pressing devices that rolls a joint portion of the metal plates with a pair of upper and lower pressure rollers after the two metal plates are joined, wherein axes of the pair of pressure rollers are tilted in a horizontal plane with respect to a straight line perpendicular to a joining line of the joint portion.

Effects of the Invention

According to the first and eighth aspects of the present invention, the following effects can be obtained.

When the two metal plates have thicknesses of 2 mm or more, the upper and lower metal plates, which contact each other at the overlapping portions while becoming deformed, deform so that the metal plates are formed in a vertically symmetrical shape due to the rigidity of the metal plates. When control according to the present invention is performed on the overlapping portions of the upper and lower metal plates, the welding force that acts on the upper overlapping portion becomes equal to the welding force that acts on the lower overlapping portion. Accordingly, after the pressing force is applied to the overlapping portions of the metal plates by the electrode wheels, the metal plates maintain a vertically symmetrical warped shape. As a result, a gap between a corner of the upper metal plate and the lower metal plate is reduced, contact areas of the upper and lower metal plates are increased, and a current concentration is reduced. Therefore, it is possible to suppress a generation of welding surface flash and increase a welding current and the amounts of heat to be input. In addition, since the overlapping portions of the metal plates are formed in a vertically symmetrical warped shape, portions that are located near the center of the overlapping portions start to be melted. The melting is progressed so that the melted portions are point-symmetrically located. Thus, nuggets are formed near the center of the overlapping portions. Solid-state joint portions are formed in a vertical symmetrical shape. The lengths of the upper and lower solid-state joint portions are equal to each other.

Since the joint conditions for the upper and lower portions are equalized, it is possible to increase the welding current and amounts of heat to be input and form the solid-state joint portions in a vertically symmetrical shape. Thus, the strength of the solid-state joint portions can be stabilized. In addition, since the joint conditions for the upper and lower portions are equalized, it is possible to cause steps of the joint portion to be symmetrically formed, reduce the steps of the joint portion and increase stress concentration factors of the steps of the joint portion.

It is, therefore, possible to stabilize the strength of the joint portion, reduce the steps of the joint portion, and ensure high strength and reliability of the joint portion. As a result, metal plates with thicknesses of 4.5 mm or more can be joined.

According to the second aspect of the present invention, the following effects can be obtained.

In the mash seam welding, the thickness of the joint portion generally increases to approximately 110% to 160% of the thicknesses of the base materials. There is a tendency that the larger the thicknesses of the metal plates become, the larger an absolute value of an increase amount of the thickness becomes. Therefore, when the thicknesses of the materials are increased, a deviation of the position of one of the electrode wheels in the pressing force direction from a set value increases, and further the amount of supporting the pressing force shared by the clamping devices is significantly increased by the amount of generation of the deviation due to the rigidity of joining materials. Thus, the difference between the welding forces applied by the upper and lower electrode wheels significantly increases and a problem occurs that the strength of the joint portion on the side of the smaller welding force is significantly reduced.

It is considered that one of the reasons that the thicknesses of the metal plates to be welded are limited to 3.2 mm or less or up to 4.5 mm at the maximum in the conventional mash seam welding is that there has been no effective means for easily avoiding vertical asymmetry of the joint condition.

In the second aspect of the present invention, by applying the present invention to the joining of the metal plates with thicknesses of 2 mm or more, it is possible to suppress a strength reduction of the joint portion caused by asymmetry thereof that is a problem in particular when the materials to be joined have the thicknesses of 2 mm or more and high rigidity, and the strength of the joint portion of the materials with large thickness can be improved. Since the electrode wheels are located symmetrically about the center of the joint portion, forced displacement of the overlapping portions of the metal plates that was an amount corresponding to the thickness of each of the metal plates conventionally can be a half of the thickness of each of the metal plates, so that bending reaction force of the metal plates that acts on the first and second clamping devices can be significantly reduced.

According to the third and fourth aspects of the present invention, the following effects can be obtained.

As a problem expected to occur when the pressing force control is performed to equalize welding force acting on the upper and lower overlapping portions for the purpose of avoiding vertical asymmetry of the joint conditions, there may arise a problem that if the un-joined materials are pressed with the upper and lower electrode wheels at the time of starting of the joining, the positions of the electrode wheels in a vertical direction are not determined and the materials to be joined are lifted up so that the joining cannot be started. This problem is noticeable especially when the materials are thin and have low rigidity.

In the third and fourth aspects of the present invention, for such a problem, by performing the position control for one of the electrode wheels until the joining end surfaces are welded and desired rigidity of the materials is obtained, it is possible to start the joining without lifting of the materials. After the joining end surfaces are welded and the portions of the two metal plates are joined, the rigidity of the plates in the vertical direction of the electrode wheels becomes sufficient, and therefore, by performing the pressing force control for both of the upper and lower electrode wheels, it is possible to perform the joining of high quality from starting to finishing of the joining.

Further, in the fourth aspect of the present invention, since initial load can be imparted to the electrode wheel by starting the joining while the support portion of the lower electrode wheel is pressurized and urged against the machine fixed end, a variation in load applied to the overlapping portions by the position control using pressing force at the lower electrode wheel can be significantly suppressed at the time around when the upper and lower electrode wheels catches up the overlapping portions of the metal plates there between and the pressing force is applied to the overlapping portions, so that the accuracy of setting the positions of the electrode wheels at the starting time of the welding can be ensured. In addition, immediately after the overlapping portions are gripped by the upper and lower electrode wheels and at the time when the pressing forces of the upper and lower electrode wheels are balanced, the support portion of the lower electrode wheel that was urged against the machine fixed end is cleared away from the machine fixed end by the force balancing, so that the pressing forces applied by the upper and lower electrode wheels are automatically adjusted. This enables the upper and lower welding forces acting on the overlapping portions to be equalized from the starting of welding after the welding of the joining starting end surfaces is completed, thereby increasing the joint strength and enhancing the reliability of the joint portion.

According to fifth and tenth aspects of the present invention, the following effects can be obtained.

When the distance between the first clamping device and the overlapping portions is different from the distance between the second clamping device and the overlapping portions, moment arms of the first and second clamping devices are different from each other, and thus contact angles of the overlapping portions or warping angles of the metal plates are different from each other. This enlarges the gap between the overlapping portions, and welding surface flash is easily generated.

In case the materials having high rigidity and large thickness are overlapped, when the position of the lower electrode wheel in the pressing force direction is set on the pass line, forced displacement corresponding to the material thickness is imparted to the upper metal plate. When the positions of the upper and lower electrode wheels in the pressing force direction are arranged in vertical symmetry about the center of the joint portion, the forced displacement can be reduced by a half of the thickness of the material. There is, however, a problem that the metal plates may be plastically deformed from the edge portions of the clamp plates depending on distances between the overlapping portions and the clamping devices. Even when the plastic deformation does not occur, there is a problem that the electrode wheels may be scratched by edges of the electrode wheels due to large tilting angles of the overlapping portions upon welding by he electrode wheels, or there is a problem that even when the upper and lower surfaces of the joint portion are pressed to be parallel by the welding force of the electrode wheels, the upper and lower surfaces of the joint portion cannot be deformed to be parallel due to the rigidity of the materials.

In the fifth and tenth aspects of the present invention, by equalizing the distances between the overlapping portions and the first and second clamping devices adjusting the distances depending on the thicknesses of the metal plates, the overlapping portions can be formed in a symmetrical shape, and further, when the metal plates having high rigidity and large thicknesses of 2 mm or more are overlapped, the metal plates are not plastically deformed due to forced displacement caused by the overlapping of the materials. In addition, the upper and lower surfaces of the joint portion can be made parallel with low welding force by the electrode wheels.

Accordingly, it is possible to stabilize the strength of the joint portion and reduce gradients of the steps of the joint portion, thereby ensuring high joint strength.

According to the sixth aspect of the present invention, the following effects can be obtained.

When the metal plates have large thickness, rolling reductions by the upper and lower electrode wheels increase and thus, the driving torque necessary for the electrode wheels is increased depending on the thicknesses of the metal plates. Normally, constant torque is supplementarily supplied to the electrode wheels with air motors or the like. When the range of the thicknesses of metal plates to be joined are is wide, however, excess or short of the driving torque of the electrode wheels necessary to perform welding occur.

In the sixth aspect of the present invention, the pair of upper and lower electrode wheels are positively driven and driving torques of the electrode wheels are controlled depending on the thicknesses of the metal plates. With such features, desired rolling power can be applied to the upper and lower surfaces of the joint portion, and thus, it is possible to solve problems of occurrence of joint failure and reduction of joint strength due to shortage of the driving power, thereby enhancing the reliability of the joint portion. Further, problems such as wear of the electrode wheels can be solved.

According to the seventh and eleventh aspects of the present invention, the following effects can be obtained.

The larger the thicknesses of the metal plates to be joined, the larger the steps formed between the joint portion and the base materials. The larger the sizes of the steps, the more stress is concentrated in the steps. This reduces the strength of the welded portions.

In the seventh and eleventh aspects of the present invention, since the axes of the pair of upper and lower pressure rollers are tilted in a horizontal plane with respect to the straight line perpendicular to the joining line of the joint portion, and steps of the joint portion are rolled in the direction of movement of the pair of pressure rollers while the pressure rollers are driven positively, an increase in the thickness of the joint portion can be reduced by the shearing deformation in the direction perpendicular to the joining line. In addition, it is possible to smooth the steps or reduce the gradients of the steps and ensure high joint strength.

In addition, by smoothing the steps of the joint portion of the metal plates or reducing the gradients of the steps, it is possible to reduce the stress concentration factors of the joint portion and ensure high joint strength.

MODE FOR CARRYING OUT THE INVENTION

Next, embodiments of the present invention are described with reference to the accompanying drawings.

Figure 1:
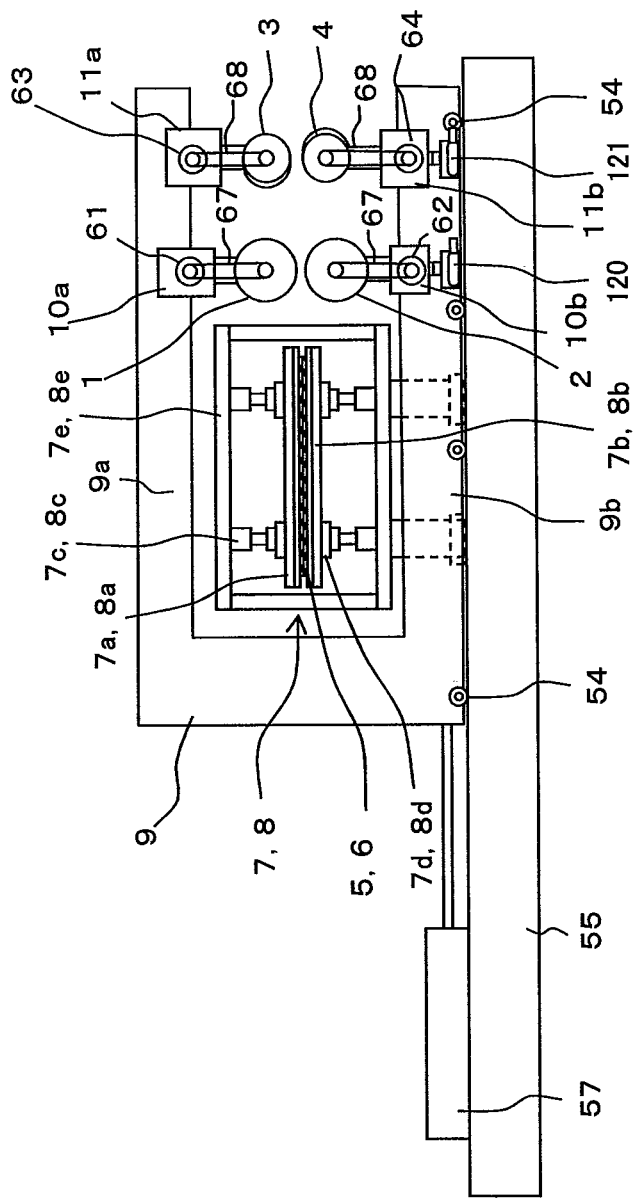
FIG. 1 is a schematic view of a mash seam welding apparatus according to an embodiment of the present invention.

FIG. 1 is a schematic view of a mash seam welding apparatus according to an embodiment of the present invention.

Referring to FIG. 1, the mash seam welding apparatus according to the present embodiment includes a pair of upper and lower electrode wheels 1 and 2, a pair of upper and lower pressure rollers 3 and 4, first and second clamping devices 7 and 8, a carriage frame 9, upper and lower electrode wheel pressing devices 10a and 10b and upper and lower pressure roller pressing devices 11a and 11b. The upper and lower electrode wheel pressing devices 10a and 10b and the upper and lower pressure roller pressing devices 11a and 11b are hydraulic cylinder devices or pneumatic cylinder devices, for example. The upper electrode wheel 1 and the upper pressure roller 3 are held by an upper horizontal frame 9a of the carriage frame 9 through the upper electrode wheel pressing device 10a and the upper pressure roller pressing device 11a, and the lower electrode wheel 2 and the lower pressure roller 4 are held by a lower horizontal frame 9b of the carriage frame 9 through the upper electrode wheel pressing device 10b and the lower pressure roller pressing device 11b. The pair of upper and lower pressure rollers 3 and 4 are arranged adjacent to the pair of upper and lower electrode wheels 1 and 2 in the carriage frame 9.

The upper and lower electrode wheel pressing devices 10a and 10b move up and down the upper and lower electrode wheels 1 and 2, respectively, to apply necessary welding forces to overlapping portions L of two metal plates 5 and 6 during mash seam welding of the overlapped two metal plates 5 and 6.

The upper and lower electrode wheel pressing devices 10a and 10b are actuated by a pressing device control system 200 (described later) to control the positions of the electrode wheels and welding force applied to the metal plates that is necessary for the mash seam welding. The pressing devices 10a, 10b, 11a and 11b are the hydraulic cylinder devices or pneumatic cylinder devices in the present embodiment, but may be electric servo motors or the like.

The lower electrode wheel 2 is periodically ground to suppress joint failure due to scratches and uneven wear on the electrode wheel surface during welding until the use limit is reached. Since the grinding of the lower electrode wheel 2 reduces the diameter thereof, the position of the upper surface of the lower electrode wheel 2 is lowered differently from the position of the upper surface of the lower electrode wheel 2 before grinding. In order to match the lowered position of the upper surface of the lower electrode wheel 2 with the position of the upper surface of the lower electrode wheel 2 before grinding, a worm jack 120 for height adjustment is arranged below the lower electrode wheel pressing device 10b.

In addition, the lower pressure roller 4 is periodically ground to suppress failures of smoothing of steps after welding due to scratches and uneven wear on the surface during smoothing of the steps. In order to adjust the resultant change of the position of the upper surface of the lower pressure roller 4, a worm jack 121 for height adjustment is arranged below the lower pressure roller pressing device 11b in a similar manner to the lower electrode wheel 2.

The height adjustments by the worm jacks 120 and 121 (rotations of worm shafts) are performed manually or by using electric motor/air motor (not illustrated) or the like as a drive source.

The carriage frame 9 is provided with support rollers 54 at the bottom portion thereof and can be moved on a base plate 55 through the support rollers 54 in a direction perpendicular to the two metal plates 5 and 6 to be joined (joining direction). The first and second clamping devices 7 and 8 includes pairs of upper and lower clamp plates 7a and 7b; 8a and 8b, upper and lower pressing cylinder devices 7c and 7d; 8c and 8d, and support frames 7e and 8e, respectively. The clamp plates 7a and 7b; 8a and 8b are supported by the upper and lower pressing cylinder devices 7c and 7d; 8c and 8d in the support frames 7e and 8e, respectively, and the support frames 7e and 8e are supported on the base plate 55.

The metal plate welding apparatus further includes a pair of upper and lower electric motors 61 and 62 for drivingly rotating the corresponding upper and lower electrode wheels and a pair of upper and lower electric motors 63 and 64 for drivingly rotating the corresponding upper and lower pressure rollers. The electric motors 61 and 62 are mounted on the side surfaces of the electrode wheel pressing devices 10a and 10b, respectively, and are coupled to the rotating shafts of the electrode wheels 1 and 2 through chain and sprocket devices 67, for example, to transmit the rotating forces of the electric motors 61 and 62 to the electrode wheels 1 and 2. Similarly, the electric motors 63 and 64 are mounted on the side surfaces of the pressure roller pressing devices 11a and 11b, respectively, and are coupled to the rotating shafts of the pressure rollers 3 and 4 through chain and sprocket devices 68, for example. to transmit the rotating force of the electric motors 63 and 64 to the pressure rollers 3 and 4, respectively.

Figure 2:
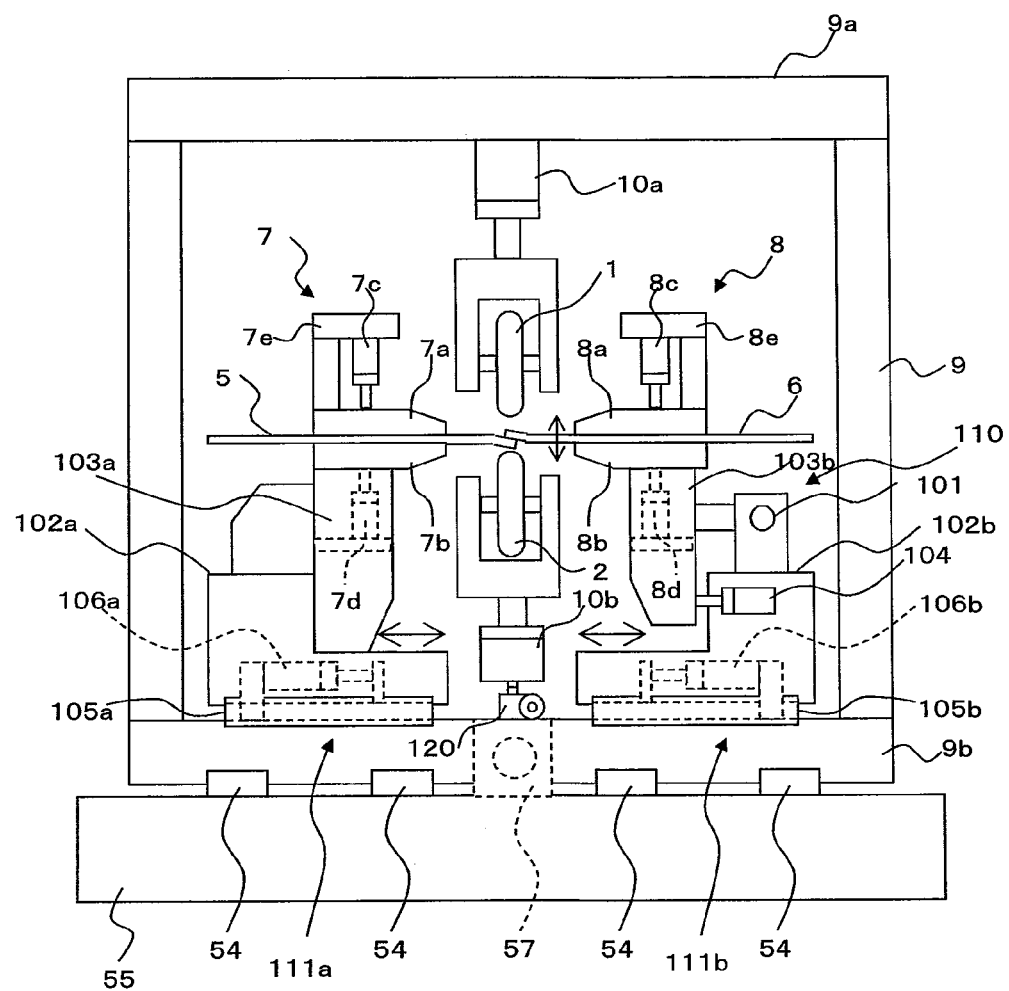
FIG. 2 is a side view of first and second clamping devices when viewed from a direction in which joining is progressed.

FIG. 2 is a view showing the first and second clamping devices 7 and 8 as viewed from a direction in which joining is progressed. One of the first and second clamping devices 7 and 8, for example, the second clamping device 8, includes a clamping device tilting device 110 that causes the clamping device 8 to pivot in a vertical direction around a pin 101 as a fulcrum point of the clamping device 8, in order to move in a vertical direction an end of the metal plate 6 held by the clamp plates 8a and 8b. In addition, the first clamping devices 7 and 8 include clamping device moving devices 111a and 111b, respectively, that move the end portions of the metal plates 5 and 6 held by clamp plates 7a, 7b, 8a and 8b in a direction perpendicular to the joining direction, in order to adjust the lengths of the overlapping portions L of the endss of the metal plates 5 and 6 held by the clamp plates 7a, 7b, 8a and 8b.

The clamping device tilting device 110 has a hydraulic or pneumatic cylinder arranged on a stand 102b rotating a holder 103b supporting the lower clamp plate 8b around the pin 101. The clamping device moving device 111b has a hydraulic or pneumatic cylinder device 106b arranged on a base 105b for driving the stand 102b in the direction perpendicular to the joining direction. The clamping device moving device 111a also has a hydraulic or pneumatic cylinder device 106a arranged on a base 105a for driving a stand 102a united with a holder 103a supporting the lower clamp plate 7b in the direction perpendicular to the joining direction.

Here, the clamping device moving devices 111a and 111b serve as distance adjusting devices that adjust respective distances between the overlapping portions L and the clamp plates 7a, 7b, 8a and 8b by adjusting the positions of the clamp plates 7a, 7b, 8a and 8b in the direction perpendicular to the joining direction. As described later, the distances between the overlapping portions L and the clamp plates 7a, 7b, 8a and 8b are set to be equal to each other and are adjusted depending on the thicknesses of the metal plates 5 and 6.

Figure 3:
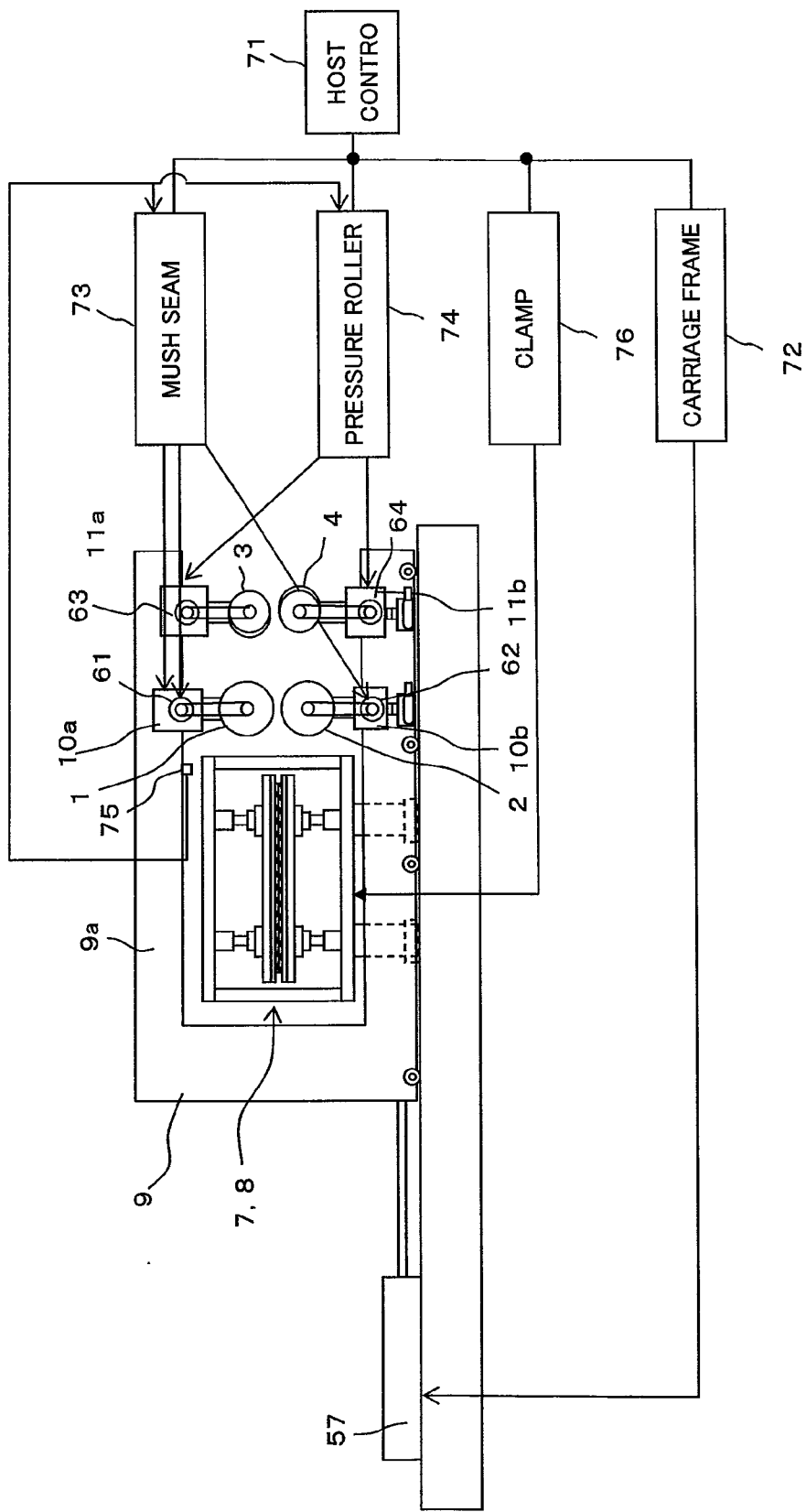
FIG. 3 is a schematic view of a control system of the mash seam welding apparatus shown in FIG. 1.

FIG. 3 is a schematic view of a control system of the mash seam welding apparatus shown in FIG. 1. The control system of the mash seam welding apparatus includes a host control device 71, a carriage frame control device 72, a mash seam control device 73, a pressure roller control device 74 and a clamp control device 76. The host control device 71 unifies control of the carriage frame control device 72, the mash seam control device 73, the pressure roller control device 74 and the clamp control device 76. The carriage frame control device 72 provides an operation command to a hydraulic circuit (not shown) for the cylinder device 57 for driving the carriage frame 9 to control drive of the cylinder device 57. The mash seam control device 73 provides operation commands to hydraulic circuits (not shown) of the electrode wheel pressing devices (cylinder devices) 10a and 10b and the electric motors 61 and 62 to control drive thereof. The pressure roller control device 74 provides operation commands to hydraulic circuits (not shown) of the pressure roller pressing devices (cylinder devices) 11a and 11b and the electric motors 63 and 64 to control drive thereof. The clamp control device 76 provides operation commands to hydraulic circuits (not shown) of the cylinder devices 104, 106a and 106b for driving the first and second clamping devices 7 and 8 to control drive of the cylinder devices 104, 106a and 106b.

A laser distance meter 75 is installed on the upper horizontal frame 9a of the carriage frame 9 and adjacent to the upper electrode wheel 1. The mash seam control device 73 and the pressure roller control device 74 receive a detection signal from the laser distance meter 75 and detect the timing when ends of the overlapping portions of the metal plates 5 and 6 reach directly below the laser distance meter 75. The mash seam control device 73 and the pressure roller control device 74 previously store information of distances between the laser distance meter and the electrode wheels 1 and 2 and between the laser distance meter and the pressure rollers 3 and 4, and a travel speed of the carriage frame 9. The mash seam control device 73 and the pressure roller control device 74 calculate the timing when the electrode wheels 1, 2 and the pressure rollers 3, 4 grip the ends of the overlapping portions of the metal plates 5, 6 on the basis of the timing when the ends of the overlapping portions of the metal plates 5 and 6 reach immediately below the laser distance meter 75 and those distances and the travel speed. Before or after the timing, the mash seam control device 73 and the pressure roller control device 74 suitably control the electrode wheel pressing devices 10a and 10b, the electric motors 61 and 62, the pressure roller pressing devices 11a and 11b and the electric motors 63 and 64 on the basis of the aforementioned setting state (first setting state or second setting state) relating to the contacts of the upper and lower pressure rollers 3 and 4.

Figure 4A:
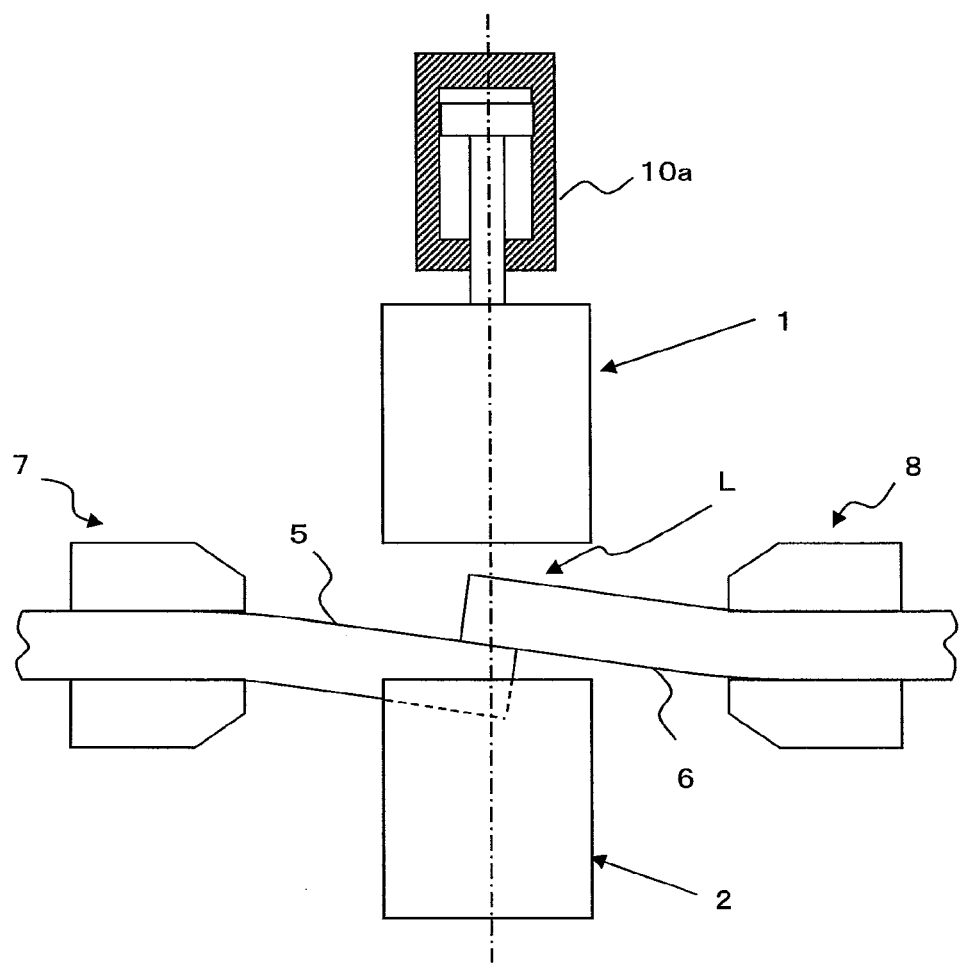
FIG. 4A is a view showing a joining process in which two metal plates are welded in a conventional mash seam welding method and illustrating a positional relationship between electrode wheels and overlapping portions of the metal plates when the electrode wheels are located at a waiting position.
Figure 4B:
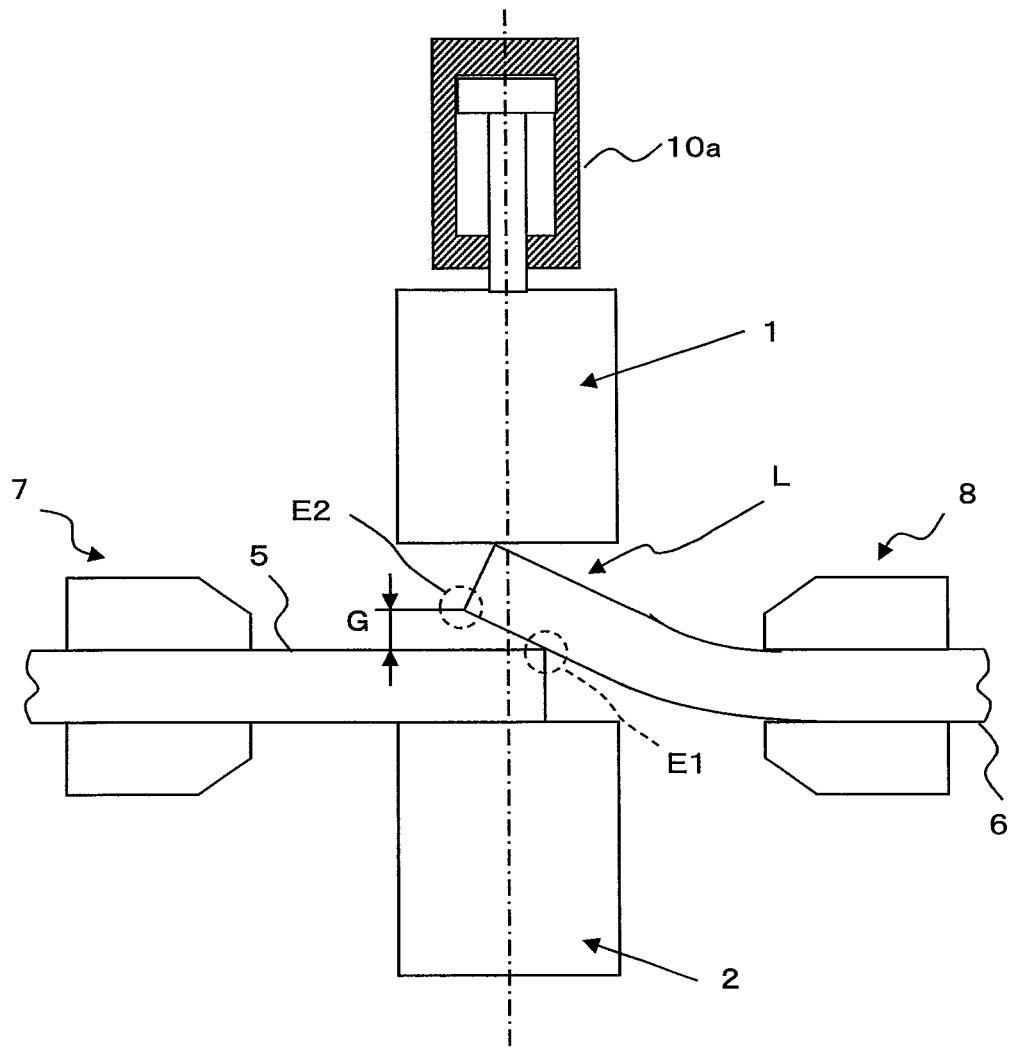
FIG. 4B is a view likewise showing a positional relationship between the electrode wheels and the overlapping portions of the metal plates when the electrode wheels reach joining starting end surfaces and the overlapping portions of the metal plates are pushed up by the lower electrode wheel.
Figure 4C:
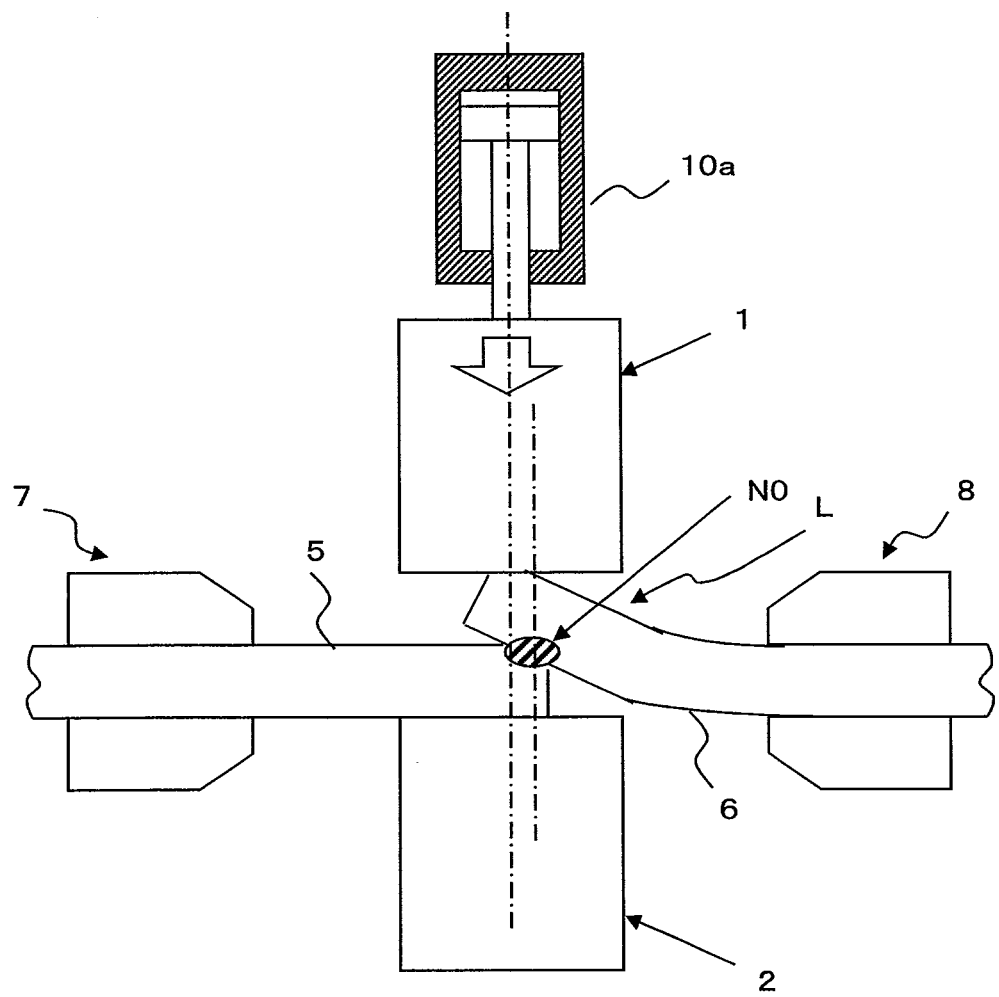
FIG. 4C is a view likewise showing a positional relationship between the electrode wheels and the overlapping portions of the metal plates immediately after the starting of the joining.
Figure 4D:
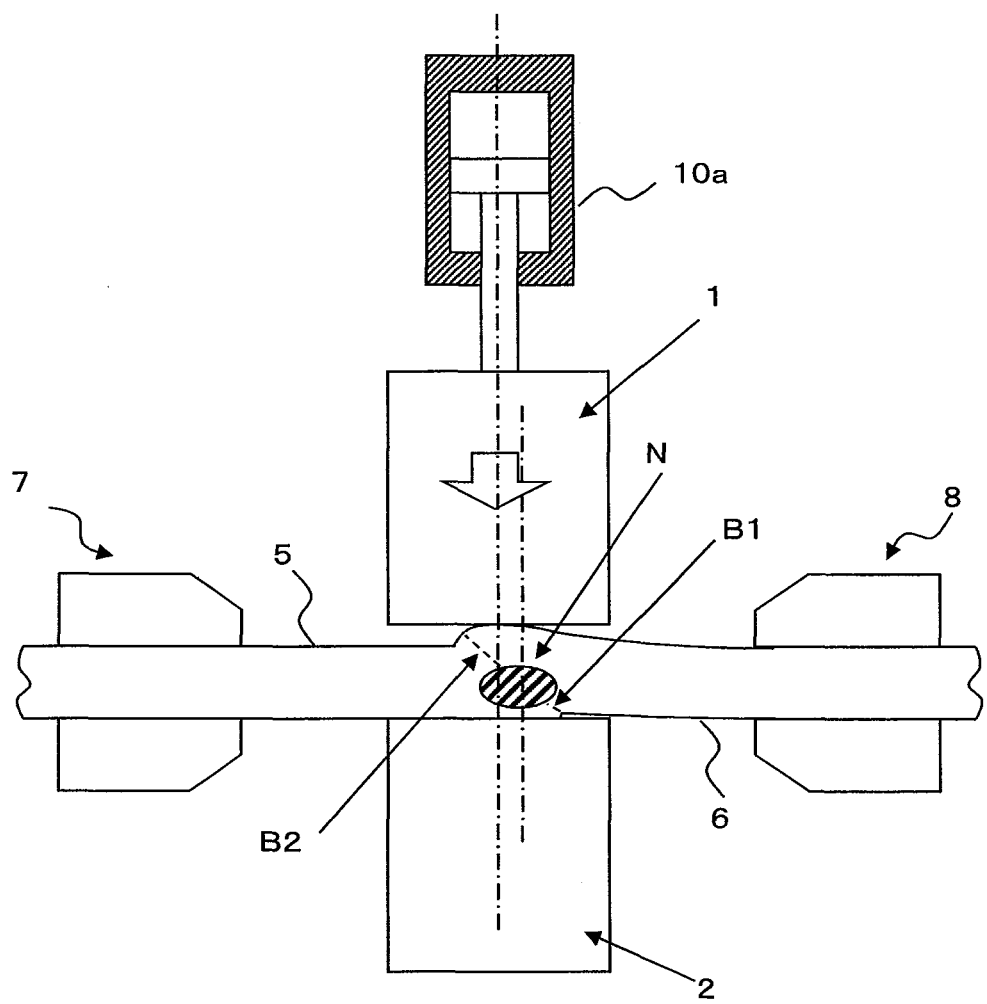
FIG. 4D is a view likewise showing a positional relationship between the electrode wheels and the overlapping portions of the metal plates when the joining is completed.

FIGS. 4A to 4D illustrate a joining process in which the two metal plates are welded in a conventional mash seam welding method. FIG. 4A illustrates a positional relationship between the electrode wheels and the overlapping portions of the metal plates when the electrode wheels are located at a waiting position. FIG. 4B illustrates a positional relationship between the electrode wheels and the overlapping portions of the metal plates when the electrode wheels reach joining starting end surfaces and the overlapping portions of the metal plates are pressed and lifted by the lower electrode wheel. FIG. 4C illustrates a positional relationship between the electrode wheels and the overlapping portions of the metal plates immediately after the starting of the joining. FIG. 4D illustrates a positional relationship between the electrode wheels and the overlapping portions of the metal plates when the joining is completed.

As shown in FIG. 4A, the two metal plates 5 and 6 are clamped with the first and second clamping devices 7 and 8, respectively, and placed to overlap each other. In this case, the position of an upper end of an outer circumferential portion of the lower electrode wheel 2 is set on a pass line (line extending from lower surfaces of the material clamping portions of the clamping devices) and retained at a position to contact lower surfaces of the overlapping portions of the metal plates 5 and 6. Thus, as shown in FIG. 4B, when the electrode wheels 1 and 2 move to the joining starting end surfaces of the metal plates 5 and 6 and contact the metal plates 5 and 6, the metal plates 5 and 6 are lifted up so that a large gap G is formed between a corner E2 of the upper metal plate 6 and the lower metal plate 5. When the overlapping portions L are welded, the upper electrode wheel 1 is moved down by the upper electrode wheel pressing device 10a to apply a desired welding force to the overlapping portions L. In other words, during the welding, the welding force applied to the overlapping portions L is controlled to be a desired value necessary for joining only by the pressing device 10a for the upper electrode wheel 1.

When the metal plates have relatively small thicknesses of 2 mm or less, even if the position of the upper end of the outer circumferential portion of the lower electrode wheel is set on the pass line as described above, the metal plates 5 and 6 of the overlapping portions L are warped and deformed to be parallel to each other upon pressing by the pressing device 10a for the upper electrode wheel 1, and therefore, there is no problem in many cases.

When metal plates with large thicknesses of 4.5 mm or larger are to be welded, however, since the rigidity of the metal plates 5 and 6 is high, the upper and lower metal plates cannot be warped and deformed to be parallel to each other by the welding force applied by the upper electrode wheel 1. As a result, when the metal plates are welded in that state while welding currents flow, desired joint strength cannot be obtained and the steps of the joined portion are enlarged.

More specifically, when the upper and lower metal plates 5 and 6 are not warped and deformed to be parallel to each other in the overlapping portions L, a current is concentrated at a corner E1 of the lower metal plate in contact with the upper metal plate 6 in the initial step of the welding process from the starting of passing of the electrode wheels to the finishing thereof in the overlapping portions L. In addition, in the overlapping portions L of the metal plates 5 and 6 that are not warped and deformed to be parallel to each other, a large gap G is formed between a corner E2 of the upper metal plate and the lower metal plate 5. Thus, the melting and deformation in the overlapping portions L is initiated from the portion of the lower metal plate corner E1 as shown by N0 in FIG. 4C, but not from the center of the overlapping portions L. After this portion is jointed, the corner E2 of the upper metal plate is brought into contact with the lower metal plate 5, but, as described above, since the corner E2 of the upper metal plate has the gap G between itself and the lower metal plate 5 at the starting time of the joining, a generation of heat due to a contact resistance between the metal plate materials is delayed. The corner E2 of the upper metal plate contacts the lower metal plate 5 after melting and deformation of portions at the corner E1 of the lower metal plate are progressed. Thus, the joining region near the corner E2 of the upper metal plate is experienced with less amount of heat input and short time of welding at high temperature by the electrode wheel 1, compared with the joining region near the corner E1 of the lower metal plate.

In the mash seam welding, a molten and solidified portion (nugget) N is generated in the central portion of the joint portion, and solid-state joint portions B1 and B2 are formed at positions in point-symmetry with respect to the nugget N, or at the boundaries in the joint portion connecting the corner E1 of the lower metal plate and the nugget N and the corner E2 of the upper metal plate and the nugget N. As shown in FIG. 4D, in the welding of the thick metal plates, the welding on the side of the corner E1 of the lower metal plate precedes as described above, so that the length of the solid-state joint portion B1 on the side of the corner E1 of the lower metal plate is short and the time period in which the solid-state joint portion B1 is pressed by the electrode wheel 2 is long, and thus the strength of the solid-state joint portion becomes high. Further, the deformation at a high temperature is progressed in the portion near the corner E1 of the lower metal plate, and the step of the joint portion near the corner E1 of the lower metal plate is smaller than the step of the joint portion near the corner E2 of the upper metal plate. Conversely, the length of the solid-state joint portion on the side of the corner E2 of the upper metal plate is large and the amount of heat input thereto is small, so that the strength of the solid-state joint portion is low, and since high temperature deformation is not progressed, the step of the joint portion becomes large.

Accordingly, the joint portion is formed in a vertically asymmetrical shape, and a large step with a high stress concentration factor is formed near the corner E2 of the upper metal plate, and the solid-state joint portion B2 contiguous with that step has low joint strength and becomes the weakest portion of the welded joint.

In the mash seam welding, since the thickness of the joint portion generally increases to approximately 110% to 160% of the thicknesses of the base materials, there is a tendency that the larger the thicknesses of the metal plates becomes, the larger an absolute value of an increase amount of thickness of the joint portion becomes. Therefore, the thicker is the metal plates, the more noticeable vertical asymmetry of the joint portion becomes and the joint strength is significantly reduced.

The present inventors have confirmed the aforementioned effects (the position of the center of the materials clamped by the first and second clamping devices does not match the position of the center of the nugget formed during the welding, and the upper and lower solid-state joint portions differ in length from each other and provide a difference in the strength of the joint portions, so that the joining state is unstable and the joint strength is reduced, and the step of the joint portion on the side of the upper metal plate is increased) by conducting tests.

In addition, it has been confirmed that that phenomenon occurs noticeably when the rigidity of the materials is high.

Further, it has been also confirmed that there is a tendency that a groove-like scratch formed in the surface of the electrode wheel due to the corner of the metal plate, that is traditionally raised as a problem to reduce the strength of the joint portion, is deeper as the rigidity of the material is higher.

The problem occurs with the deformation of the overlapped materials formed in vertically asymmetrical shape. In order to eliminate the asymmetry, the position of the lower electrode wheel has to be set to be lower by a half of the increase amount of thickness of the joint portion, than a material clamping reference position.

In addition, it has been confirmed by tests that the asymmetry of the upper and lower solid-state joint portions B1 and B2 is also caused by the distances between the joint portion and the first and second clamping devices.

Figure 5A:
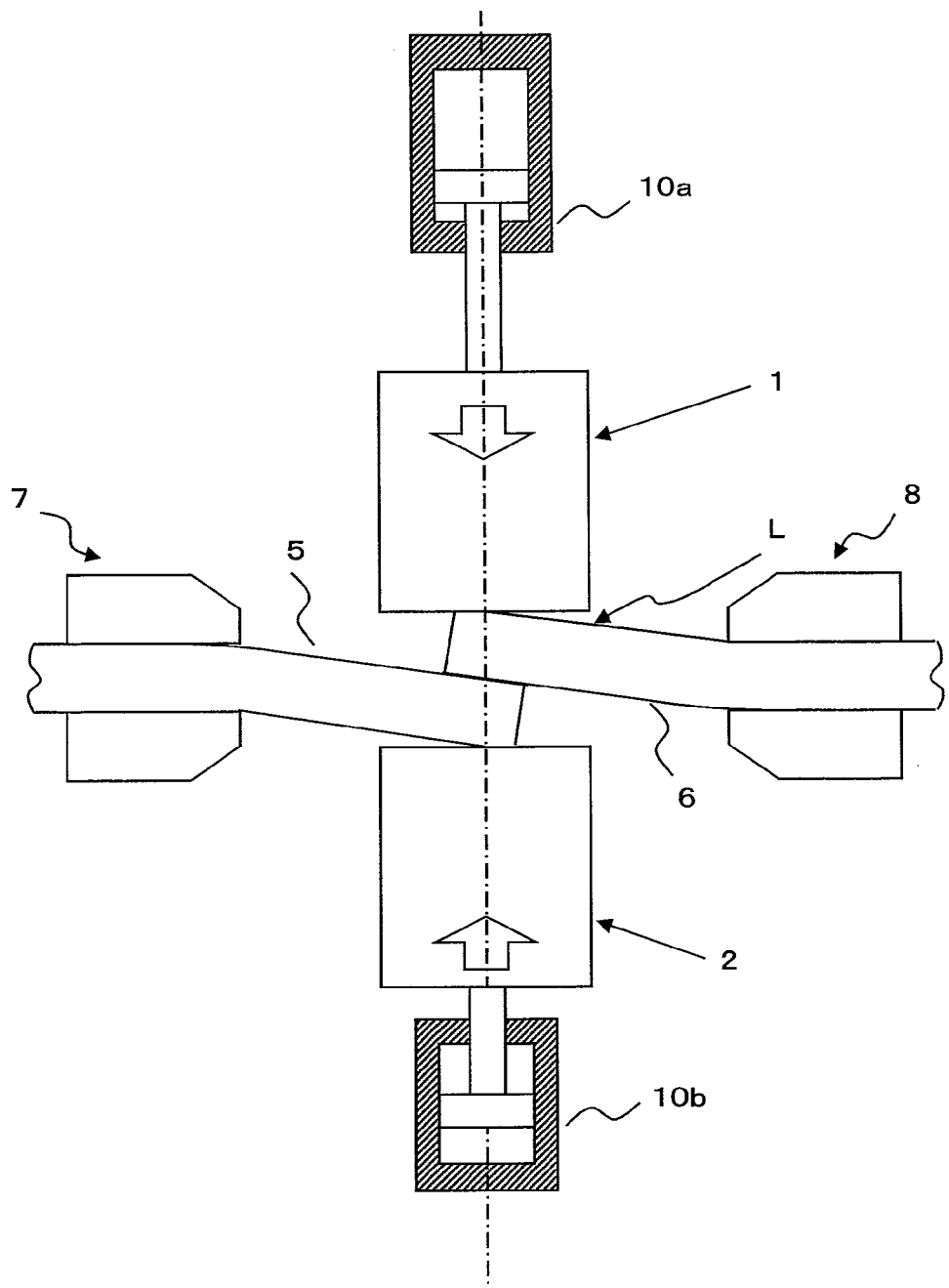
FIG. 5A is a view showing a welding process in which two metal plates are welded in a mash seam welding method according to the present invention and illustrating a positional relationship between electrode wheels and the metal plates before the starting of welding in which the electrode wheels sandwich the overlapping portions of the metal plates.
Figure 5B:
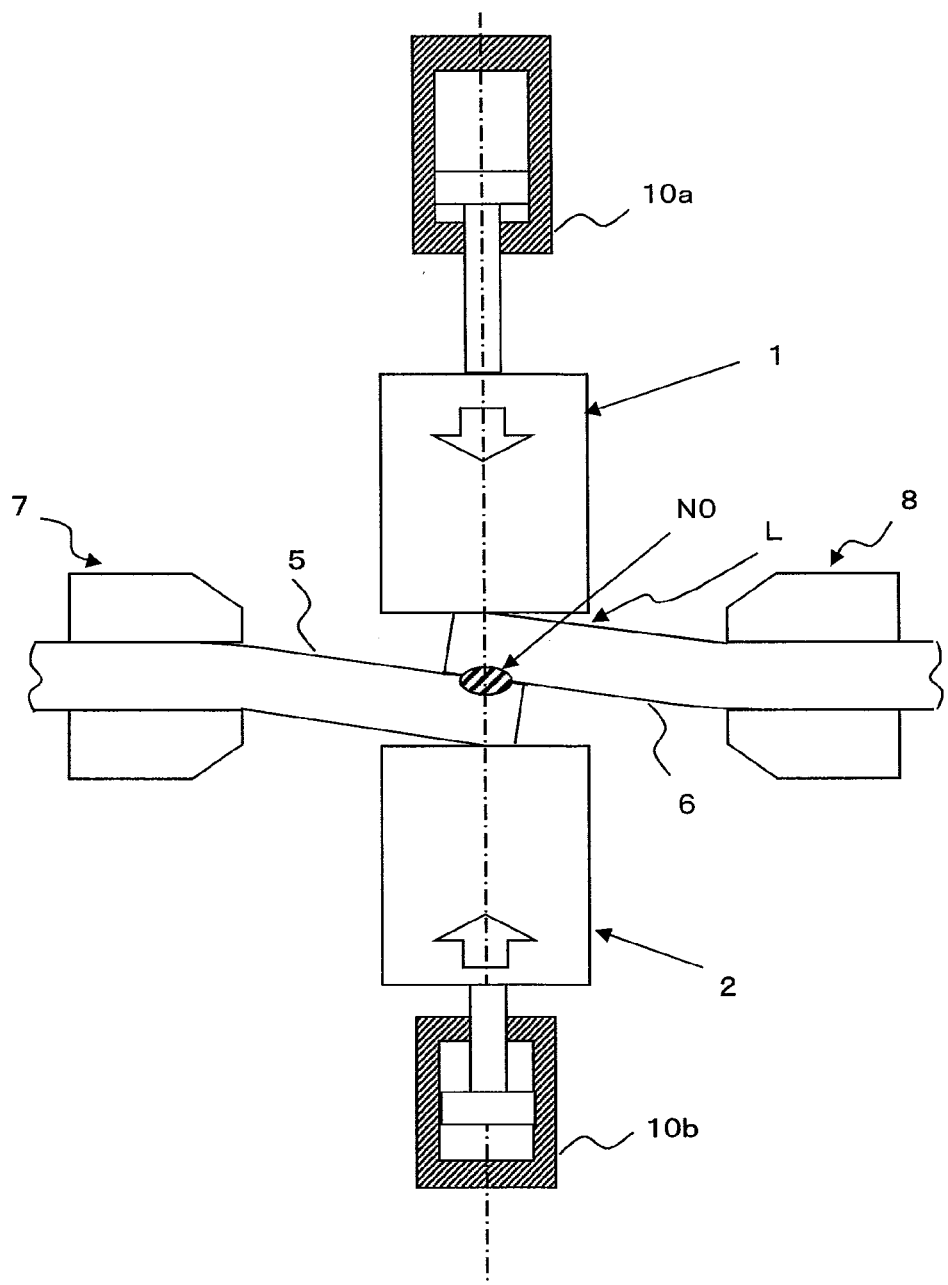
FIG. 5B is a view likewise showing a positional relationship between the electrode wheels and the overlapping portions of the metal plates immediately after the starting of welding in the mash seam welding method according to the present invention.
Figure 5C:
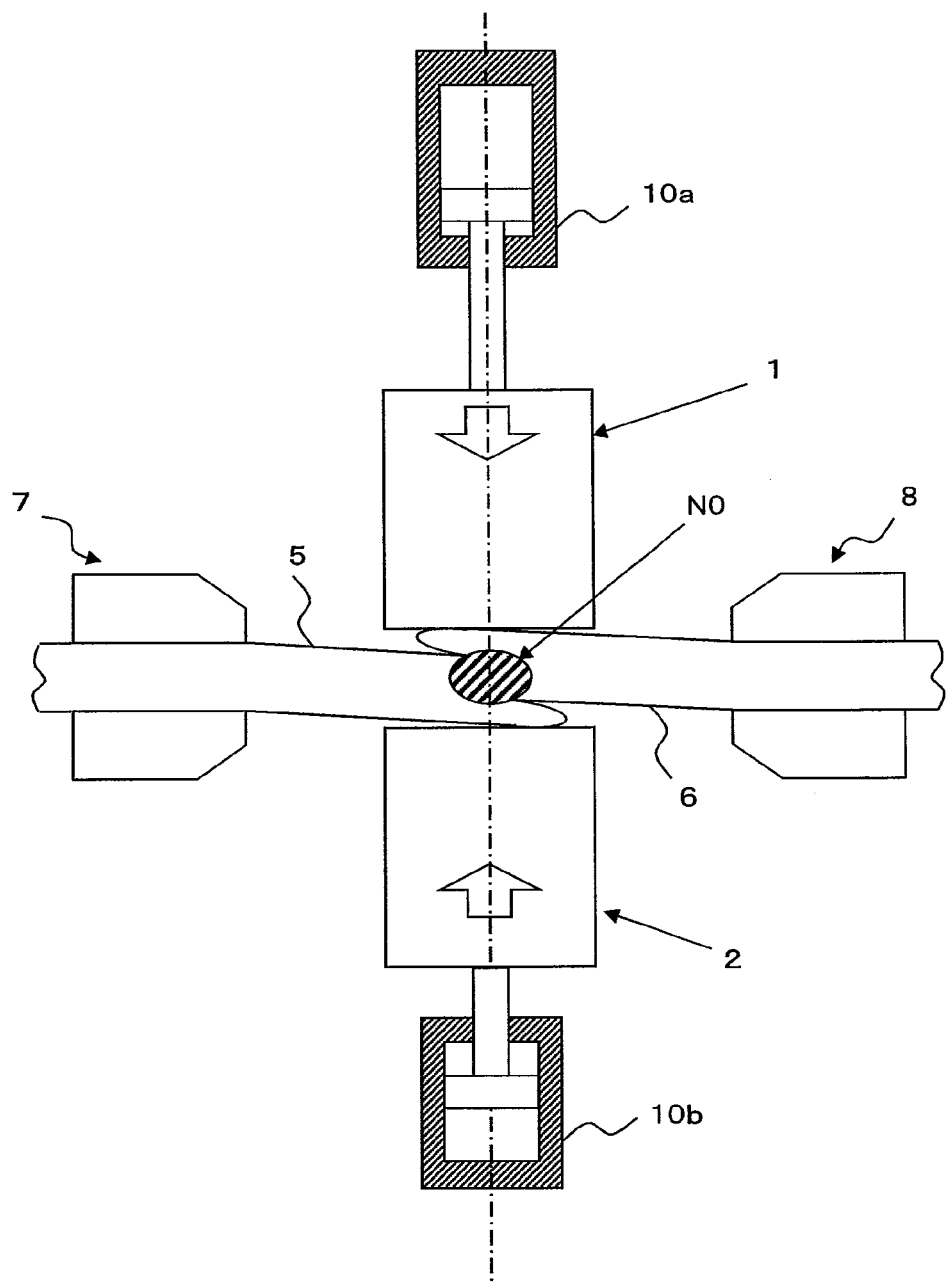
FIG. 5C is a view likewise showing a positional relationship between the electrode wheels and the overlapping portions of the metal plates during the welding.
Figure 5D:
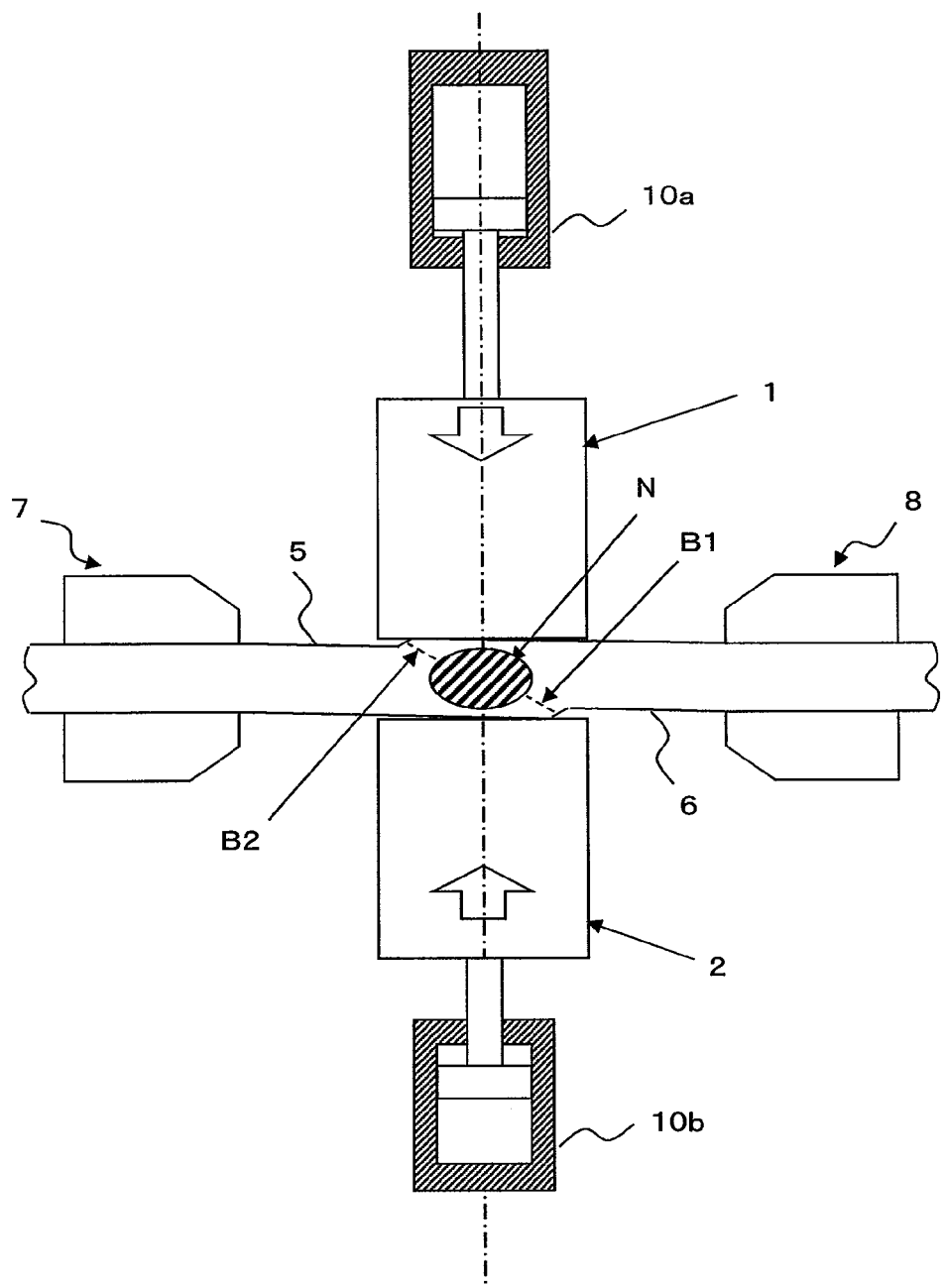
FIG. 5D is a view likewise showing a positional relationship between the electrode wheels and the overlapping portions of the metal plates immediately after completion of the welding.
Figure 5E:
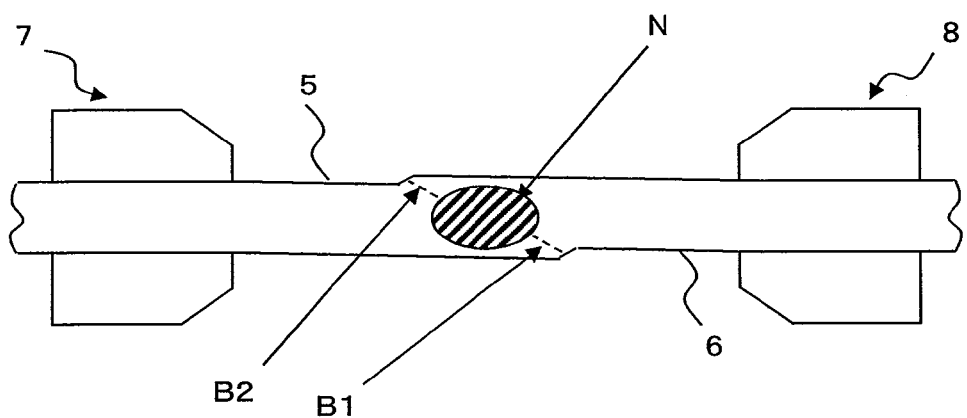
FIG. 5E is a view likewise showing the state of a joint portion of the joined metal plates in the mash seam welding method according to the present invention.

Features of the present embodiment that solves the aforementioned problems are described with reference to FIGS. 5A to 5E. FIG. 5A illustrates a positional relationship between the electrode wheels and the overlapping portions of the metal plates before the starting of the welding in which the electrode wheels sandwich the overlapping portions of the metal plates. FIG. 5B illustrates a positional relationship between the electrode wheels and the overlapping portions of the metal plates immediately after the starting of the welding. FIG. 5C illustrates a positional relationship between the electrode wheels and the overlapping portions of the metal plates during the welding. FIG. 5D illustrates a positional relationship between the electrode wheels and the overlapping portions of the metal plates immediately after completion of the welding. FIG. 5E is a view showing the state of the joint portion of the joined metal plates.

In the present embodiment, the two metal plates 5 and are clamped with the first and second clamping devices 7 and 8, respectively, and the two metal plates 5 and 6 are placed to overlap each other at their end portions, and then the overlapping portions L of the two metal plates 5 and 6 are pressed with the pair of upper and lower electrode wheels 1 and 2 while flowing the welding currents to continuously weld the overlapping portions L and join the two metal plates 5 and 6. Then, the pressing force applied to the upper and lower electrode wheels 1 and 2 are controlled so that upper and lower welding forces acting upon the overlapping portion L are equal to each other during the time when the overlapping portions L are continuously welded while the welding current flows.

When the thicknesses of the two metal plates are 2 mm or more, the distances between the overlapping portions L and the clamp plates 7a, 7b, 8a and 8b are set to be equal to each other and the distances are adjusted depending on the thicknesses of the metal plates 5 and 6, whereby the upper and lower metal plates 5 and 6 that are deformed and contact each other at the overlapping portions L are deformed in vertical symmetry due to the rigidity of the metal plates 5 and 6. For the upper and lower metal plates 5 and 6 of such overlapping portions L, in the present invention, since the upper and lower welding forces acting upon the overlapping portion L are controlled to be equal to each other as above-mentioned, the upper and lower metal plates 5 and 6 at the overlapping portions L maintain a deformed shape of vertical symmetry as shown in FIG. 5A even after the overlapping portions L of the metal plates 5 and 6 are welded by the electrode wheels 1 and 2. As a result, the gap between the corner E2 of the upper metal plate and the lower metal plate 5 becomes small, and contact areas of the upper and lower metal plates 5 and 6 increase, so that a current density is reduced. It is, therefore, possible to increase the welding currents while suppressing the occurrence of welding surface flash and thus to increase the amounts of heat input. In addition, since the overlapping portions L of the metal plates 5 and 6 are deformed in vertical symmetry, melting is initiated at a portion near the center of the overlapping portions L as shown by N0 in FIG. 5B, and the melting is progressed in the manner of point-symmetry as shown in FIGS. 5B to 5D. Thus, as shown in FIGS. 5D and 5E, the nugget N is formed near the center of the overlapping portions L, and the solid-state joint portions B1 and B2 are formed in vertical symmetry and the lengths of the upper and lower solid-state joint portions B1 and B2 are equal to each other.

Since the joint conditions for the upper and lower portions are equalized as described above, it is possible to increase the welding currents and the amounts of heat input and form the solid-state joint portions B1 and B2 in vertically symmetry, so that the solid-state joint strength can be stabilized. In addition, since the joint conditions for the upper and lower portions are equalized, the steps of the joint portions J can be formed in symmetry as shown in FIG. 5E, so that the steps of the joint portion J can be small and increase in the stress concentration factors of the steps of the joint portion can be suppressed.

The mash seam welding method according to the first embodiment of the present invention that solves the aforementioned problems is described with reference to FIGS. 6 to 8B and 5A to 5E.

Figure 6:
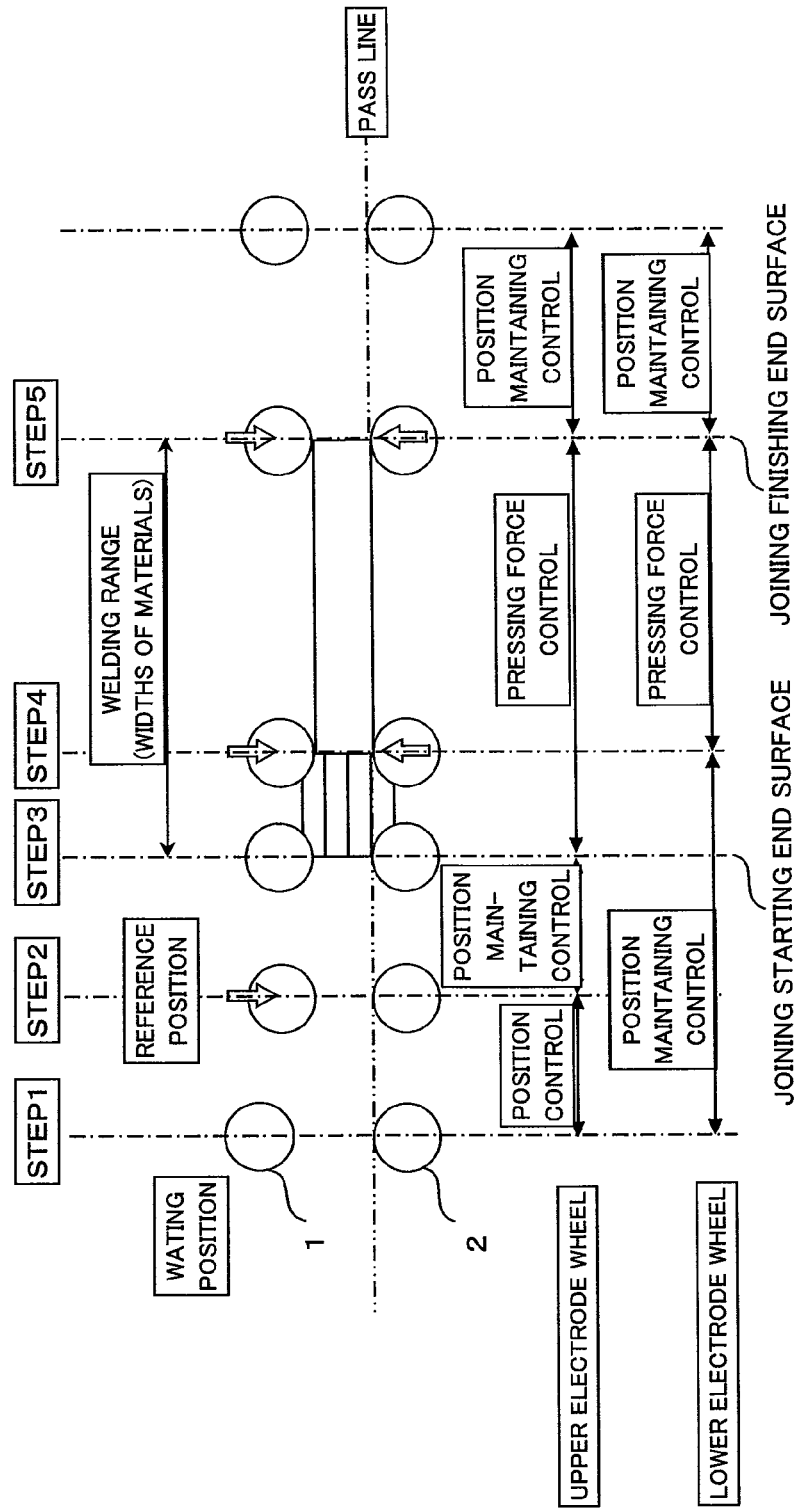
FIG. 6 is a view showing a series of processes from the state in which the electrode wheels are located at waiting positions to completion of the joining in a mash seam welding method according to a first embodiment of the present invention.
Figure 7:
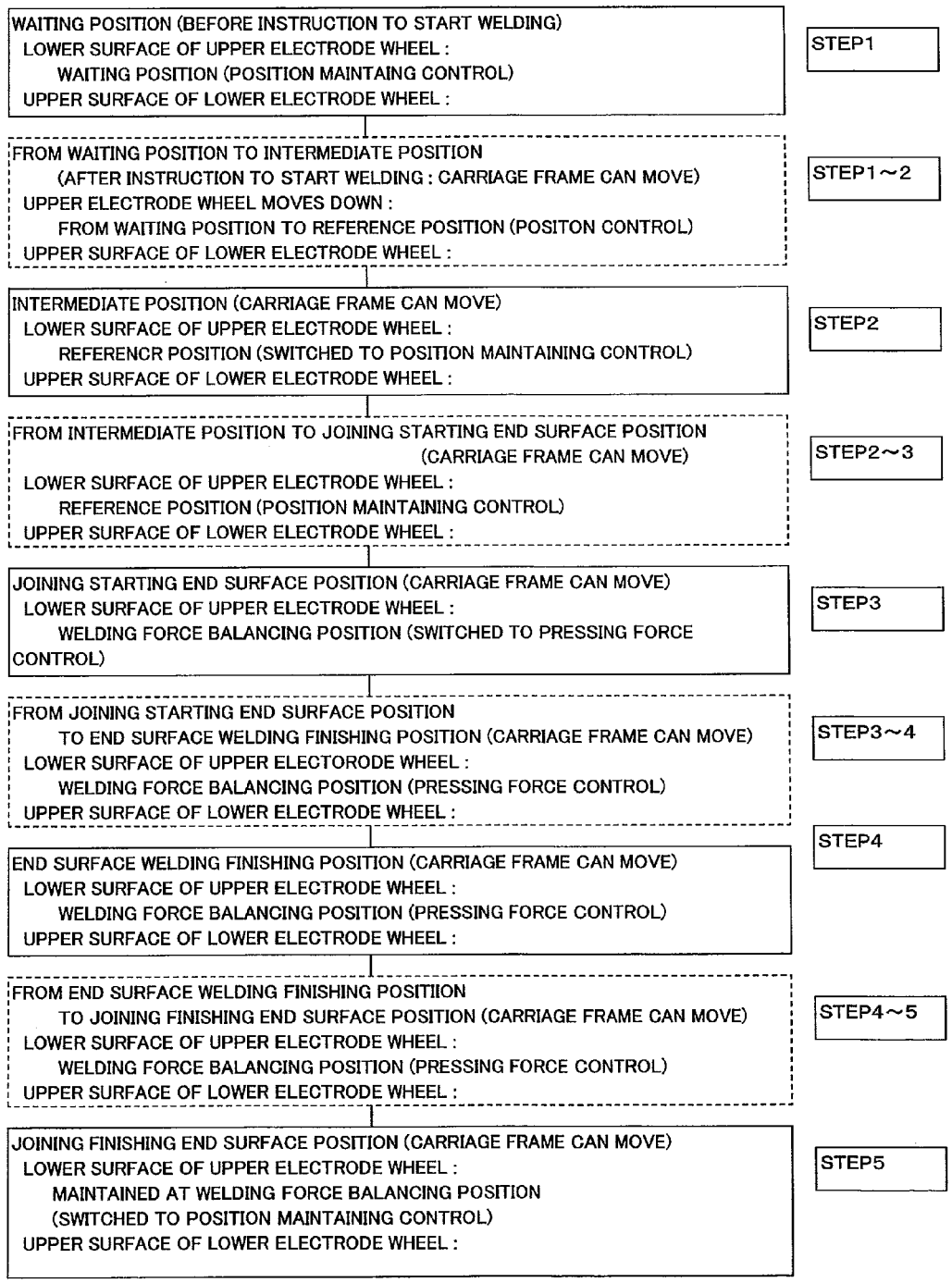
FIG. 7 is a flowchart showing the series of processes likewise.
Figure 8A:
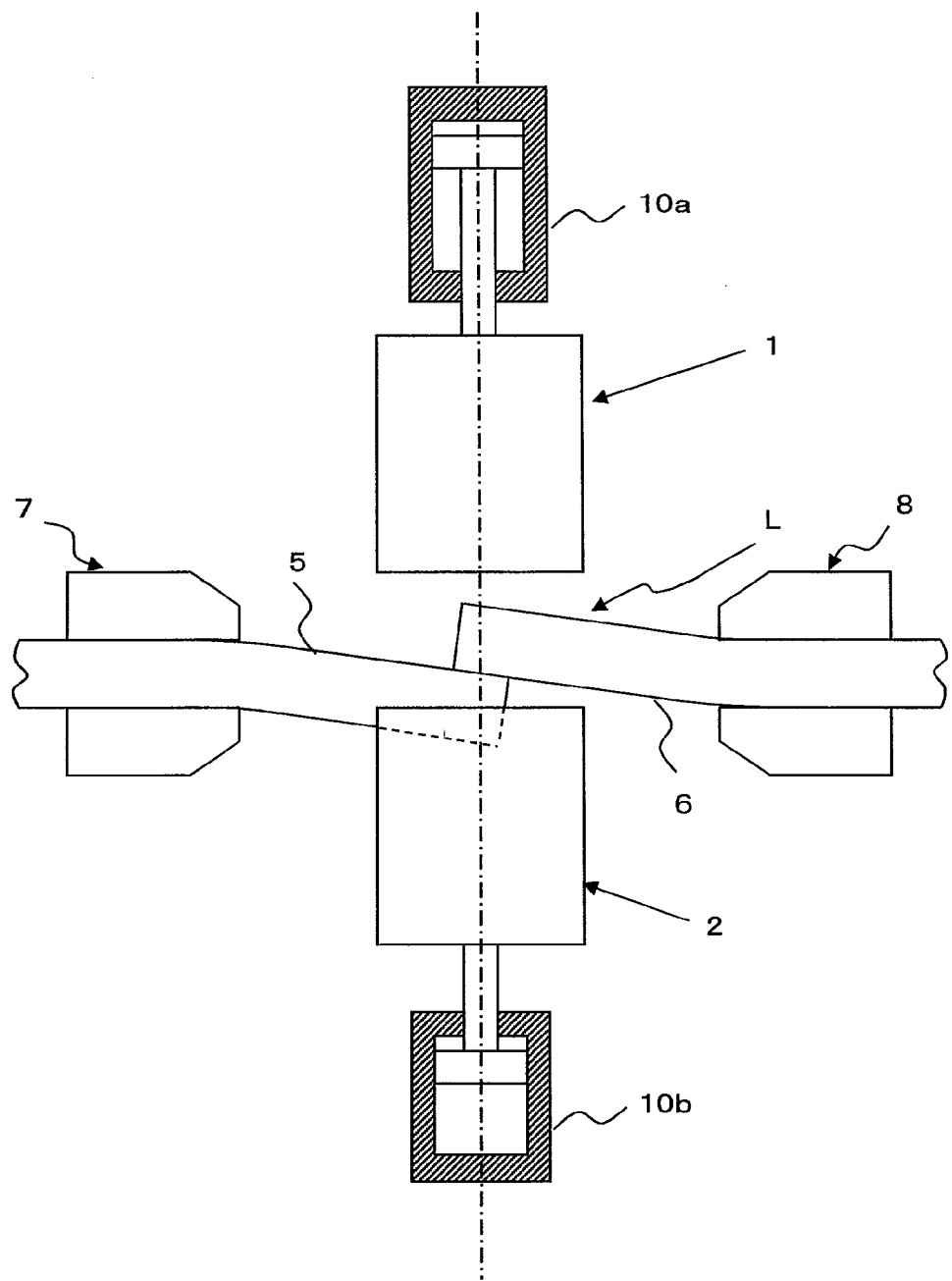
FIG. 8A is a view likewise showing a positional relationship between the electrode wheels and the overlapping portions of the metal plates when the upper and lower electrode wheels are located at the waiting positions.
Figure 8B:
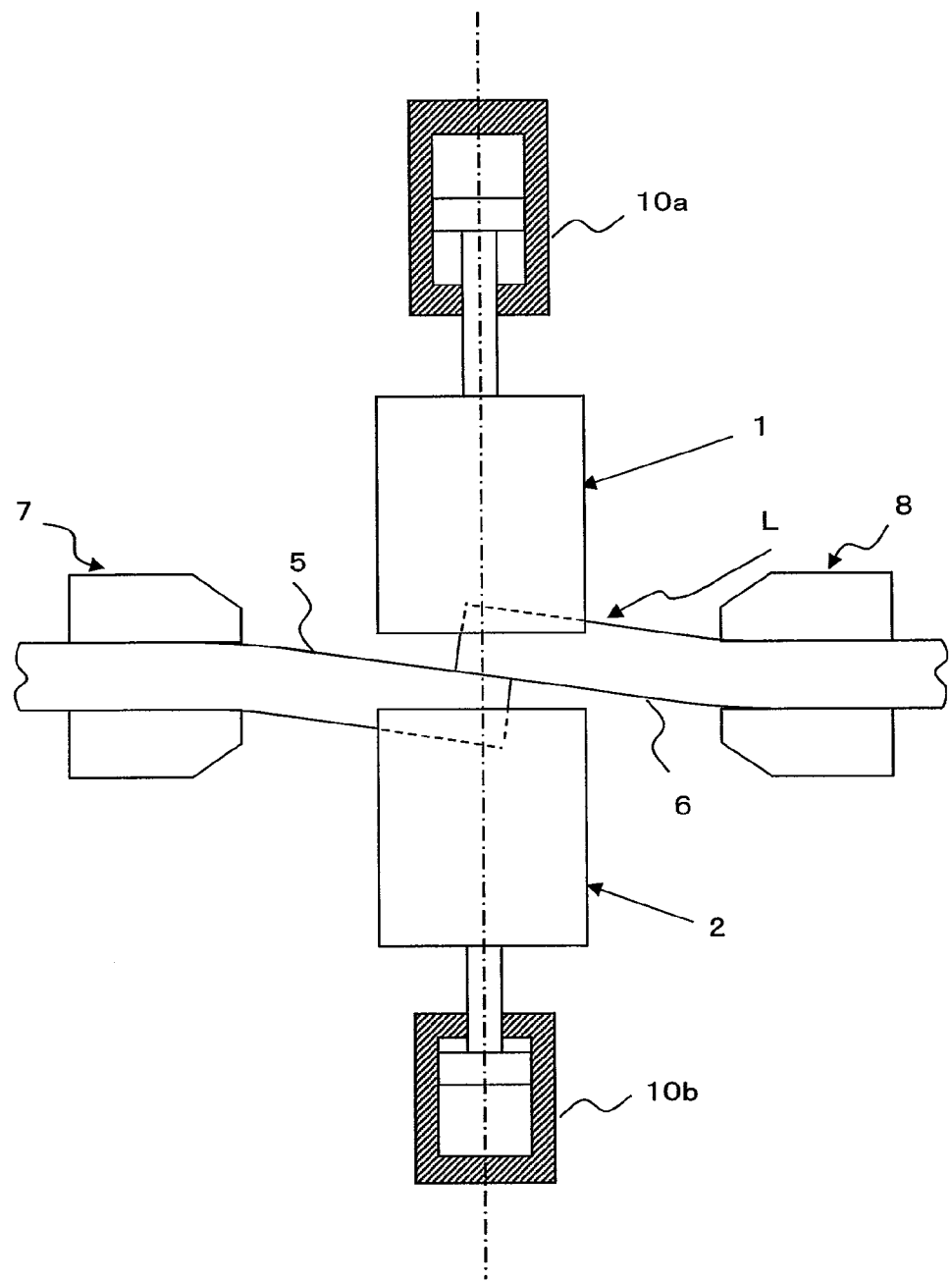
FIG. 8B is a view likewise showing a positional relationship between the electrode wheels and the overlapping portions of the metal plates when the upper electrode wheel moves down to a reference position.

FIG. 6 is a view showing a series of processes from the state in which the electrode wheels are located at waiting positions to completion of the joining in the mash seam welding method according to the first embodiment. FIG. 7 is a flowchart of the series of processes. FIG. 8A is a view showing a positional relationship between the electrode wheels and the overlapping portions of the metal plates when the upper and lower electrode wheels are located at the waiting positions. FIG. 8B is a view showing a positional relationship between the electrode wheels and the overlapping portions of the metal plates when the upper electrode wheel moves down to a reference position.

The two metal plates 5 and 6 are clamped by the clamp plates 7a and 7b of the first clamping device 7 and the clamp plates 8a and 8b of the second clamping device 8. After the metal plates 5 and 6 are clamped, the clamping device moving devices 111a and 111b move the clamping devices 7 and 8 so that the end portion of the metal plate 6 overlaps the upper surface of the end portion of the other metal plate 5 while being lifted upward by the clamping device tilting device 110 and maintained in the lifted state. After completion of the movements, the end portion of the metal plate 6 is moved down by the clamping device tilting device 110 and overlapped with the upper surface of the other metal plate 5. At this time, an overlap length of the end portions of the two metal plates 5 and 6 are determined in advance by the clamp control device 76 by using information transmitted from the host control device 71 including the types of the materials of the metal plates, the thicknesses of the metal plates and the widths of the metal plates.

As shown by STEP 1 of FIG. 6 and in FIG. 8A, before the starting of the mash seam welding, the upper and lower electrode wheels 1 and 2 are located at waiting positions (STEP 1 shown in FIG. 7). The waiting position of the upper electrode wheel 1 is a position in which the upper electrode wheel 1 does not contact the metal plates 5 and 6. The waiting position of the lower electrode wheel 2 is a position in which the upper end of the outer circumferential portion of the lower electrode wheel 2 (hereinafter referred to as upper surface of the electrode wheel 2 at need) matches the pass line.

The upper and lower electrode wheels 1 and 2 are moved in the direction in which the welding is progressed or joining direction, by moving the carriage frame 9 in the joining direction with the carriage frame control device 72 on the basis of a command to start welding from the host control device 71. The upper electrode wheel 1 is moved down from the waiting position to the reference position as indicated by STEPs 1 to 2 shown in FIG. 6 with respect to a lower end of an outer circumferential portion of the upper electrode wheel 1 (hereinafter referred to as lower surface of the electrode wheel 1 at need), while the carriage frame 9 is moved in the joining direction (STEPs 1 to 2 shown in FIG. 7). At this time, the descending speed is adjusted so that the lower surface of the upper electrode wheel 1 is brought into contact with the metal plate surface when the upper electrode wheel 1 reaches the joining starting end surfaces of the metal plates. The reference position is set in advance on the basis of the types of the materials of the metal plates 5 and 6 and the thicknesses of the metal plates 5 and 6 in the Mash seam control device 73. The reference position is determined to be higher than the upper surface of the lower metal plate 5 by a value ranging from a half of the thickness of the upper overlapped metal plate to a half of the increase amount of thickness of the joint portion material.

When the upper electrode wheel 1 reaches the reference position, the electrode wheels 1 and 2 are not brought into contact with the joining starting end surfaces of the metal plates 5 and 6. The positions of the electrode wheels in this state in the feed direction are called intermediate positions.

On the other hand, as shown in FIG. 8B, the lower electrode wheel 2 is held at a position in which the upper surface of the electrode wheel 2 matches the pass line. At this time, the lower surface of the upper electrode wheel 1 does not contact the upper surface of the lower electrode wheel 2 and a gap exists between the electrode wheels 1 and 2. As shown by STEP 2 shown in FIG. 6, when the upper electrode wheel 1 reaches the reference position, control is switched to retain the upper electrode wheel 1 at the reference position (STEP 2 shown in FIG. 7). In this state, the carriage frame 9 is further moved to the joining starting end surfaces (STEPs 2 to 3 shown in FIG. 7) as indicated by STEPs 2 to 3 shown in FIG. 7.

After the upper and lower electrode wheels 1 and 2 reach the joining starting end surfaces, control is switched to pressing force control at the timing described below.

The lower surface of the upper electrode wheel 1 and the upper surface of the lower electrode wheel 2 are brought into contact with the metal plates 5 and 6 so as to sandwich the metal plates therebetween at the joining starting end surfaces of the metal plates 5 and 6 of the overlapping portions L as indicated by STEP 3 shown in FIG. 6. For the upper electrode wheel 1, control is switched to the pressing force control in which constant welding force acts on the overlapping portion L when or immediately after the upper electrode wheel 1 contacts the metal plates 5 and 6 (STEP 3 shown in FIG. 7). The lower electrode wheel 2 is retained at the position in which the upper surface of the lower electrode wheel 2 matches the pass line. In STEPs 3 to 4 shown in FIG. 6, the welding (conduction) starts while the welding force is applied to the overlapping portions L by pressing the upper electrode wheel 1 with the pressing device 10a, so that the joining starting end surfaces are welded (STEPs 3 to 4 shown in FIG. 7). During this time, the upper electrode wheel 1 is moved by the pressing force control to a welding force balancing position. In STEP 4 shown in FIG. 6, when the welding of the joining starting end surfaces is completed, control for the lower electrode wheel 2 is also switched to the pressing force control in which constant welding force acts on the overlapping portions L (STEP 4 shown in FIG. 7). At this time, the pressing forces applied by the pressing devices 10a and 10b are controlled by the Mash seam control device 73 so that the welding forces acting on the metal plates 5 and 6 are equal to each other and a required welding force for the mash seam welding is attained.

After that, as shown by STEPs 4 to 5 of FIG. 6 and in FIGS. 5A to 5E, the upper and lower electrode wheels 1 and 2 continue to weld up to joining finishing end surfaces (mash seam welding finishing position) in the state of the pressing force control (STEPs 4 to 5 shown in FIG. 7). The control performed during this period is such as described above as the features of the present embodiment, and the upper and lower electrode wheels 1 and 2 weld the overlapping portions L of the metal plates 5 and 6 in the manner of vertical symmetry while maintaining the welding force balancing positions. In STEP 5 shown in FIG. 6, just before the electrode wheels reach mash seam welding finishing positions, control is switched to position maintaining control to maintain the positions of the upper and lower electrode wheels at that time and the electrode wheels are controlled to pass through the mash seam welding finishing position (STEP 5 shown in FIG. 7).

With such features, the joint conditions for the upper and lower portions of the joint portion are equalized as described above, and the joint portion is formed in a vertically symmetrical shape, so that increase in the stress concentration factors of the steps of the joint portion can be suppressed. In addition, it is possible to equalize the amounts of heat input to the solid-state joint portions B1 and B2 formed at positions of point-symmetry about the center of the joint portion, thereby increasing the joint strength and enhancing the reliability of the joint portion.

Here, in the present invention, in addition to the upper electrode wheel 1, the lower electrode wheel 2 is also moved in the vertical direction by the pressing force control and the pressing force control is performed such that the welding forces acting on the metal plates 5 and 6 are equal to each other and a required welding force for the mash seam welding is attained. Resultantly, a new problem arises.

The new problem is such that when the welding force as set is so high for the rigidities of the metal plates, the positions of the upper and lower electrode wheels are not determined at the time of starting of the joining, and the materials to be joined are lifted up so that the joining cannot be started. The new problem is noticeable when the metal plates have small thicknesses. In the present embodiment, in order to solve such a problem, the position of the lower electrode wheel is rendered to the position maintaining control at the time of welding of the joining starting end surfaces until the welding is completed, and after desired rigidity of the materials is obtained, the pressing force control is performed such that the welding forces acting on the metal plates are equal to each other and a required welding force for the mash seam welding is attained. With such features, it is possible to prevent the situation that the positions of the upper and lower electrode wheels are not determined at the time of starting of the joining and the materials to be joined are lifted up so that the joining cannot be started. In addition, since the portions near the joining starting end surfaces are welded and the vertical positions of the metal plates 5 and 6 in the overlapping portions L are determined, it is possible to perform welding thereafter stably.

The aforementioned processes are summarized as follows.

The electrode wheel (2) that is one of the pair of upper and lower electrode wheels (1, 2) is set at a first position (pass line position) in which the end of the outer circumferential portion of the electrode wheel (2) on the side of the overlapping portions (L) is located near a plane extending from metal plate clamping surfaces of the first and second clamping devices on the side of the one electrode wheel (2), and the other electrode wheel (1) is set at a second position (waiting position) in which the end of the outer circumferential portion of the electrode wheel (1) on the side of the overlapping portions (L) is located far from a plane extending from metal plate clamping surfaces of the first and second clamping devices on the side of the other electrode wheel (1). Further, the electrode wheel (2) that is one of the pair of upper and lower electrode wheels (1, 2) is controlled such that the one electrode wheel (2) is fed by position control to maintain the first position and brought into contact with joining end surfaces of the overlapping portions (L) and welding is started, and after the joining end surfaces are welded, control is switched to pressing force control, and the other electrode wheel (1) is controlled such that the other electrode wheel (1) is fed by position control to move from the second position to a position (reference position) enabling the metal plate of the overlapping portion (L) to be pressed and then is fed by position control to maintain that position and brought into contact with the joining end surfaces of the overlapping portions, and when or immediately after the other electrode wheel contacts the joining end surface, control is switched to pressing force control and welding is started, and after the joining end surfaces are welded, the one electrode wheel (2) and the other electrode wheel (1) are fed while being synchronized with each other, and during the feeding, the pressing force controls are performed so that the upper and lower welding forces acting upon the overlapping portions are equal to each other.

A welding process of a mash seam welding method according to a second embodiment of the present invention that solves the aforementioned problems is described with reference to FIGS. 9 to 11C and 5A to 5E.

Figure 9:
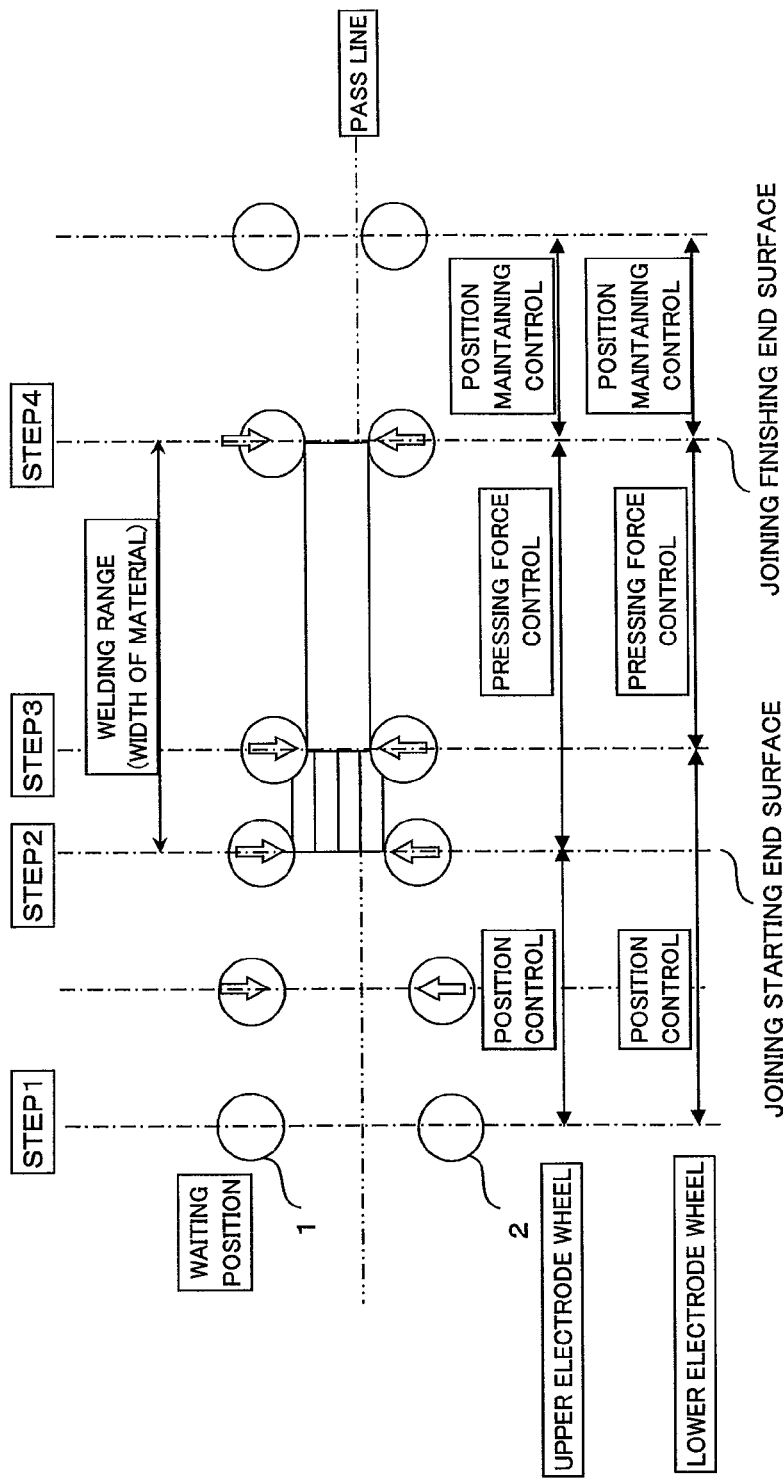
FIG. 9 is a view showing a series of processes from the state in which the electrode wheels are located at waiting positions to completion of the joining in a mash seam welding method according to a second embodiment of the present invention.
Figure 10:
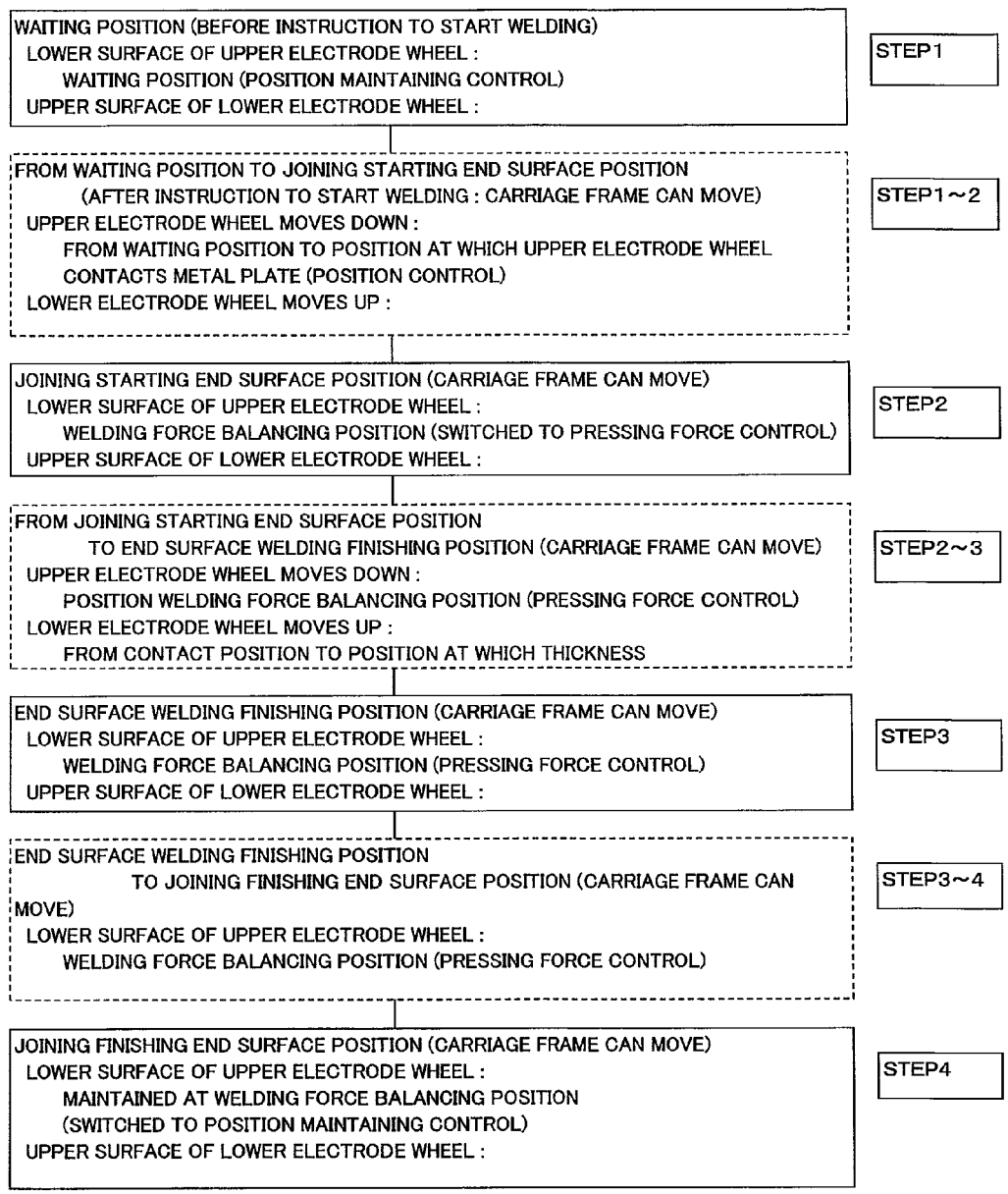
FIG. 10 is a flowchart showing the series of processes likewise.
Figure 11A:
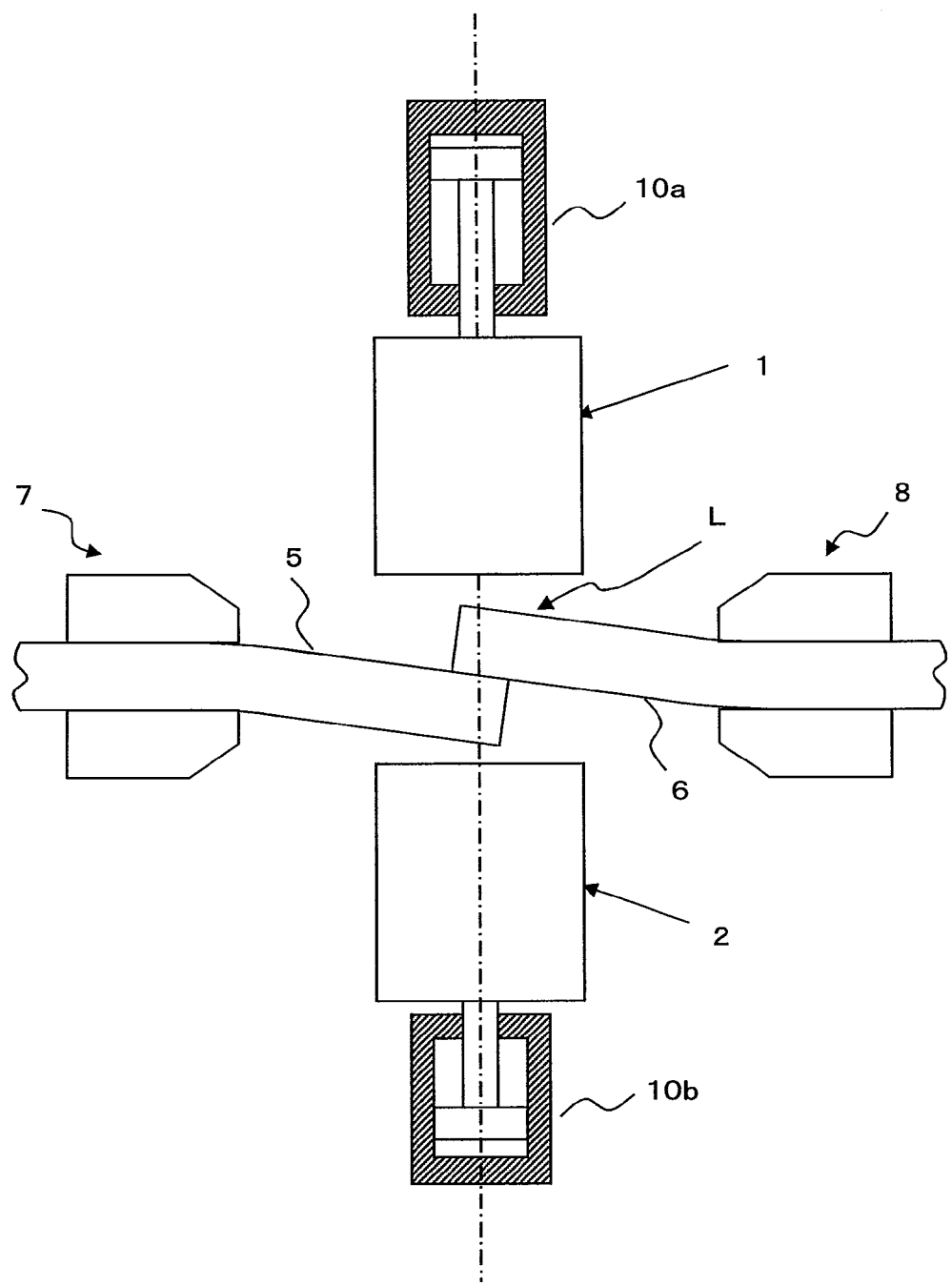
FIG. 11A is a view likewise showing a positional relationship between the electrode wheels and the overlapping portions of the metal plates when the upper and lower electrode wheels are located at the waiting positions.
Figure 11B:
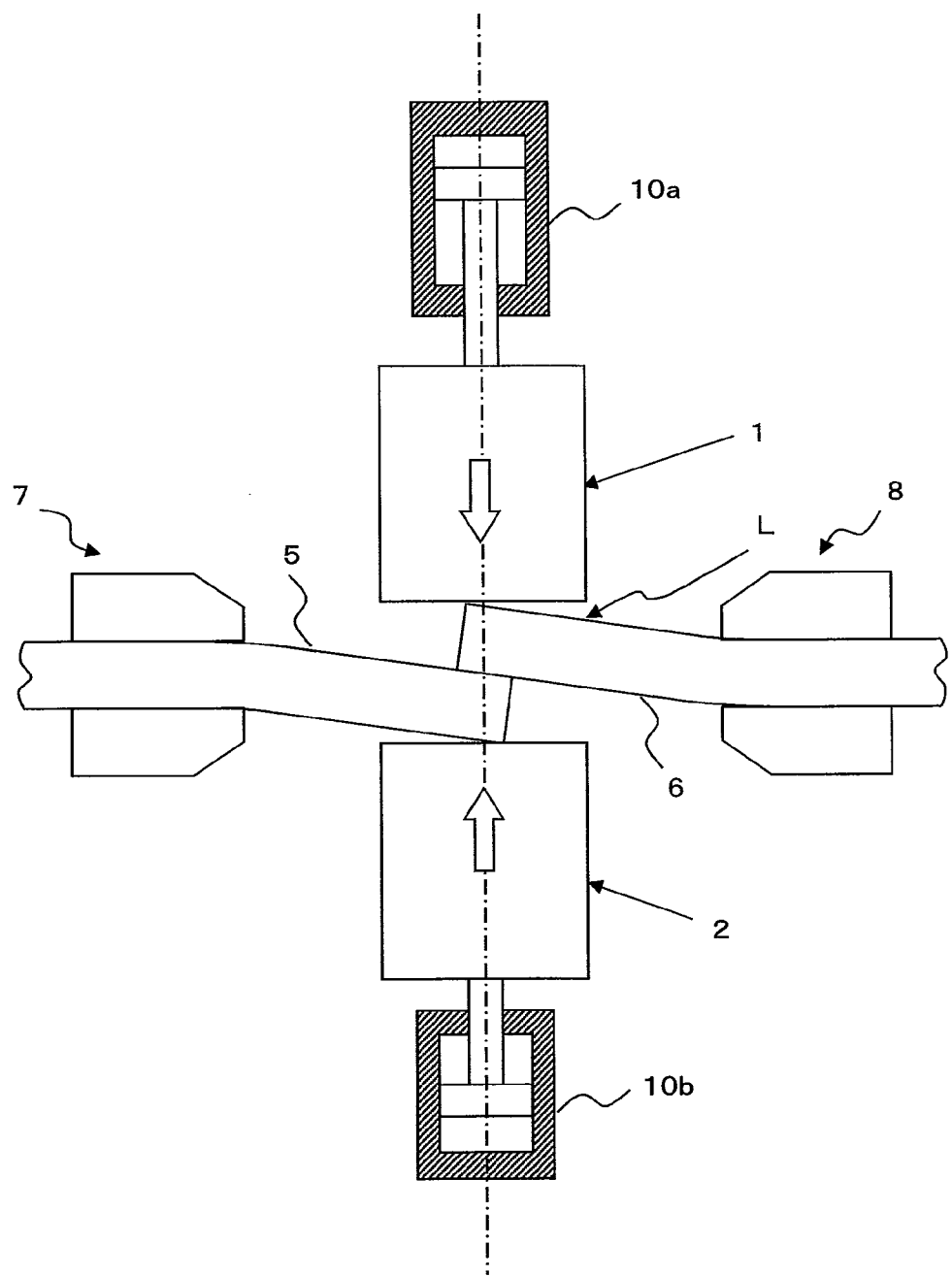
FIG. 11B is a view likewise showing a positional relationship between the electrode wheels and the overlapping portions of the metal plates when the upper and lower electrode wheels move down to positions at which the upper and lower electrode wheels contact the joining starting end surfaces of the metal plates.
Figure 11C:
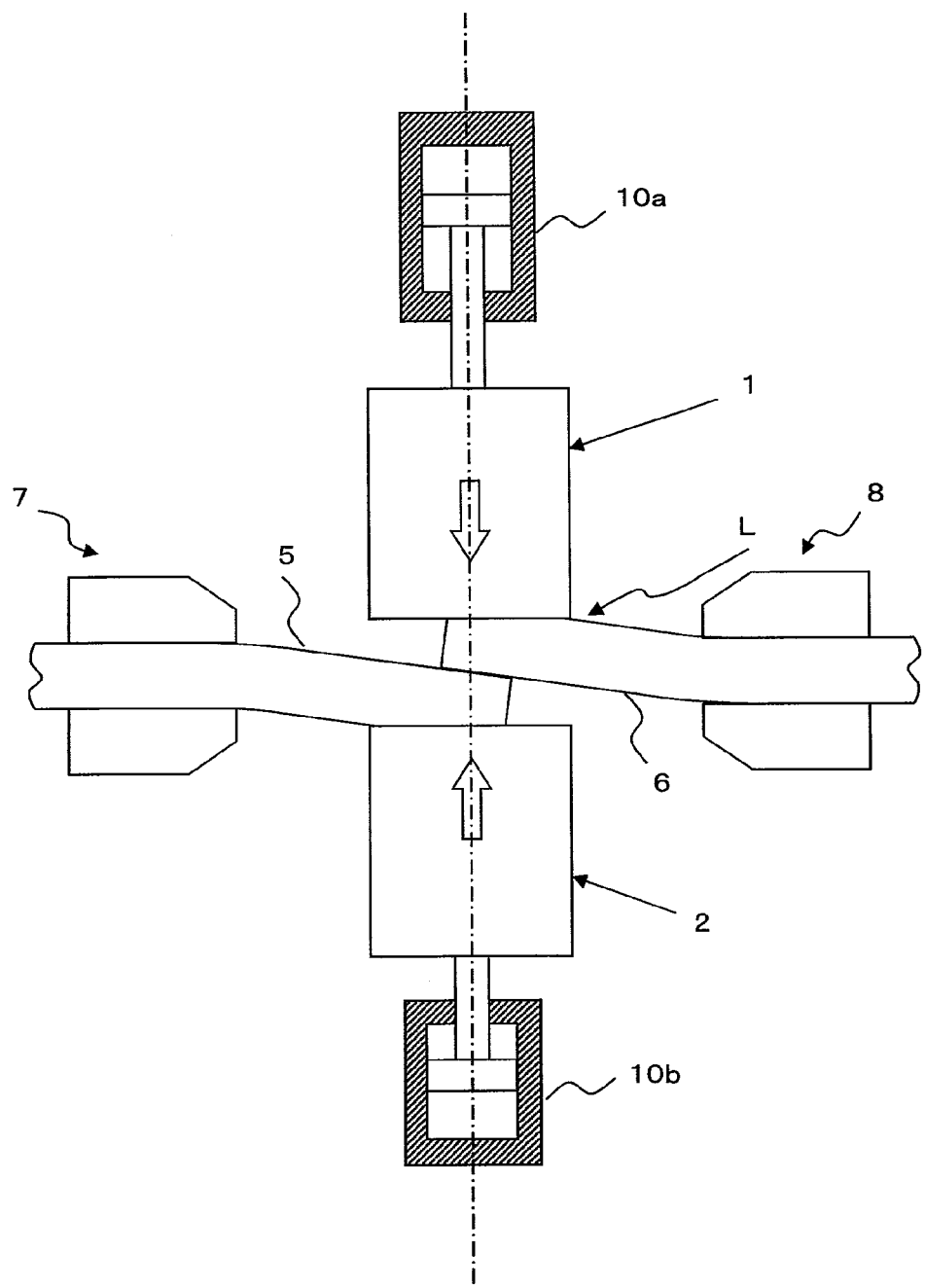
FIG. 11C is a view likewise showing a positional relationship between the electrode wheels and the overlapping portions of the metal plates after the upper and lower electrode wheels press the joining starting end surfaces of the metal plates and immediately before the welding starts.

FIG. 9 is a view showing a series of processes from the state in which the electrode wheels are located at waiting position to completion of the joining in the mash seam welding method according to the second embodiment. FIG. 10 is a flowchart of the series of processes. FIG. 11A is a view showing a positional relationship between the electrode wheels and the overlapping portions of the metal plates when the upper and lower electrode wheels are located at the waiting positions. FIG. 11B is a view showing a positional relationship between the electrode wheels and the overlapping portions of the metal plates when the upper and lower electrode wheels move down to positions at which the upper and lower electrode wheels contact the joining starting end surfaces of the metal plates. FIG. 11C is a view showing a positional relationship between the electrode wheels and the overlapping portions of the metal plates after the upper and lower electrode wheels press the joining starting end surfaces of the metal plates and immediately before the welding starts.

As shown by STEP 1 of FIG. 9 and in FIG. 11A, before the starting of the mash seam welding, the upper and lower electrode wheels 1 and 2 are located at waiting positions (STEP 1 shown in FIG. 10). The waiting positions of the upper and lower electrode wheels 1 and 2 are positions in which the upper and lower electrode wheels 1 and 2 do not contact the metal plates 5 and 6. Although not shown, the waiting position of the lower electrode wheel 2 may be such that the upper surface of the lower electrode wheel 2 is located at a position (reference position) higher than the lower surface of the lower metal plate 5 by a value ranging from a half of the thickness of the upper overlapped metal plate to a half of the increase amount of thickness of the joint portion material, the reference position being set in advance on the basis of the types of the materials of the metal plates 5 and 6 and the thicknesses of the metal plates 5 and 6 in the Mash seam control device 73.

The upper and lower electrode wheels 1 and 2 are moved in the direction in which the welding is progressed or joining direction, by moving the carriage frame 9 in the joining direction with the carriage frame control device 72 on the basis of a command to start welding from the host control device 71. The upper electrode wheel 1 is moved down from the waiting position as indicated by STEPs 1 to 2 shown in FIG. 9 with respect to the lower surface of the electrode wheel 1, while the carriage frame 9 is moved in the joining direction and the descending speed is adjusted so that the lower surface of the upper electrode wheel 1 is brought into contact with the metal plate surface at the joining starting end surfaces of the metal plates 5 and 6 (STEPs 1 to 2 shown in FIG. 10). Simultaneously, the lower electrode wheel 2 is move up and the ascending speed of the lower electrode wheel 2 is adjusted so that the upper surface of the lower electrode wheel 2 is brought into contact with the end surface of the metal plate at the joining starting end surface of the metal plates 5 and 6. The adjustment of the speeds of the upper and lower electrode wheels 1 and 2 is performed by changing pressing forces applied by the pressing devices 10a and 10b to control the positions of the electrode wheels 1 and 2. In this state, the carriage frame 9 is moved from the waiting positions to the joining starting end surfaces. With such features, it is possible to reduce the occurrence of scratch and wear of the electrode wheels caused by the metal plates at the joining starting end surfaces.

After the upper and lower electrode wheels 1 and 2 reach the joining starting end surfaces, control is switched to pressing force control at the timing described below.

The lower surface of the upper electrode wheel 1 and the upper surface of the lower electrode wheel 2 are bought into contact with the metal plates 5 and 6 so as to sandwich the metal plates therebetween at the joining starting end surfaces of the metal plates 5 and 6 of the overlapping portions L as indicated by STEP 2 shown in FIG. 9 and FIG. 11B. For the upper electrode wheel 1, control is switched to the pressing force control in which constant welding force acts on the overlapping portion L when or immediately after the upper electrode wheel 1 contacts the metal plates 5 and 6 (STEP 2 shown in FIG. 10). At this time, for the lower electrode wheel 2, the position control is maintained, but an increment of the position control is changed so that the ascending speed is reduced. In STEPs 2 to 3 shown in FIG. 9 and FIG. 11C, the welding (conduction) starts while the welding force is applied to the overlapping portions L by pressing the upper electrode wheel 1 with the pressing device 10a, so that the joining starting end surfaces are welded (STEPs 2 to 3 shown in FIG. 10). During this time, the upper electrode wheel 1 is moved by the pressing force control to a welding force balancing position. The lower electrode wheel 2 is moved to the reference position (position lower than the lower surface of the lower metal plate 5 by a value ranging from a half of the thickness of the upper overlapped metal plate to a half of the increase amount of thickness of the joint portion material).

In STEP 3 shown in FIG. 10, when the welding of the joining starting end surfaces is completed, control for the lower electrode wheel 2 is also switched to the pressing force control in which constant welding force acts on the overlapping portions L (STEP 3 shown in FIG. 10). At this time, the pressing forces applied to the upper and lower electrode wheels 1 and 2 by the pressing devices 10a and 10b are controlled by the Mash seam control device 73 so that the welding forces acting on the metal plates 5 and 6 are equal to each other and a required welding force for the mash seam welding is attained.

After that, as shown by STEPs 3 to 4 of FIG. 9 and in FIGS. 5A to 5E, the upper and lower electrode wheels 1 and 2 continue to weld up to joining finishing end surfaces (mash seam welding finishing position) in the state of the pressing force control (STEPs 3 to 4 shown in FIG. 10). The control performed during this period is such as described above as the features of the present embodiment, and the upper and lower electrode wheels 1 and 2 weld the overlapping portions L of the metal plates 5 and 6 in the manner of vertical symmetry while maintaining the welding force balancing positions. In STEP 4 shown in FIG. 9, just before the electrode wheels reach mash seam welding finishing positions, control is switched to position maintaining control to maintain the positions of the upper and lower electrode wheels at that time and the electrode wheels are controlled to pass through the mash seam welding finishing position (STEP 4 shown in FIG. 10).

With such features, the joint conditions for the upper and lower portions of the joint portion are equalized as described above, and the joint portion is formed in a vertically symmetrical shape, so that increase in the stress concentration factors of the steps of the joint portion can be suppressed. In addition, it is possible to equalize the amounts of heat input to the solid-state joint portions B1 and B2 formed at positions of point-symmetry about the center of the joint portion, thereby increasing the joint strength and enhancing the reliability of the joint portion.

In addition, it is possible to prevent the situation that the positions of the upper and lower electrode wheels are not determined at the time of starting of the joining and the materials to be joined are lifted up so that the joining cannot be started, and further since the portions near the joining starting end surfaces are welded and the vertical positions of the metal plates 5 and 6 in the overlapping portions L are determined, it is possible to perform welding thereafter stably.

The aforementioned processes are summarized as follows.

The electrode wheel (2) that is one of the pair of upper and lower electrode wheels (1, 2) is set at a first position (waiting position) in which the end of the outer circumferential portion of the electrode wheel (2) on the side of the overlapping portions (L) is located far from a plane extending from metal plate clamping surfaces of the first and second clamping devices on the side of the one electrode wheel (2), and the other electrode wheel (1) is set at a second position (waiting position) in which the end of the outer circumferential portion of the electrode wheel (1) on the side of the overlapping portions (L) is located far from the plane extending from metal plate clamping surfaces of the first and second clamping devices on the side of the other electrode wheel (1). Further, the electrode wheel (2) that is one of the pair of upper and lower electrode wheels (1, 2) is controlled such that the one electrode wheel (2) is fed by position control while being moved from the first position in a pressing direction and brought into contact with joining end surfaces of the overlapping portions (L) and welding is started, and after the joining end surfaces are welded, control is switched to pressing force control, and the other electrode wheel (1) is controlled such that the other electrode wheel (1) is fed by position control while being moved from the first position in a pressing direction and brought into contact with the joining end surfaces of the overlapping portions, and when or immediately after the other electrode wheel contacts the joining end surface, control is switched to pressing force control and welding is started, and after the joining end surfaces are welded, the one electrode wheel (2) and the other electrode wheel (1) are fed while being synchronized with each other, and during the feeding, the pressing force controls are performed so that the upper and lower welding forces acting upon the overlapping portions are equal to each other.

A welding process of a mash seam welding method according to a third embodiment of the present invention that solves the aforementioned problems is described with reference to FIGS. 12 to 14C and 5A to 5E.

Figure 12:
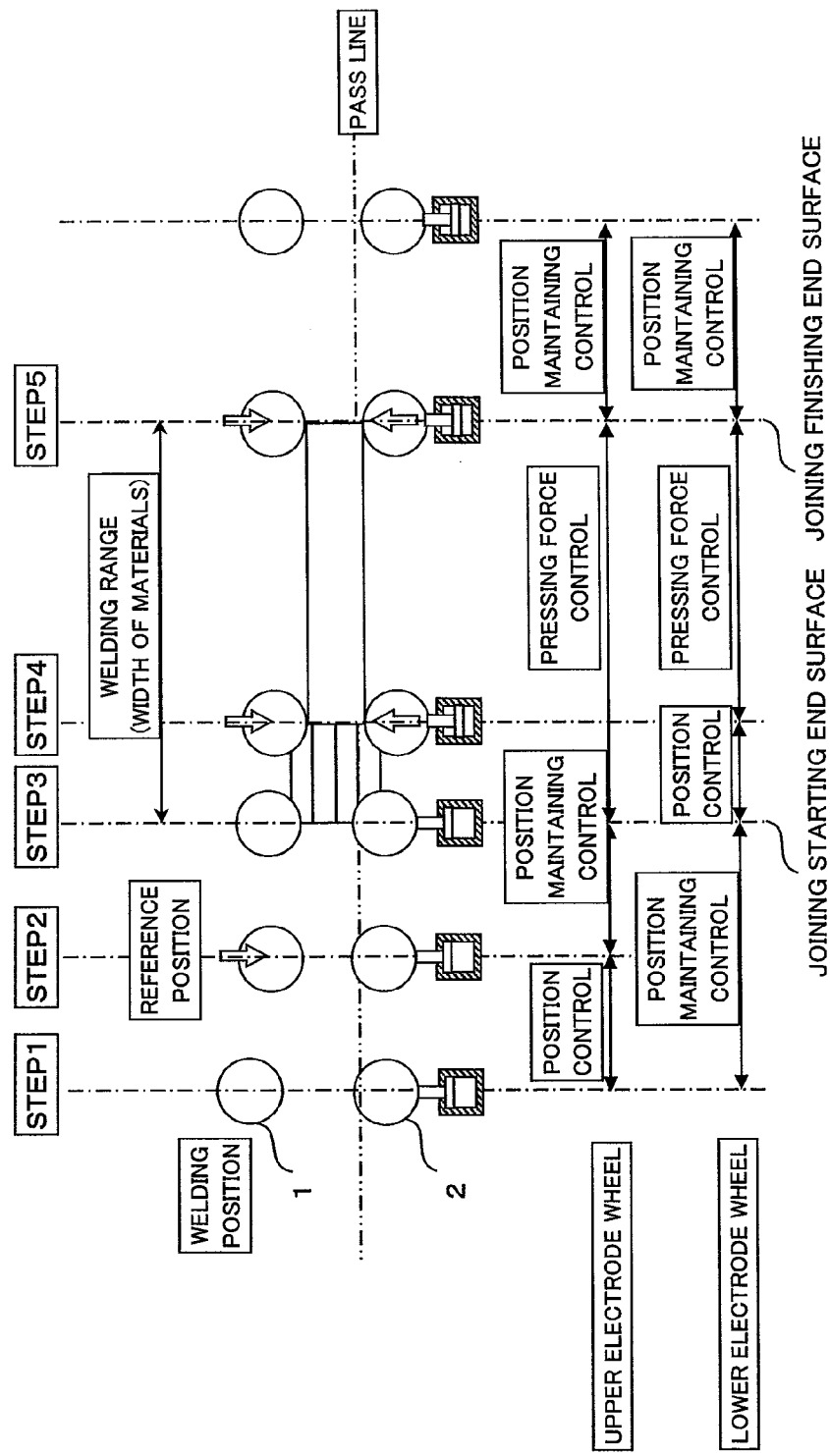
FIG. 12 is a view showing a series of processes from the state in which the electrode wheels are located at waiting positions to completion of the joining in a mash seam welding method according to a third embodiment of the present invention.
Figure 13:
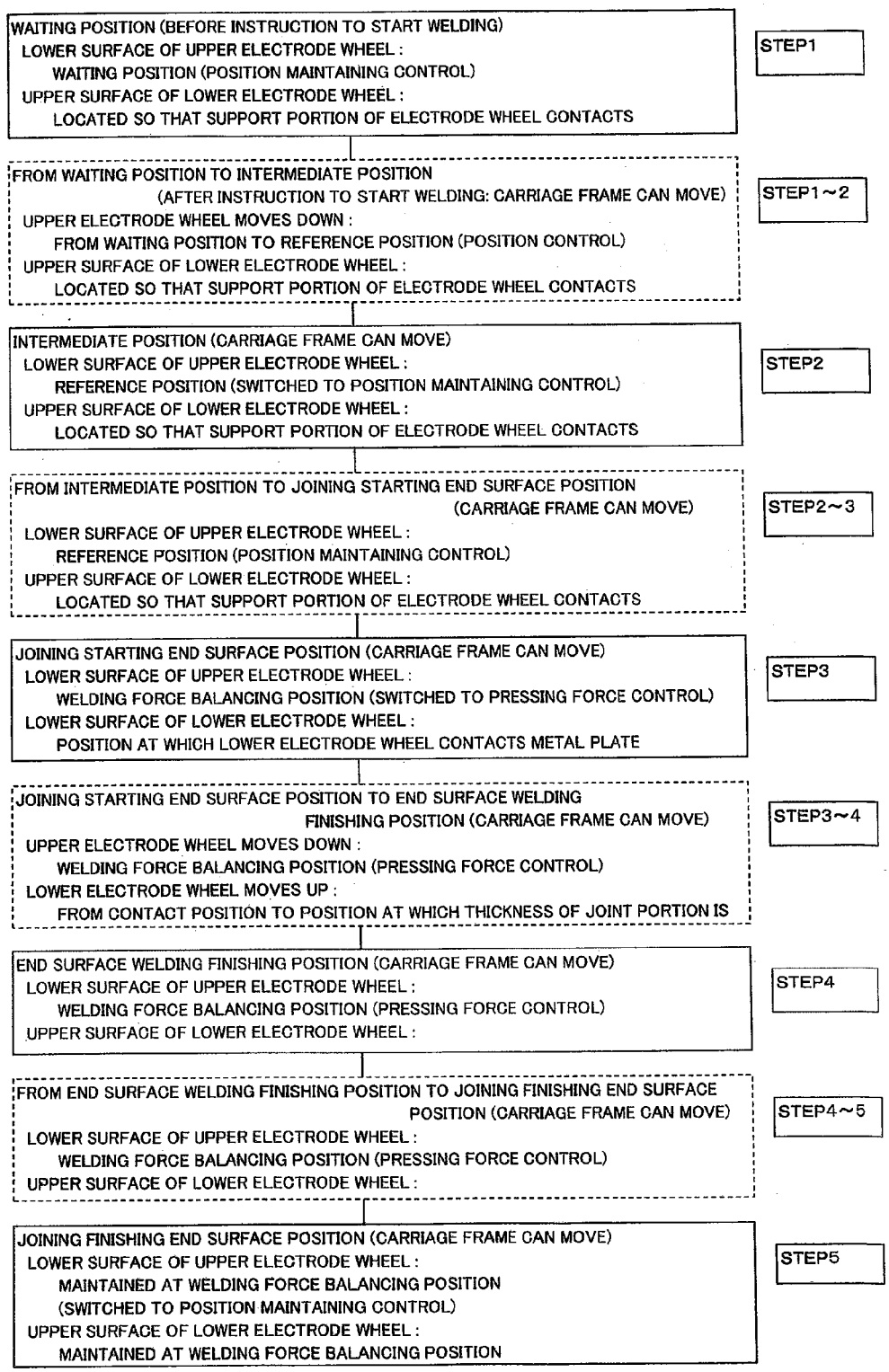
FIG. 13 is a flowchart showing the series of processes likewise.
Figure 14A:
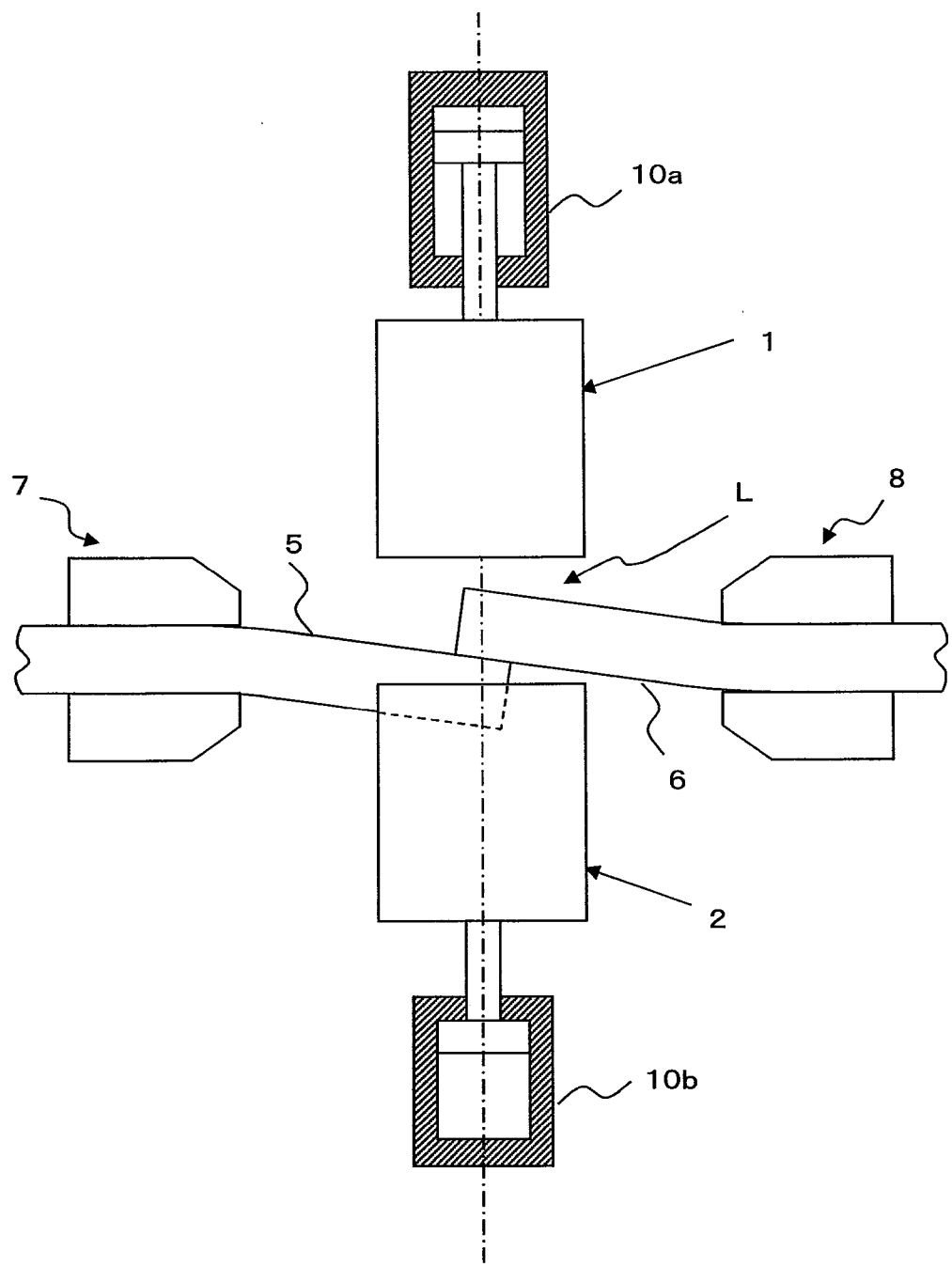
FIG. 14A is a view likewise showing a positional relationship between the electrode wheels and the overlapping portions of the metal plates when the upper and lower electrode wheels are located at the waiting positions.
Figure 14B:
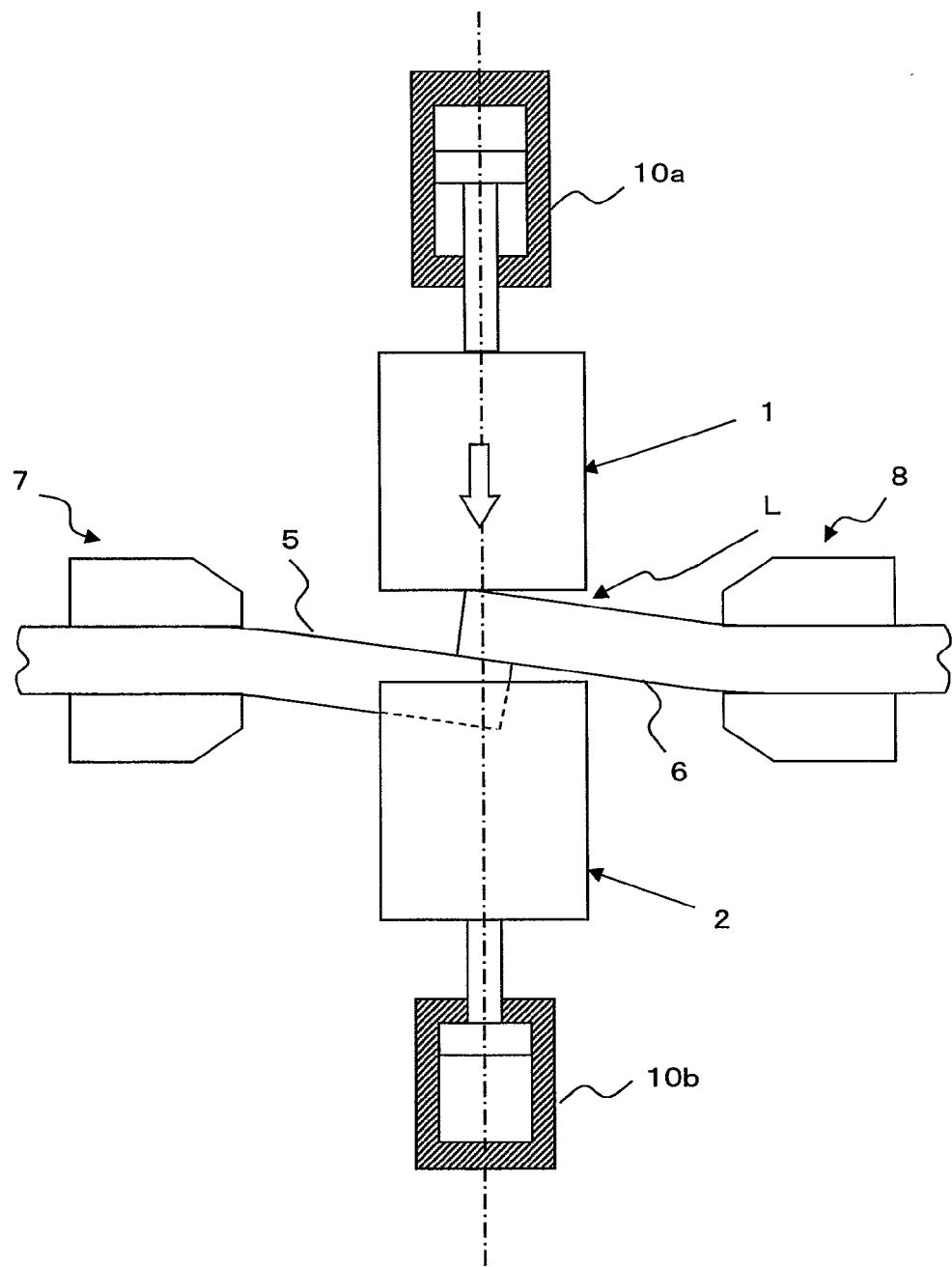
FIG. 14B is a view likewise showing a positional relationship between the electrode wheels and the overlapping portions of the metal plates when the upper electrode wheel moves down to a reference position.
Figure 14C:
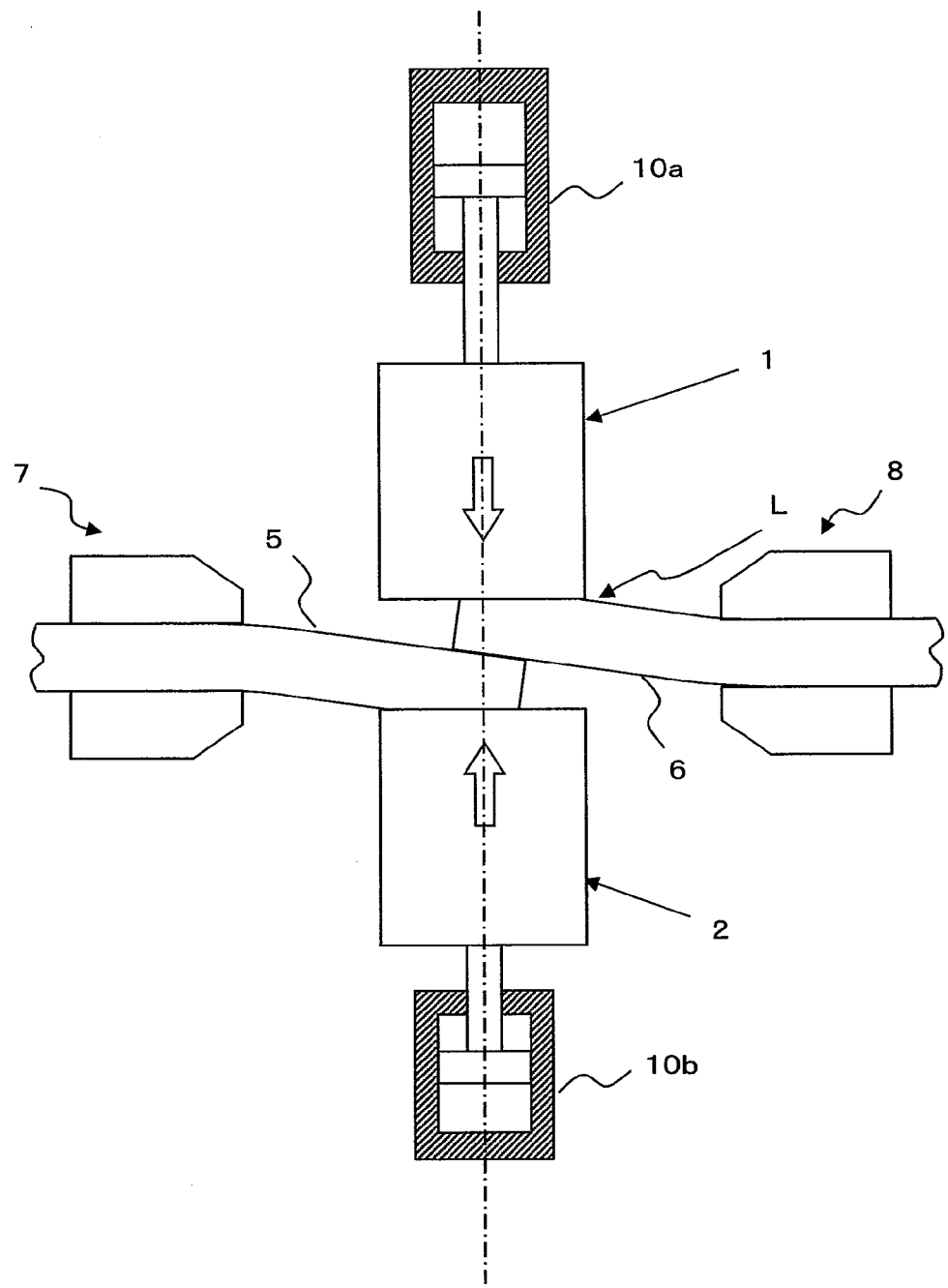
FIG. 14C is a view likewise showing a positional relationship between the electrode wheels and the overlapping portions of the metal plates after the upper and lower electrode wheels press the joining starting end surfaces of the metal plates and immediately before the welding start.

FIG. 12 is a view showing a series of processes from the state in which the electrode wheels are located at waiting positions to completion of the joining in the mash seam welding method according to the third embodiment. FIG. 13 is a flowchart of the series of processes. FIG. 14A is a view showing a positional relationship between the electrode wheels and the overlapping portions of the metal plates when the upper and lower electrode wheels are located at the waiting positions. FIG. 14B is a view showing a positional relationship between the electrode wheels and the overlapping portions of the metal plates when the upper electrode wheel moves down to the reference position. FIG. 14C is a view showing a positional relationship between the electrode wheels and the overlapping portions of the metal plates after the upper and lower electrode wheels press the joining starting end surfaces of the metal plates and immediately before the welding start.

As shown by STEP 1 of FIG. 12 and in FIG. 14A, before the starting of the mash seam welding, the upper and lower electrode wheels 1 and 2 are located at waiting positions (STEP 1 shown in FIG. 13). The waiting position of the upper electrode wheel 1 is a position in which the upper electrode wheel 1 does not contact the metal plates 5 and 6. The waiting position of the lower electrode wheel 2 is a position in which a support portion of the lower electrode wheel 2 is urged against a stroke end (machine fixed end) of the cylinder device 10b that is the electrode wheel pressing device. Here, the position of the upper surface of the lower electrode wheel 2 is changed depending on the diameter of the lower electrode wheel 2. The lower electrode wheel is periodically ground to suppress joint failure due to scratches and uneven wear on the electrode wheel surface during welding until the use limit of the electrode wheel is reached. The grinding of the lower electrode wheel 2 reduces the diameter thereof. In the example shown in the drawings, the lower electrode wheel 2 is not ground so much, and the diameter of the lower electrode wheel is relatively large. As a result, the upper surface of the lower electrode wheel 2 exceeds the pass line and protrudes upward from the pass line. The position of the upper surface of the lower electrode wheel 2 is maintained to exceed the pass line by urging the support portion of the lower electrode wheel 2 against the stroke end (machine fixed end) of the cylinder device 10b.

A change of the position of the upper surface of the lower electrode wheel 2 caused by the change in the diameter of the lower electrode wheel 2 due to the grinding of the lower electrode wheel 2, may be regularly corrected by the worm jack 120 (see FIGS. 1 and 2) arranged beneath the cylinder device 10b, whereby the upper surface of the lower electrode wheel 2 is located at a desired position, for example, a pass line position, while the support portion of the lower electrode wheel 2 is urged against the stroke end of the cylinder device 10b.

The upper and lower electrode wheels 1 and 2 are moved in the direction in which the welding is progressed or joining direction, by moving the carriage frame 9 in the joining direction with the carriage frame control device 72 on the basis of a command to start welding from the host control device 71. The upper electrode wheel 1 is moved down from the waiting position to the reference position as indicated by STEPs 1 to 2 shown in FIG. 12 with respect to a lower surface of the upper electrode wheel 1, while the carriage frame 9 is moved in the joining direction (STEPs 1 to 2 shown in FIG. 13). At this time, the descending speed is adjusted so that the lower surface of the upper electrode wheel 1 is brought into contact with the metal plate surface when the upper electrode wheel 1 reaches the joining starting end surfaces of the metal plates. As explained before, the reference position is determined to be higher than the upper surface of the lower metal plate 5 by a value ranging from a half of the thickness of the upper overlapped metal plate to a half of the increase amount of thickness of the joint portion material.

When the upper electrode wheel 1 reaches the reference position, the electrode wheels 1 and 2 are not brought into contact with the joining starting end surfaces of the metal plates 5 and 6. The positions of the electrode wheels in this state in the feed direction are called intermediate positions.

On the other hand, as shown in FIG. 14B, the lower electrode wheel 2 is controlled such that the upper surface thereof is maintained by the pressing force control and urging the support portion of the electrode wheel 2 against the machine fixed end. As shown by STEP 2 shown in FIG. 12, when the upper electrode wheel 1 reaches the reference position, control is switched to retain the upper electrode wheel 1 at the reference position (STEP 2 shown in FIG. 13). In this state, the carriage frame 9 is further moved to the joining starting end surfaces (STEPs 2 to 3 shown in FIG. 13) as indicated by STEPs 2 to 3 shown in FIG. 12.

After the upper and lower electrode wheels 1 and 2 reach the joining starting end surfaces, control is switched to pressing force control at the timing described below.

The lower surface of the upper electrode wheel 1 and the upper surface of the lower electrode wheel 2 are brought into contact with the metal plates 5 and 6 so as to sandwich the metal plates therebetween at the joining starting end surfaces of the metal plates 5 and 6 of the overlapping portions L as indicated by STEP 3 shown in FIG. 12. For the upper electrode wheel 1, control is switched to the pressing force control in which constant welding force acts on the overlapping portion L when or immediately after the upper electrode wheel 1 contacts the metal plates 5 and 6 (STEP 3 shown in FIG. 13). At this time, for the lower electrode wheel 2, control is switched to the position control to force down the support portion of the lower electrode wheel 2 from the machine fixed end. In STEPs 3 to 4 shown in FIG. 14C, the welding (conduction) starts while the welding force is applied to the overlapping portions L by pressing the upper electrode wheel 1 with the pressing device 10a, so that the joining starting end surfaces are welded (STEPs 3 to 4 shown in FIG. 13). During this time, the upper electrode wheel 1 is moved by the pressing force control to a welding force balancing position. The lower electrode wheel 2 is moved to the reference position (position lower than the lower surface of the lower metal plate 5 by a value ranging from a half of the thickness of the upper overlapped metal plate to a half of the increase amount of thickness of the joint portion material) by the position control.

In STEP 4 shown in FIG. 12, when the welding of the joining starting end surfaces is completed, control for the lower electrode wheel 2 is also switched to the pressing force control in which constant welding force acts on the overlapping portions L (STEP 4 shown in FIG. 13). At this time, the pressing forces applied to the upper and lower electrode wheels 1 and 2 by the pressing devices 10a and 10b are controlled by the Mash seam control device 73 so that the welding forces acting on the metal plates 5 and 6 are equal to each other and a required welding force for the mash seam welding is attained.

After that, as shown by STEPs 4 to 5 of FIG. 12 and in FIGS. 5A to 5E, the upper and lower electrode wheels 1 and 2 continue to weld up to joining finishing end surfaces (mash seam welding finishing position) in the state of the pressing force control (STEPs 4 to 5 shown in FIG. 13). The control performed during this period is such as described above as the features of the present embodiment, and the upper and lower electrode wheels 1 and 2 weld the overlapping portions L of the metal plates 5 and 6 in the manner of vertical symmetry while maintaining the welding force balancing positions. In STEP 5 shown in FIG. 12, just before the electrode wheels reach mash seam welding finishing positions, control is switched to position maintaining control to maintain the positions of the upper and lower electrode wheels at that time and the electrode wheels are controlled to pass through the mash seam welding finishing position (STEP 4 shown in FIG. 10).

With such features, the joint conditions for the upper and lower portions of the joint portion are equalized as described above, and the joint portion is formed in a vertically symmetrical shape, so that increase in the stress concentration factors of the steps of the joint portion can be suppressed. In addition, it is possible to equalize the amounts of heat input to the solid-state joint portions B1 and B2 formed at positions of point-symmetry about the center of the joint portion, thereby increasing the joint strength and enhancing the reliability of the joint portion.

In addition, it is possible to prevent the situation that the positions of the upper and lower electrode wheels are not determined at the time of starting of the joining and the materials to be joined are lifted up so that the joining cannot be started, and further since the portions near the joining starting end surfaces are welded and the vertical positions of the metal plates 5 and 6 in the overlapping portions L are determined, it is possible to perform welding thereafter stably.

In the third embodiment, since initial load can be imparted to the electrode wheel 2 by starting the joining while the support portion of the lower electrode wheel 2 is pressurized and urged against the machine fixed end (stroke end), a variation in load applied to the overlapping portions L by the position control using pressing force at the lower electrode wheel 2 can be significantly suppressed at the time around when the upper and lower electrode wheels 1 and 2 catches up the overlapping portions L of the metal plates therebetween and the pressing force from the upper electrode wheel 1 is applied to the overlapping portions L, so that the accuracy of setting the positions of the electrode wheels at the starting time of the welding can be ensured. In addition, immediately after the welding of the joining starting end surfaces is completed, control for the lower electrode wheel 2 is also switched to the pressing force control, and then the support portion of the lower electrode wheel 2 that was urged against the machine fixed end is cleared away from the machine fixed end by the force balancing, so that the pressing forces applied by the upper and lower electrode wheels are automatically adjusted. This enables the upper and lower welding forces acting on the overlapping portions L to be equalized from the starting of welding after the welding of the joining starting end surfaces is completed, thereby increasing the joint strength and enhancing the reliability of the joint portion.

Figure 15A:
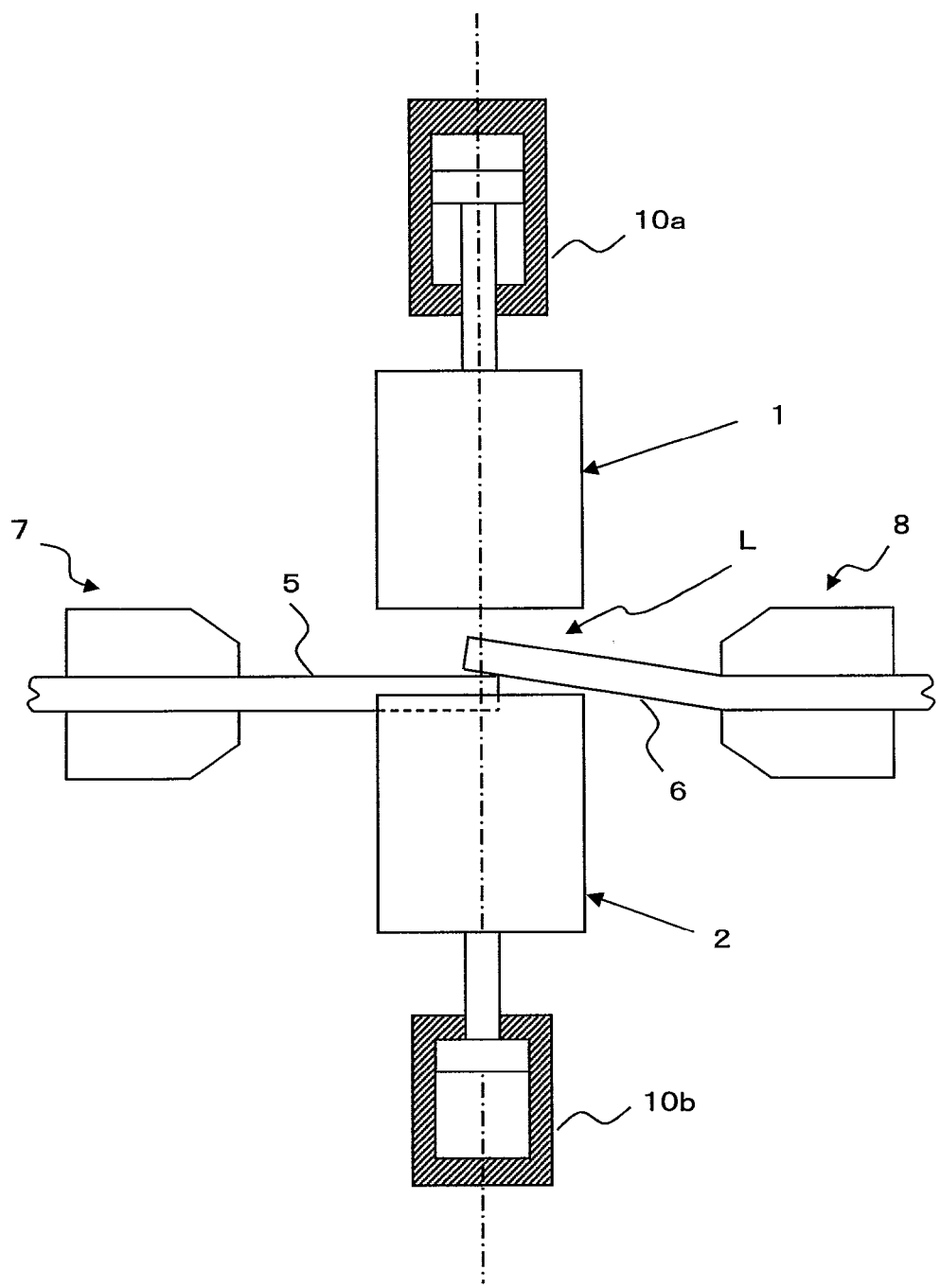
FIG. 15A is a view showing a positional relationship between the electrode wheels and the metal plates of the overlapping portions when the third embodiment is applied to the metal plates that have thicknesses of 2 mm or less and low rigidity, and showing the positional relationship when the upper and lower electrode wheels are located at the waiting positions.
Figure 15B:
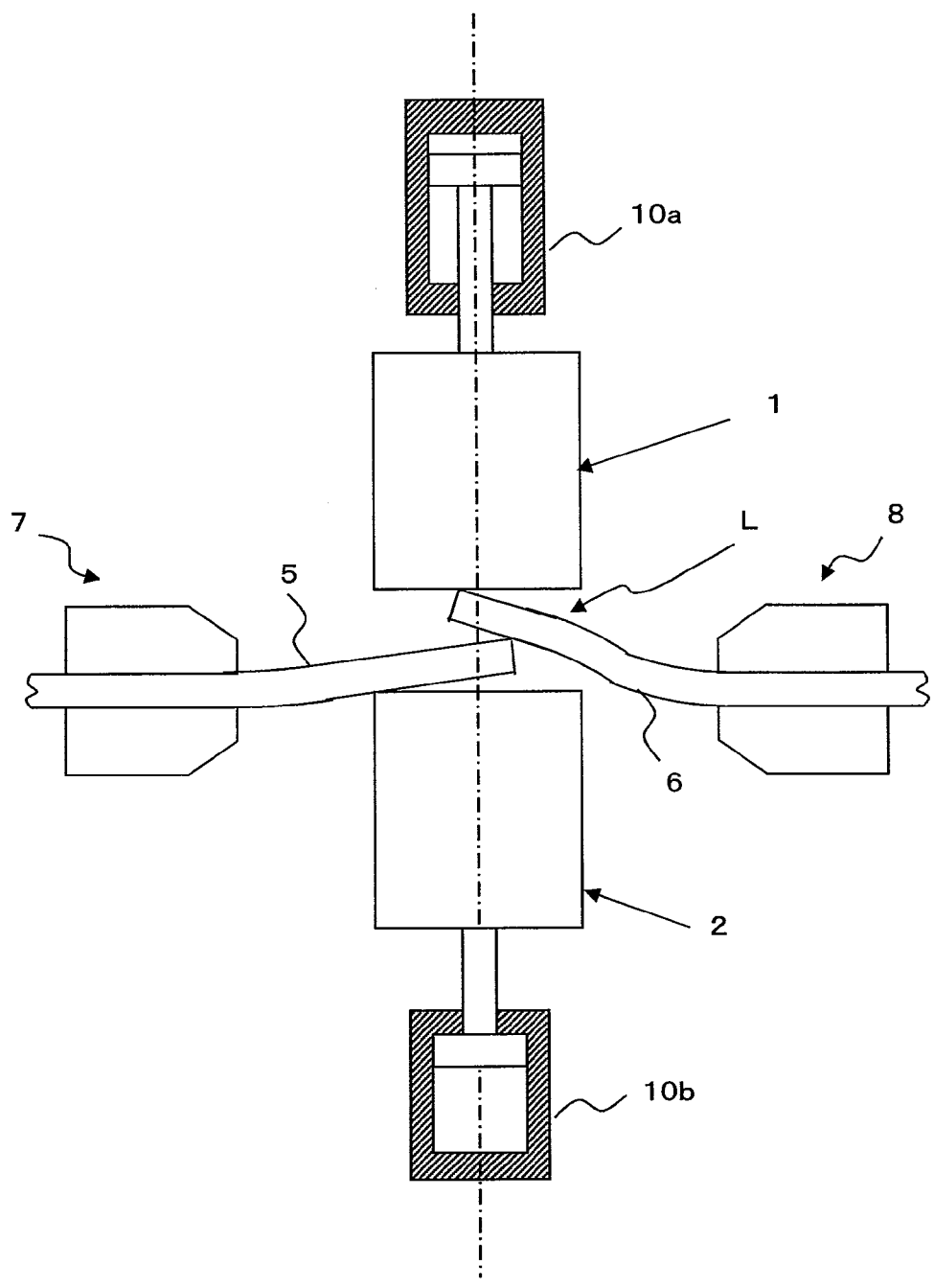
FIG. 15B is a view likewise showing a positional relationship when the upper and lower electrode wheels 1 and 2 contact the metal plates.
Figure 16A:
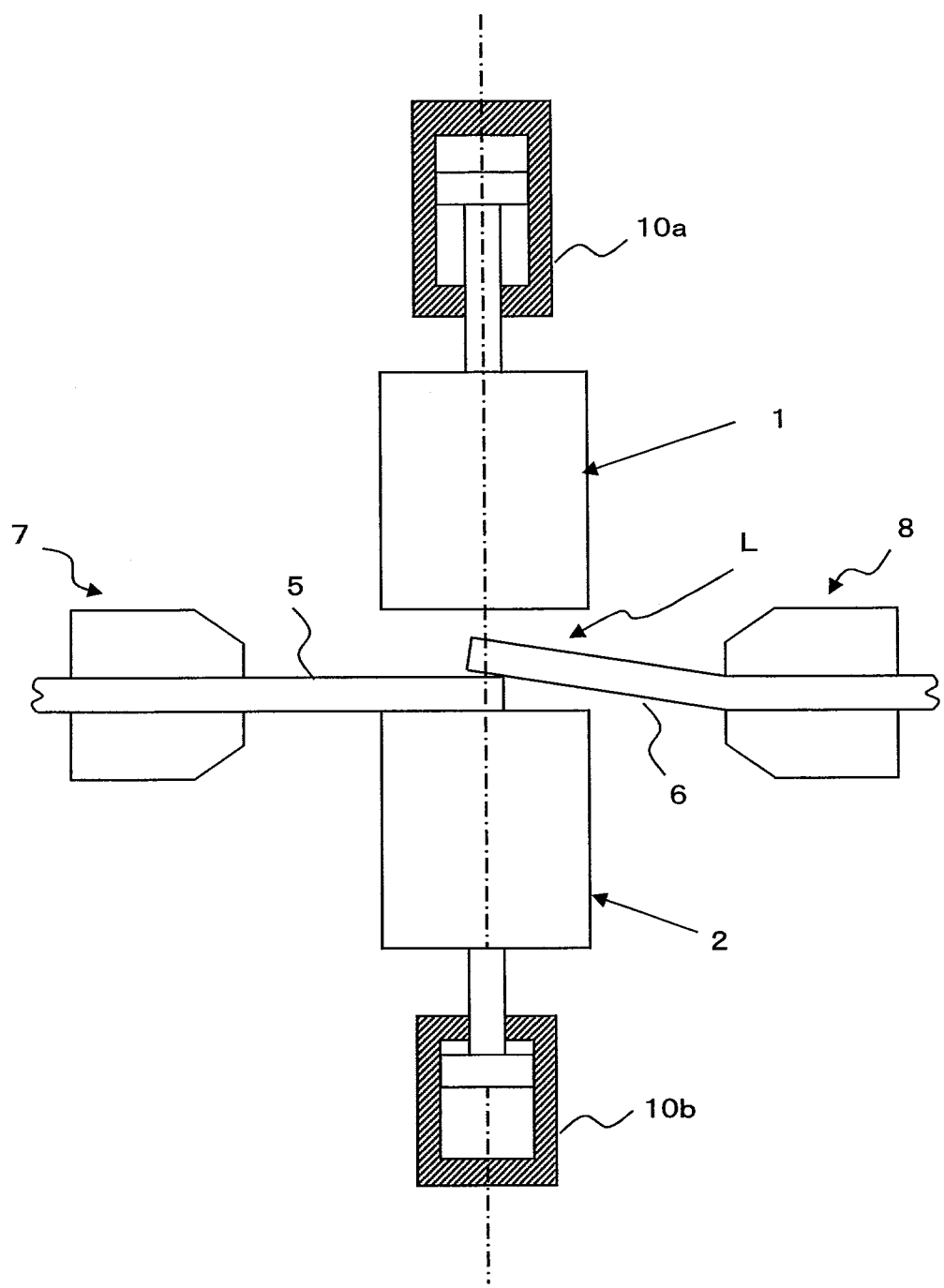
FIG. 16A is a view similar to FIG. 15A and showing the case in which the welding method according to the first embodiment is used to join the thin metal plates.
Figure 16B:
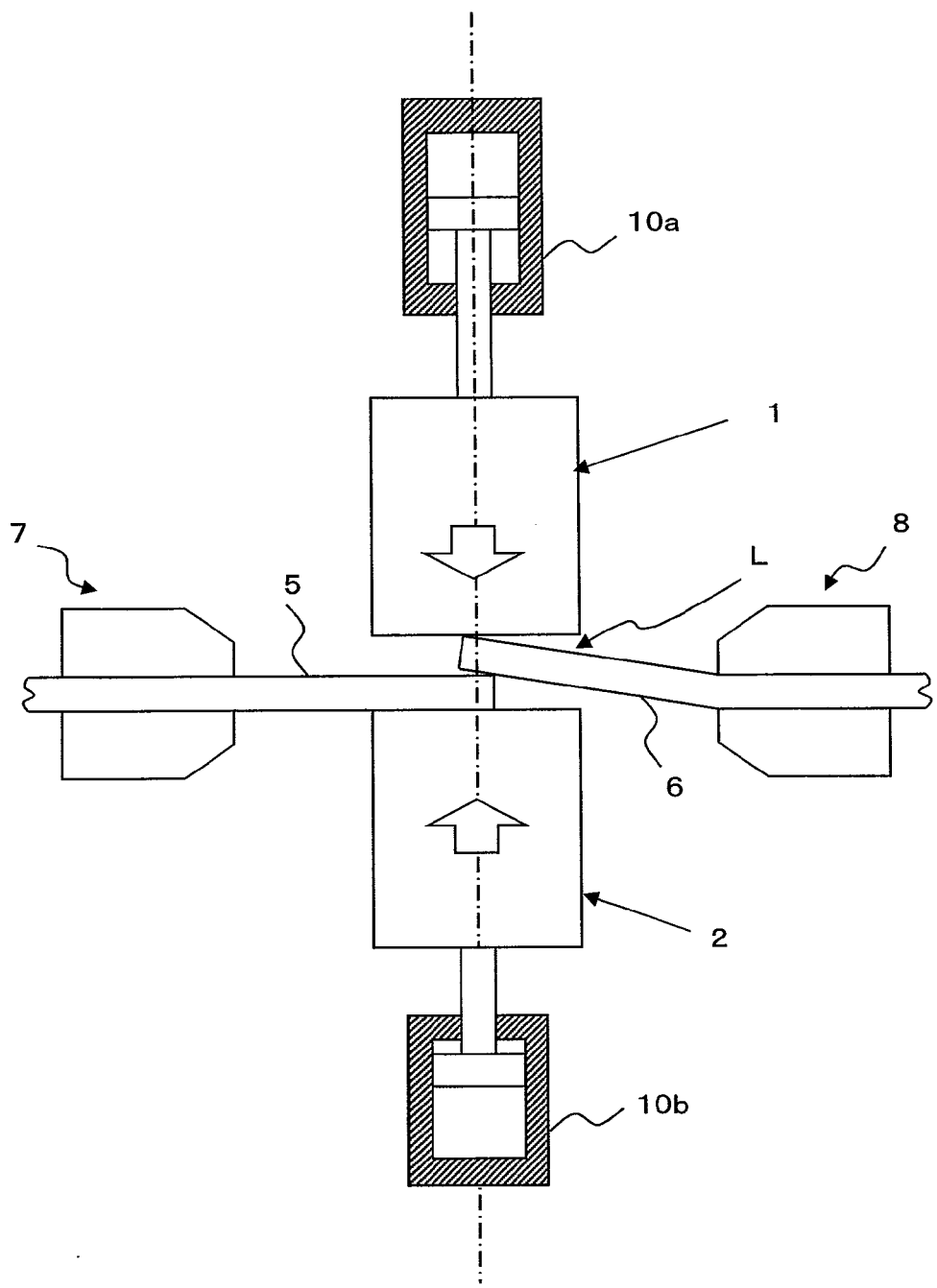
FIG. 16B is a view similar to FIG. 15B likewise.
Figure 16C:
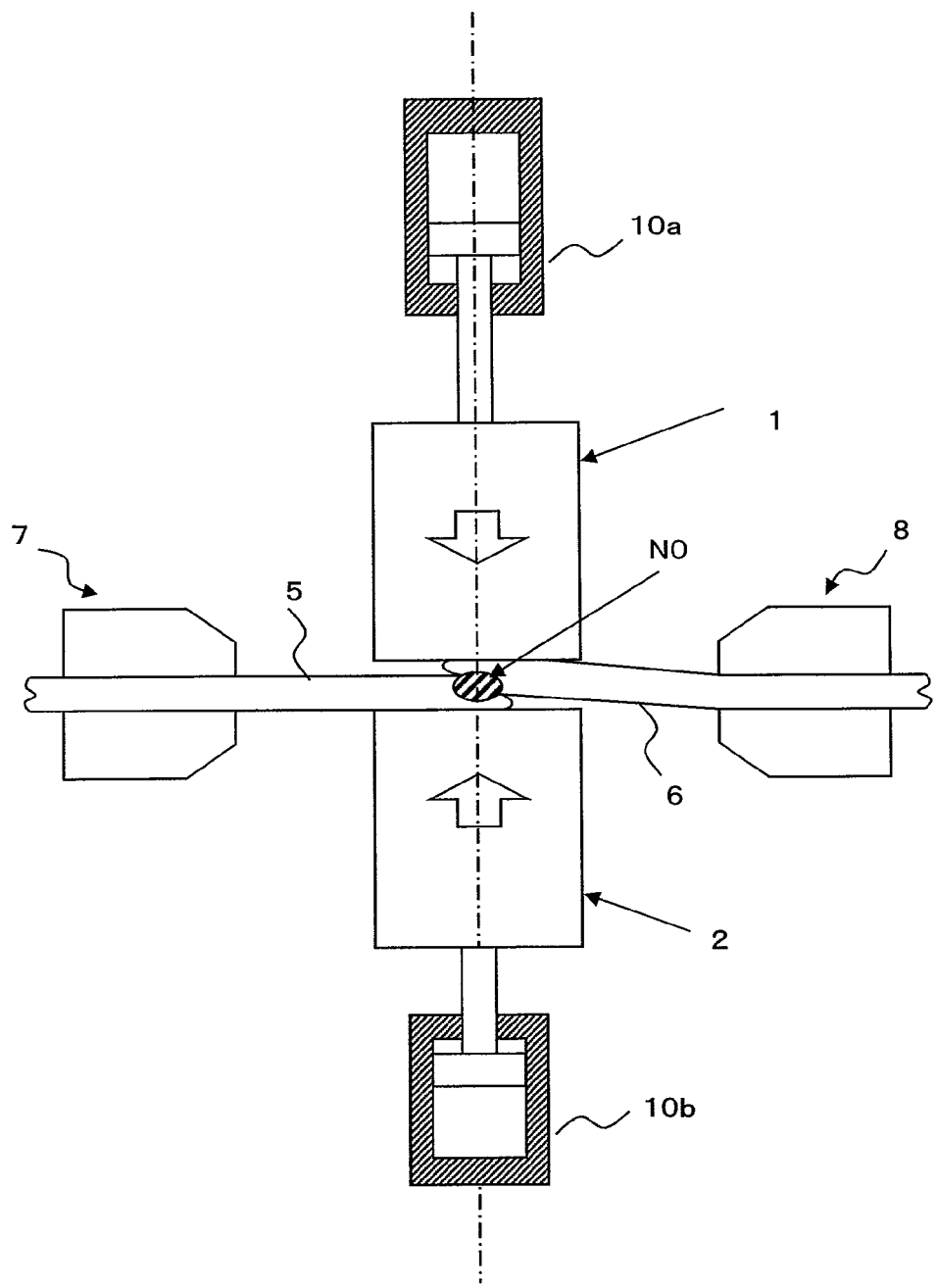
FIG. 16C is a view similar to FIG. 5C likewise.
Figure 16D:
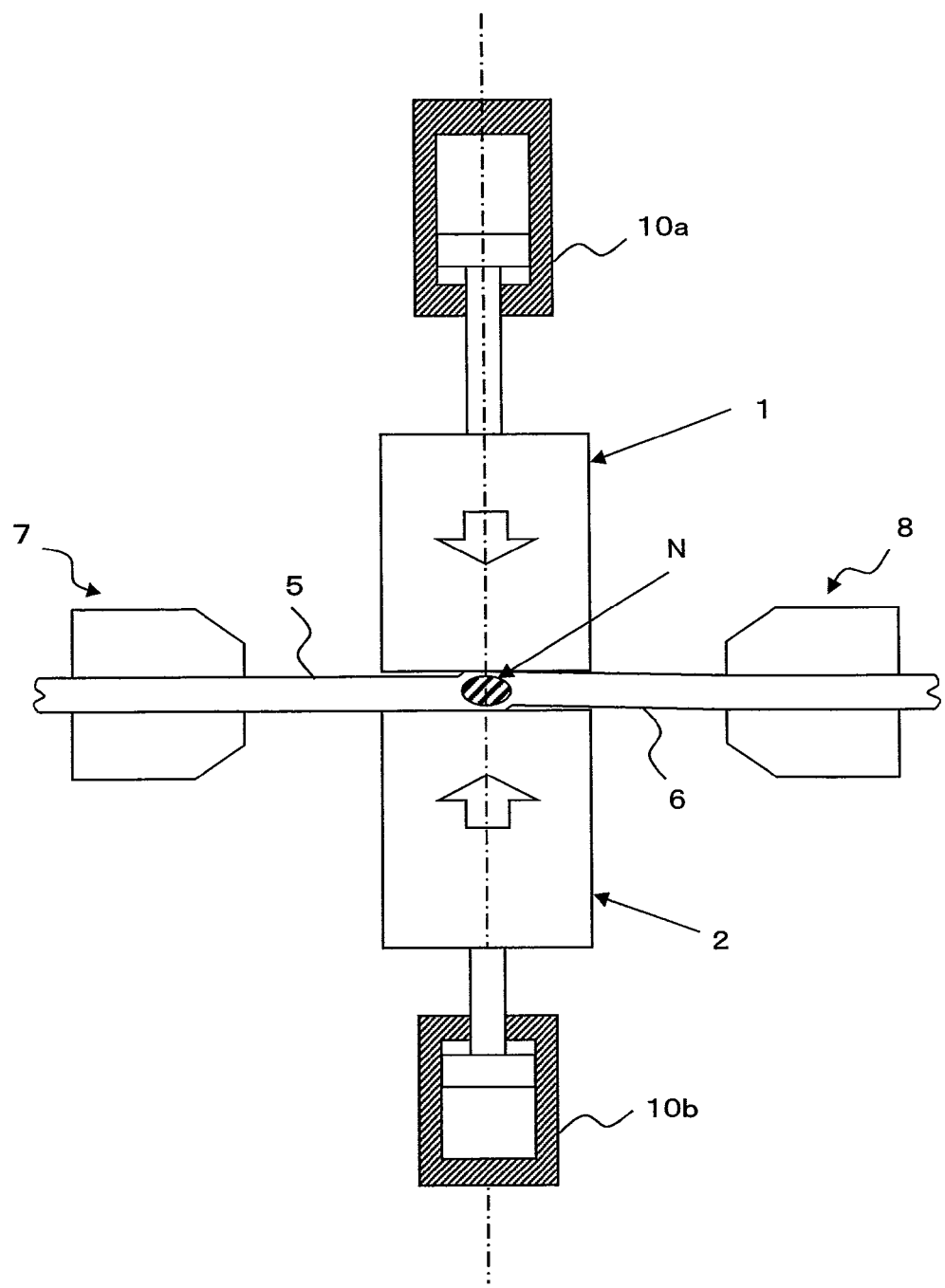
FIG. 16D is a view similar to FIG. 5D likewise.
Figure 16E:
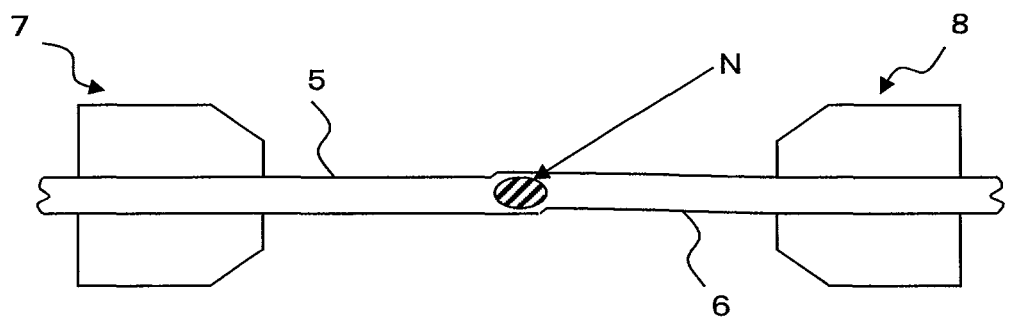
FIG. 16E is a view similar to FIG. 5E likewise.

Next, the case in which the metal plates that have thicknesses of 2 mm or less and low rigidity are welded in the mash seam welding method according to the present invention is described with reference to FIGS. 15A and 15B. FIGS. 15A and 15B show positional relationships between the electrode wheels and the metal plates of the overlapping portions when the above-mentioned third embodiment is applied to the metal plates that have thicknesses of 2 mm or less and low rigidity. FIG. 15A shows the positional relationship when the upper and lower electrode wheels 1 and 2 are located at the waiting positions, while FIG. 15B shows the positional relationship when the upper and lower electrode wheels 1 and 2 contact the metal plates.

As described above, the lower electrode wheel is periodically ground to suppress joint failure due to scratches and uneven wear on the electrode wheel surface during welding until the use limit of the electrode wheel is reached. The grinding of the lower electrode wheel 2 reduces the diameter thereof, and the position of the upper surface of the lower electrode wheel 2 is lowered accordingly. In order t maintain the position in which the lower electrode wheel 2 can apply welding force to the metal plate during the welding even when the diameter of the lower electrode wheel is reduced and the position of the upper surface of the lower electrode wheel 2 is lowered, it is necessary to arrange the upper surface of the lower electrode wheel 2 before grinding to protrude from the pass line toward the side of the metal plates. FIG. 15A shows the position of the upper surface of the lower electrode wheel 2 when the lower electrode wheel 2 is not ground or is slightly ground. By performing the pressing force control of the lower electrode wheel 2 and urging the support portion of the electrode wheel 2 against the machine fixed end, the upper surface of the electrode wheel 2 is arranged to protrude from the plane extending from the metal plate clamped surfaces on the side of the metal plates.

In case the metal plates have low rigidity (or are thin), when the upper and lower electrode wheels 1 and 2 are moved in the above-mentioned situation in the joining direction by moving the carriage frame 9 in the joining direction with the carriage frame control device 72, forced displacement such as lifting up of the metal plates by the lower electrode wheel 2 is imparted at the joining starting end surfaces of the metal plates. Thus, the amount of warp of the metal plates is increased and an overlap length of the materials cannot be obtained sufficiently, and this may be a cause to produce a joint failure.

Accordingly, when the metal plates to be joined have thicknesses of 2 mm or less and low rigidity (thin), a joining method other than the method according to the third embodiment is preferably used. In particular, it is preferable to use the joining method according to the first embodiment.

The method according to the second embodiment can be also used if a change of the position of the upper surface of the lower electrode wheel 2 caused by the change in the diameter of the lower electrode wheel 2 along with the grinding of the lower electrode wheel 2 is regularly corrected by the worm jack 120 (see FIGS. 1 and 2) arranged beneath the cylinder device 10b so that the upper surface of the lower electrode wheel 2 may be retained at a desired position, for example, a pass line position while the support portion of the lower electrode wheel 2 is urged against the stroke end of the cylinder device 10b.

FIGS. 16A to 16E shows the case in which the joining method according to the first embodiment is used to join the thin metal plates similarly to FIGS. 15A, 15B and 5C to 5E. As understood from those drawings, even when the metal plates are thin, the present invention can be applied to join the metal plates appropriately.

When the metal plates are thin, the lower electrode wheel may be placed in the position control to maintain the pass line position even after the starting of the mash seam welding and allowed to pass through the mash seam welding finishing position as it is, and the mash seam welding can be performed in such a case.

Next, the relationship between the thicknesses of the two metal plates and distances CL between the joint portion and the first and second clamping devices is described.

In case the materials having high rigidity and large thickness are overlapped, when the position of the lower electrode wheel in the pressing force direction is set on the pass line, forced displacement corresponding to the material thickness is imparted to the upper metal plate. When the positions of the upper and lower electrode wheels in the pressing force direction are arranged in vertical symmetry about the center of the joint portion, the forced displacement can be reduced by a half of the thickness of the material. There is, however, a problem that the metal plates may be plastically deformed from the edge portions of the clamp plates depending on distances between the overlapping portions and the clamping devices. Even when the plastic deformation does not occur, there is a problem that the electrode wheels may be scratched by edges of the electrode wheels due to large tilting angles of the overlapping portions upon welding by he electrode wheels, or there is a problem that even when the upper and lower surfaces of the joint portion are pressed to be parallel by the welding force of the electrode wheels, the upper and lower surfaces of the joint portion cannot be deformed to be parallel due to the rigidity of the materials.

The present inventors have paid attention to the distances between the overlapping portions and the first and second clamping devices, promoted studies and confirmed, based on numerical analysis and tests, the distances between the overlapping portions and the first and second clamping devices depending on the thicknesses of the two metal plates to solve the aforementioned problems. In the present description, "the distances between the overlapping portions and the first and second clamping devices" means a distance between the center of the overlapping portions L and the clamp plates 7a and 7b of the first clamping device 7 and a distance between the center of the overlapping portions L and the clamp plates 8a and 8b of the second clamping device 8.

Figure 17:
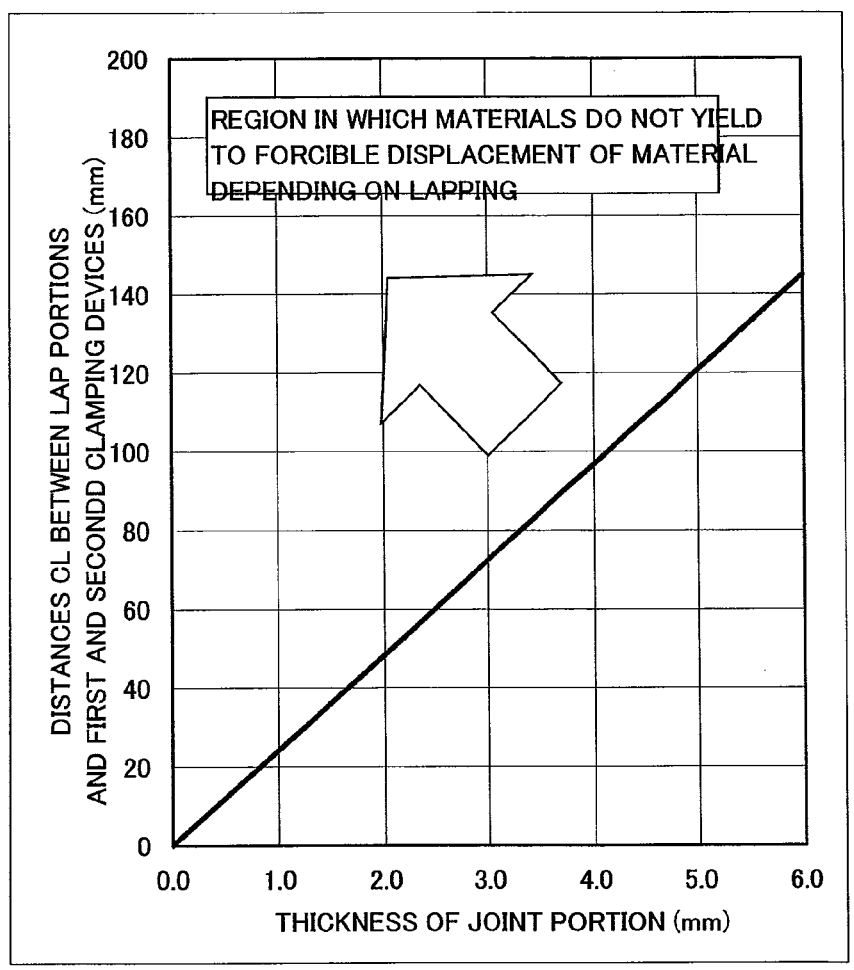
FIG. 17 is a view showing a correlation between the thicknesses of the metal plates to be joined and distances L between the overlapping portions and first and second clamping devices when it is assumed that materials of the metal plates are soft steel and do not yield.

A correlation between the thicknesses of the metal plates and the distances between the overlapping portions and the first and second clamping devices is solved by modeling the clamped state of the metal plates with a cantilever. FIG. 17 shows the results and shows the correlation between the thicknesses of the metal plates and the distances CL between the overlapping portions and the first and second clamping devices when the materials of the metal plates are soft steel and do not yield.

As shown in FIG. 17, when the mash seam welding is performed for the plates with large thickness, the distances between the overlapping portions and the clamping devices are set to be long. By doing so, when the metal plates having high rigidity and large thickness are overlapped, even if forced displacement of a half of the thickness of the material is imparted, the plastic deformation does not occur from the portion clamped by the clamping devices. As a result, it is possible to stabilize the strength of the joint portion and reduce gradients of the steps of the joint portion, thereby ensuring high joint strength. As a result of joining tests, it has been confirmed that the strength of the joint portion is stabilized when the thicknesses of the metal plates are equal to or larger than 2 mm and smaller than 3 mm and the distances are 60 mm or more, when the thicknesses of the metal plates are equal to or larger than 3 mm and smaller than 4 mm and the distances are 90 mm or more, and when the thicknesses of the metal plates are equal to or larger than 4 mm and equal to or smaller than 6 mm and the distances are 120 mm or more.

On the basis of the above-mentioned results of studies, in the present embodiment, the distances CL between the overlapping portions L and the first and second clamping devices 7 and 8 are made equal to each other and adjusted depending on the thicknesses of the metal plates 5 and 6. With such features, the overlapping portions L can be formed in a symmetrical shape, and further, when the metal plates having high rigidity and large thicknesses of 2 mm or more are overlapped, the metal plates are not plastically deformed due to forced displacement caused by the overlapping of the materials. In addition, the upper and lower surfaces of the joint portion can be made parallel with low welding force by the electrode wheels 1 and 2.

Accordingly, it is possible to stabilize the strength of the joint portion and reduce gradients of the steps of the joint portion, thereby ensuring high joint strength.

Next, relationships between the thicknesses of the two metal plates and driving torque of the electrode wheels are described.

When the metal plates have large thickness, rolling reductions by the upper and lower electrode wheels increase and thus, the driving torque necessary for the electrode wheels is increased depending on the thicknesses of the metal plates. Normally, constant torque is supplementarily supplied to the electrode wheels with air motors or the like. When the range of the thicknesses of metal plates to be joined are is wide, however, excess or short of the driving torque of the electrode wheels necessary to perform welding occur.

In the present embodiment, the pair of upper and lower electrode wheels 1 and 2 are positively driven by the electric motors 63 and 64, and driving torques of the electric motors 63 and 64 are controlled depending on the thicknesses of the metal plates 5 and 6. With such features, desired rolling power can be applied to the upper and lower surfaces of the joint portion, and thus, it is possible to solve problems of occurrence of joint failure and reduction of joint strength due to shortage of the driving power, thereby enhancing the reliability of the joint portion. Further, problems such as wear of the electrode wheels can be solved.

Next, a cross rolling technique for causing the upper and lower pressure rollers to be tilted (or cross to each other) to press the joint portion is described.

The larger the thicknesses of the metal plates to be joined, the larger the steps formed between the joint portion and the base materials. The larger the sizes of the steps, the more stress is concentrated in the steps. This reduces the strength of the welded portions.

As mentioned before, according to the present invention, since the upper and lower welding forces that act on the overlapping portions are controlled to be equal to each other, it is possible to reduce the sizes of the steps of the joint portion and ensure high joint strength and reliability of the joint portion. It is, however, inevitable that as the thicknesses of the metal plates to be joined increase, the thickness of the joint portion increases to some extent. In the present embodiment, the steps of the joint portion are smoothened and further reduced by tiling (crossing) the upper and lower pressure rollers 3 and 4 to press the joint portion.

First, setting of tilting angles is described below.

Figure 18:
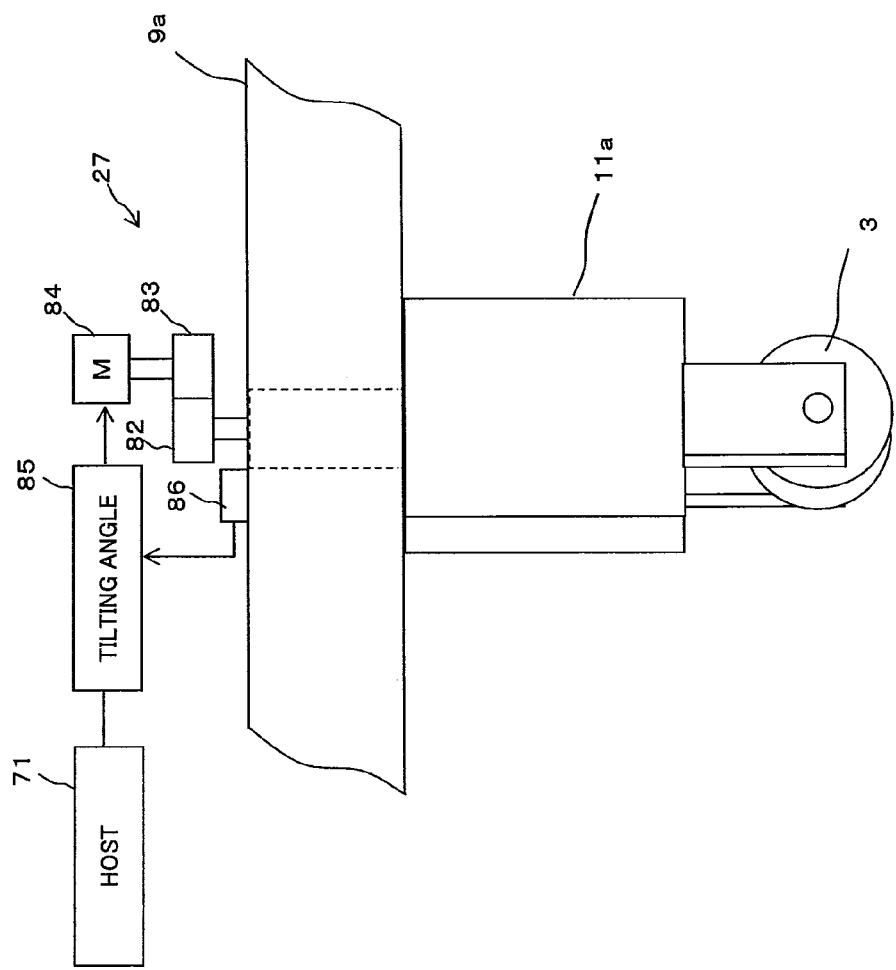
FIG. 18 is a view showing a pressure roller tilting device that is capable of changing a tilting angle of an axis of a pressure roller to an arbitrary angle.

The tilting angles of axes of the pressure rollers 3 and 4 may be fixed. It is, however, preferable that the tilting angles can be changed to given angles. FIG. 18 is a view showing a tilting device for the pressure roller in such a case. Incidentally, to avoid complexity of illustration, an electric motor and a chain and sprocket device for drivingly rotating the pressure roller are omitted in the drawing.

Referring to FIG. 18, the pressure roller pressing device 11a is provided with a tilting device 27. The tilting angle of the axis of the pressure roller 3 can be set to a given angle in a horizontal plane by actuating the tilting device 27. The tilting device 27 may employ various types. In the embodiment shown in FIG. 18, the tilting device 27 is of an electric drive type. More specifically, the tilting device 27 is installed on an upper end of the pressure roller pressing device 11a and includes a rotary shaft 81 provided at an upper end of the pressure roller pressing device 11a and rotatably inserted into the upper horizontal frame 9a of the carriage frame 9, and an electric motor 84 for drivingly rotating the rotary shaft 81 through pinions 82 and 83. The electric motor 84 is controlled by a tilting angle control device 85. Although not shown, the tilting device 27 is provided with a lock device for maintaining the tilting angle after the setting.

In addition, the tilting device 27 is provided with an angle sensor 86 that detects the tilting angle of the pressure roller 3. Before start of joining, the tilting angle control device 85 receives angle information corresponding to the step amount to be smoothened from the host control device 71 and sets the tilting angle. Then, the tilting angle control device 85 controls drive of the electric motor 84 by using the signal of the angle sensor 86 so that the tilting angle of the pressure roller 3 matches the set angle. In this case, with respect to the relationship between the size of the step and the tilting angle of the pressure roller 3, control models are generated in advance on the basis of the thicknesses of the materials to be joined, and a database is created in the host control device 71 on the basis of those control models, and then information of an angle to be set is given from the host control device 71 as necessary. Thus, the tilting angle control device 85 can easily set the optimal tilting angle on the basis of the step amount and enlarge different thickness range of materials to be joined. The angle sensor 86 may be a sensor that detects a rotational angle of the rotary shaft 81 as shown in the figure and may be an encoder that detects a rotational angle of the electric motor 84.

Although not shown, the pressing device 11b of the lower pressure roller 4 has the same configuration as the pressing device 11a.

Alternatively, the step amount may be measured by the aforementioned laser distance meter 75, for example, after the welding performed by the electrode wheels 1 and 2, and angle to be set may be given from the measured value of the step amount on the basis of the setting information in the database to control the tilting angles in real time.

Details of an effect of promoting plastic flow (metal flow) in a direction perpendicular to a welding line by tilting the axes 15 and 16 of the upper and lower pressure rollers 3 and 4 are described with reference to FIG. 19.

Figure 19:
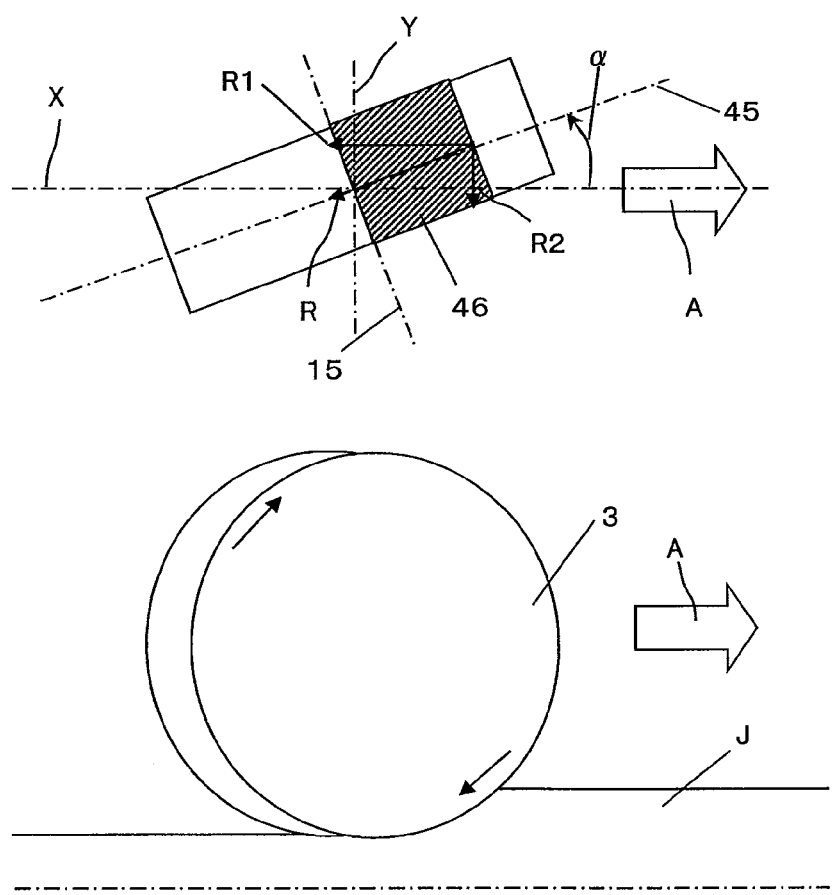
FIG. 19 is a view showing metal flow in a contact arc length when the axes of the pressure rollers are tilted and the joint portion is rolled with the pressure rollers, and illustrating the case of the upper pressure roller 3 as an example.

FIG. 19 is a view showing the metal flow in a contact arc length when the axes 15 and 16 of the pressure rollers 3 and 4 are tilted and the joint portion J is rolled with the pressure rollers 3 and 4, and showing the case of the upper pressure roller 3 as an example.

In FIG. 19, a symbol A indicates an arrow denoting a travelling direction of the pressure roller 3 (rolling direction). A symbol X indicates a straight line imaginarily denoting the welding line (joining line) of the joint portion J extending in the travelling direction A. A symbol Y indicates a straight line perpendicular to the welding line X. In addition, reference numeral 45 indicates a straight line passing the widthwise central portion of the pressure roller 3 in the direction perpendicular to the axis of the pressure roller 3. A symbol a indicates a tilting angle of the pressure roller (angle between the welding line X and the straight line 45 extending in the direction perpendicular to the axis of the upper pressure roller 3). Further, reference numeral 46 indicates a contact arc length portion where the pressure roller 3 contacts the joint portion J. A symbol R indicates a velocity vector of the contact arc length portion 46, and a symbol R1 indicates a component of the velocity vector R in the direction of the welding line X and a symbol R2 indicates a component of the velocity vector R in the direction perpendicular to the welding line X.

As shown in FIG. 19, when the axis 15 of the pressure roller 3 is tilted with respect to the straight line Y perpendicular to the welding line X in the horizontal plane and the pressure roller 3 is positively driven and rotated while pressing the joint portion J, a frictional force that corresponds to the component R2 of the velocity vector in the direction perpendicular to the welding line X acts on the contact arc length portion 46 contacting with the joint portion J due to the pressing force and frictional coefficient between the pressure roller 3 and the joint portion J. Shearing force 14 (see FIGS. 20A to 26B) that corresponds to the frictional force acts on the joint portion J in the direction perpendicular to the welding line X. Not only metal flow in the direction (the direction parallel to the welding line X) of the component R1 of the velocity vector but also metal flow in the direction (the direction perpendicular to the welding line X) of the component R2 of the velocity vector or plastic flow in the direction perpendicular to the welding line X due to shearing deformation by the shearing force 14 occurs at the joint portion J. Thus, the shearing deformation or plastic flow in the direction perpendicular to the welding line X can smooth the step S of the joint portion J.

The direction in which the pair of upper and lower electrode wheels 3 and 4 are tilted at the angle α can be set in two ways.

Figure 20A:
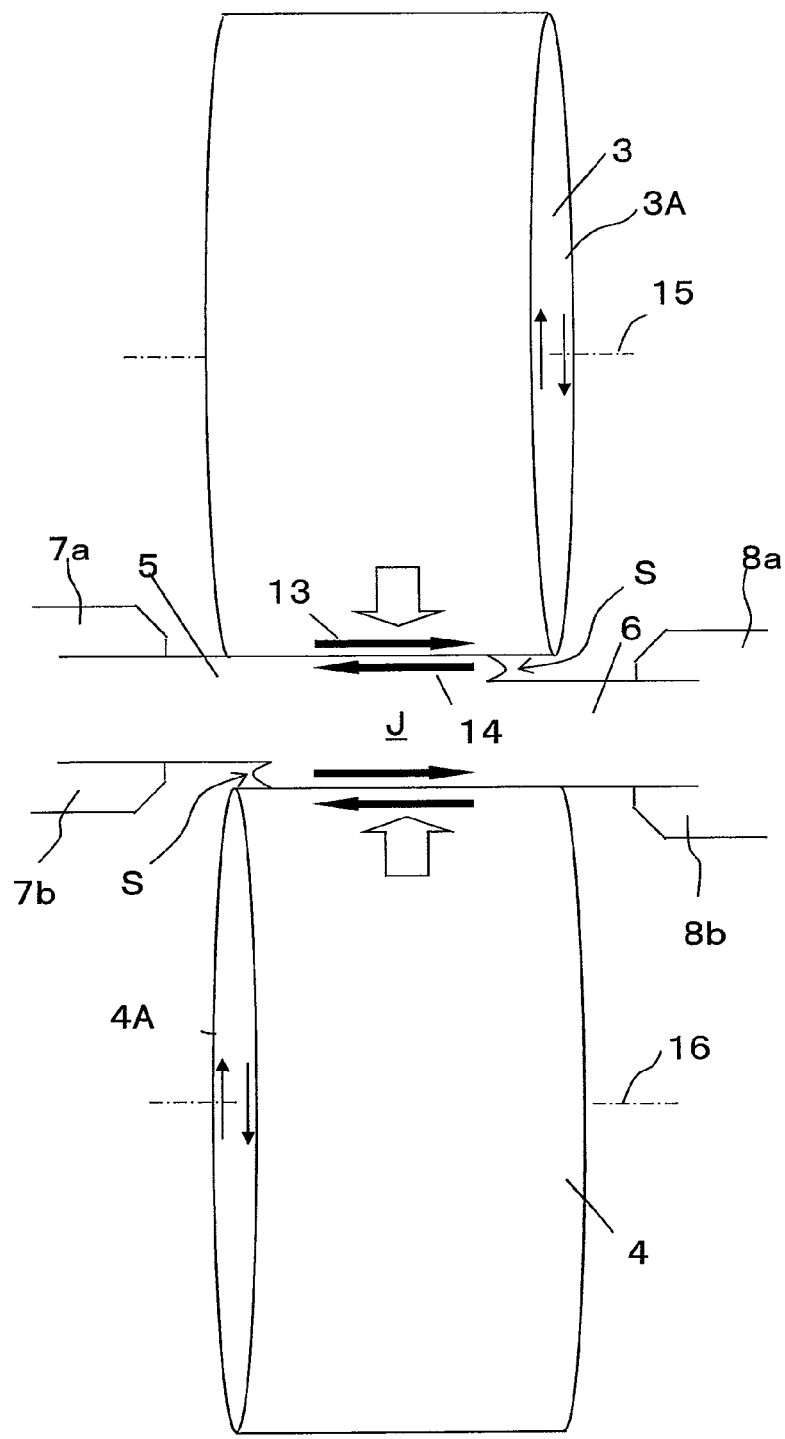
FIG. 20A is a view showing an initial state of rolling with a pair of pressure rollers when the rolling is performed while respective axes the pair of pressure rollers are each tilted with respect to the straight line perpendicular to the welding line so that the respective travel direction portions of the pair of pressure rollers face in the horizontal plane toward the directions opposite to the directions in which the metal plates concerning the metal material with which the pressure rollers first come into contact exist.
Figure 20B:
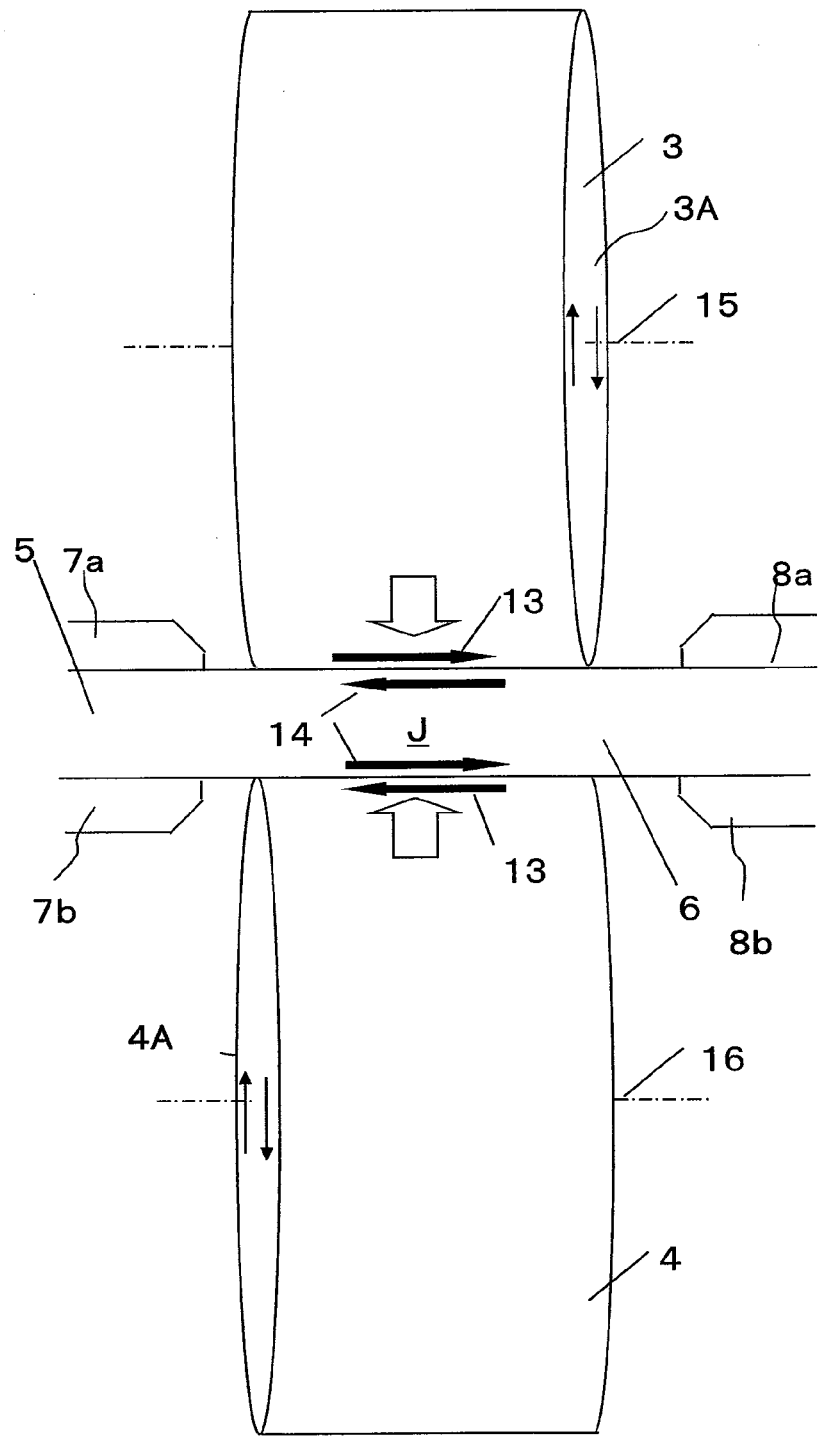
FIG. 20B is a view showing the state of completion of the rolling that is performed with the pressure rollers in the manner illustrated in FIG. 20A.

A first setting method is as follows. As shown in FIGS. 20A and 20B, the respective axes 15 and 16 of the pair of pressure rollers 3 and 4 are each tilted with respect to the straight line Y perpendicular to the welding line X so that the respective travel direction portions 3A and 4A of the pair of pressure rollers 3 and 4 face in the horizontal plane toward the directions opposite to the directions in which the metal plates 5 and 6 concerning the metal material with which the pressure rollers 3 and 4 first come into contact exist. In other words, the respective axes 15 and 16 of the pressure rollers 3 and 4 are tilted so that the respective axial ends of the pressure rollers 3 and 4 located, in the joint portion J of the metal plates 5 and 6, on the side where thickness is larger with the steps S of the joint portion J taken as starting points (the material portion of the joint portion J with which the pressure rollers 3 and 4 first come into contact) face the rolling direction A of the joint portion J. In this case, the shearing forces 14 that correspond to the component R2 of the velocity vector are applied from the steps S of the joint portion J of the metal plates 5 and 6 in the directions in which the metal plates 5 and 6 concerning the metal material with which the pressure rollers 3 and 4 first come into contact exist, and the steps are rolled and smoothened while being subjected to the shearing deformation in the same directions, i.e., in the direction perpendicular to the welding line. Incidentally, at this time, forces in the directions opposite to the shearing forces 14 are applied as the thrust forces 13 from the joint portion J to the pressure rollers 3 and 4. In other words, the reaction forces of the thrust forces 13 are applied as the shearing forces 14 to the joint portion J.

Figure 21A:
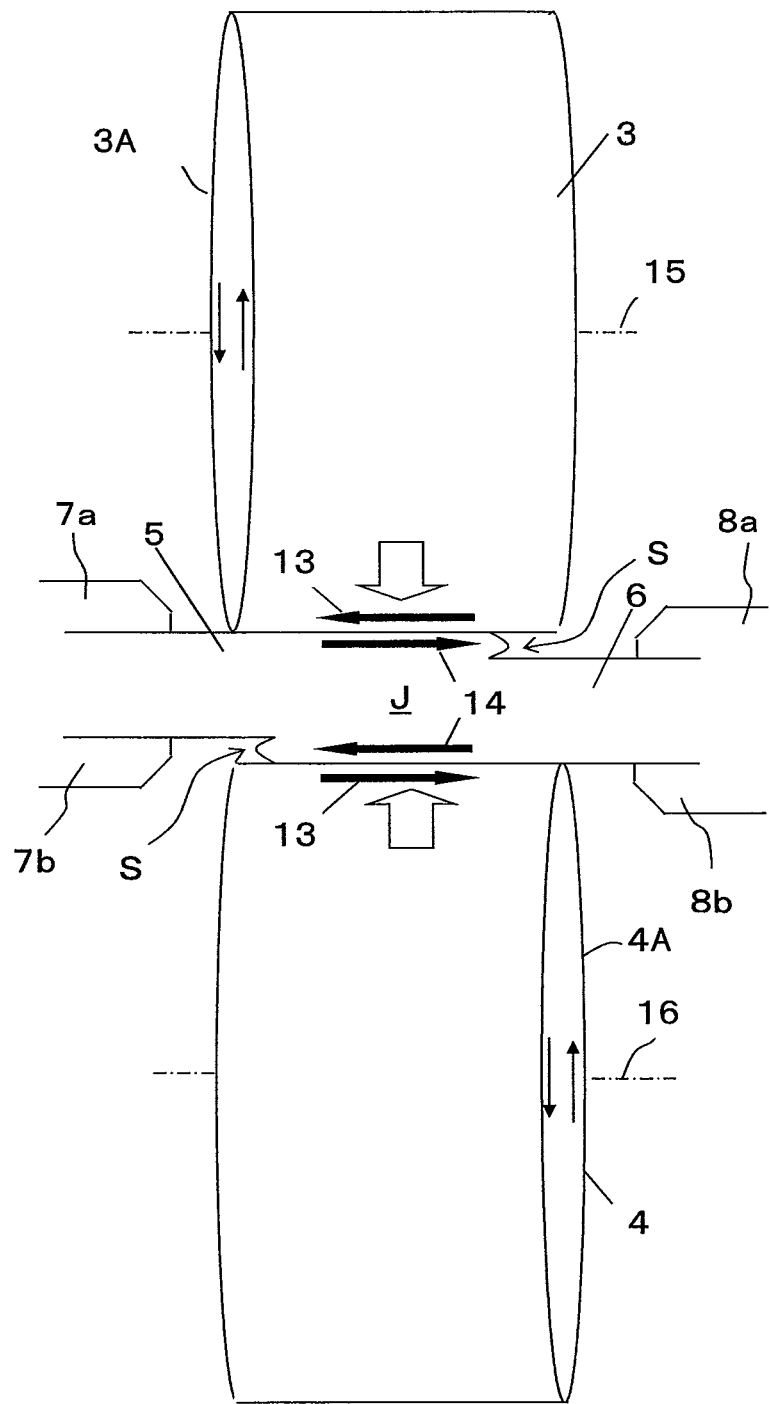
FIG. 21A is a view showing an initial state of rolling with the pair of pressure rollers when the rolling is performed while the pressure rollers are tilted reversely compared with the case illustrated in FIG. 20A, that is the respective axes of the pair of pressure rollers are each tilted with respect to the straight line perpendicular to the welding line so that the respective travel direction portions of the pair of pressure rollers face in the horizontal plane toward the directions in which the metal plates concerning the metal material with which the pressure rollers first come into contact exist.
Figure 21B:
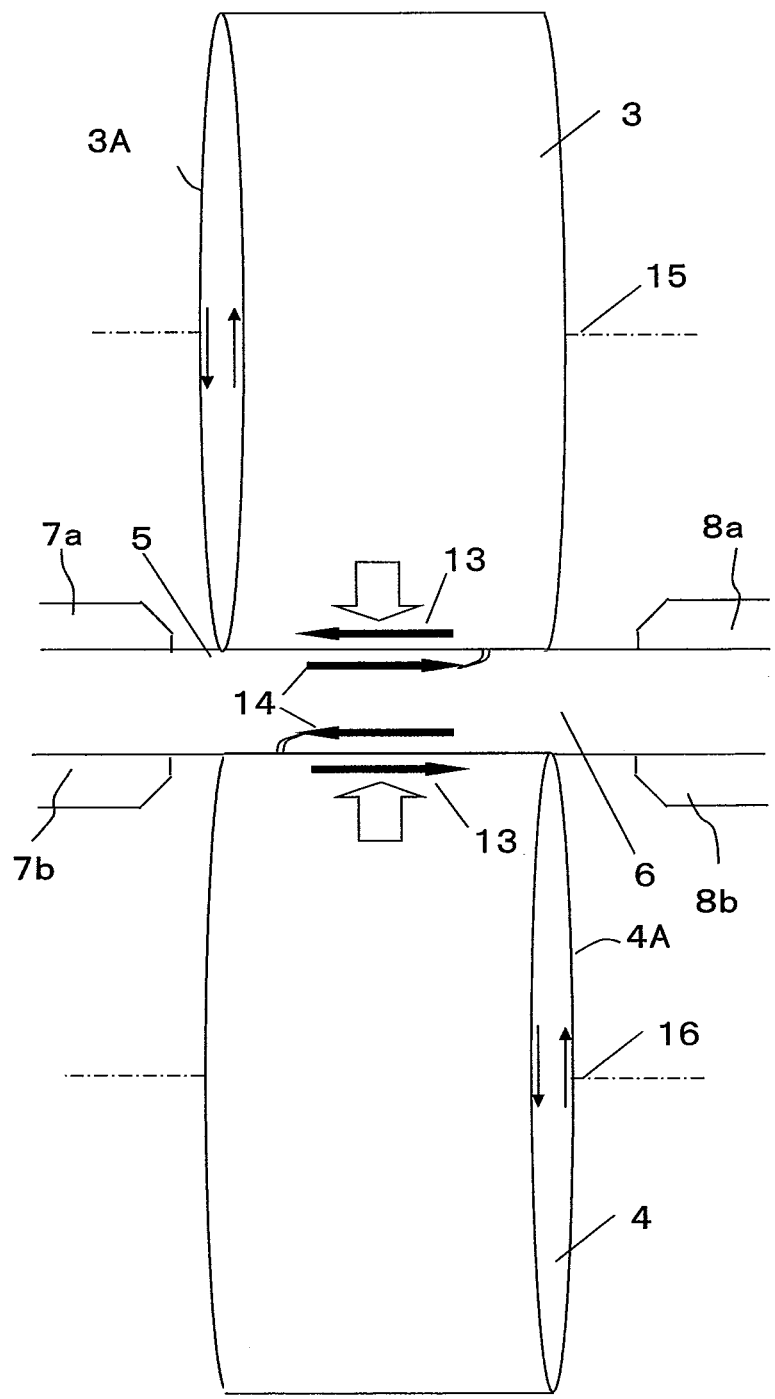
FIG. 21B is a view showing the state of completion of the rolling that is performed with the pressure rollers in the manner illustrated in FIG. 21A.

The second setting method is such that as shown in FIGS. 21A and 21B, the pressure rollers 3 and 4 are tilted reversely to those of the first setting method. Specifically, the respective axes 15 and 16 of the pair of pressure rollers 3 and 4 are each tilted with respect to the straight line Y perpendicular to the welding line X so that the respective travel direction portions 3A and 4A of the pair of pressure rollers 3 and 4 face in the horizontal plane toward the directions in which the metal plates 5 and 6 concerning the metal material with which the pressure rollers 3 and 4 first come into contact exist. In other words, the respective axes 15 and 16 of the pressure rollers 3 and 4 are tilted so that the respective axial ends of the pressure rollers 3 and 4 located, in the joint portion J of the metal plates 5 and 6, on the side where thickness is smaller with the steps S of the joint portion J taken as starting points (the material portion of the joint portion J with which the pressure rollers 3 and 4 does not first come into contact) face the rolling direction A of the joint portion J. In this case, the shearing forces 14 that correspond to the component R2 of the velocity vector are applied from the steps S of the joint portion J of the metal plates 5 and 6 in the directions opposite to the directions in which the metal plates 5 and 6 concerning the metal material with which the pressure rollers 3 and 4 first come into contact exist, and the steps are rolled and smoothened while being subjected to the shearing deformation in the same directions, i.e., in the direction perpendicular to the welding line. Also, at this time, forces in the directions opposite to the shearing forces 14 are applied as the thrust forces 13 from the joint portion J to the pressure rollers 3 and 4.

The present embodiment employs the first setting method. The reason is as below.

Even if the pair of upper and lower pressure rollers 3 and 4 is tilted by the second setting method, the steps S are subjected to plastic flow due to the shearing forces 14 so that they can be smoothed. In this case, however, a new problem occurs. Specifically, as shown in FIG. 21B, the steps S are interfolded into the base material and buried into the base material in a cracked manner. There is no problem if the smooth surface texture of the joint portion J is simply required and the second setting method is applied to a portion that does not need strength. However, if the second setting method is applied to a portion subject to stress or use application is plastic working such as press forming including tailored blanks, the ends of the buried steps becomes singular stress fields and may cause breakage. Therefore, as shown in FIGS. 20A and 20B, the respective tilting directions of the pressure rollers 3 and 4 are preferably those in which the respective axes 15 and 16 of the pair of pressure rollers 3 and 4 are each tilted with respect to the straight line Y perpendicular to the welding line X so that the respective travel direction portions 3A and 4A of the pair of pressure rollers 3 and 4 face in the horizontal plane toward the directions opposite to the directions in which the metal plates 5 and 6 concerning the metal material with which the pressure rollers 3 and 4 first come into contact exist.

directions where the respective axes 15, 16 of the pair of pressure rollers 3, 4 are each tilted with respect to the straight line Y perpendicular to the welding line X so that the respective travel-directional portions 3A, 4A of the pressure rollers 3, 4 face in the horizontal plane toward the directions opposite to the extending directions of the metal plates 5, 6 concerning the metal material with which the pressure rollers 3, 4 first come into contact. In this case, as shown in FIG. 20B, the steps S of the joint portion can be smoothed without being buried into the base material in a cracked manner, whereby the quality of the joint portion can be enhanced.

The tilting angles α of the axes 15 and 16 of the pressure rollers 3 and 4 are set on the basis of the sizes (step amounts) of the steps S. Qualitatively speaking, when the step amounts are small, the tilting angles α are set to be small. The larger the step amounts, the larger the tilting angles α to be set. As shown in FIG. 19, the shearing deformation due to tilting of the axis 15 of the pressure roller 3 is dominated by the tilting angle α in the contact arc length portion 46 between the upper pressure roller 3 and the material. Therefore, the tilting angles α to be set are appropriately adjusted depending on the size of the step to be smoothened. When the metal plates 5 and 6 having different thicknesses are joined, the step sizes of the mash seam welding portion J are different depending on the front and rear surfaces. However, if the tilting angle α of the upper pressure roll 3 is set according to the step size as described above, the step can be smoothed. Although not described with reference to a figure, the same applies to the rolled state of the step by the lower pressure roller 4 having the tilting angle α. The tilting angle α of the lower pressure roller 4 is set depending on the lower step size.

Description of Reference Numerals
1: Upper electrode wheel
2: Lower electrode wheel
3: Upper pressure roller
4: Lower pressure roller
5: Metal plate
6: Metal plate
7: Entry side clamp device
8: Delivery side clamp device
9: Carriage frame
10a, 10b: Electrode wheel pressing device
11a, 11b: Pressure roller pressing device
13: Thrust force
14: Shearing force
15: Axis of upper pressure roller
16: Axis of lower pressure roller
27: Pressure roller tilting device
45: Straight line perpendicular to axis of pressure roller
46: Contact arc
54: Supporting roller
55: Base plate
57: Cylinder device for driving carriage frame
61, 62: Electric motor
63, 64: Electric motor
67, 68: Chain and sprocket device
71: Host control device
72: Carriage frame control device
73: Mash seam control device
74: Pressure roller control device
75: Laser distance meter
75: Clamp control device
81: Rotary shaft
82, 83: Pinion
84: Electric motor
85: Tilting angle control device
86: Angle sensor
101: Pin (fulcrum)
102a, 102b: Base
103a, 103b: Holder
104: Cylinder device
105a, 105b: Base
106a, 106b: Cylinder device
110: Clamping device tilting device
111a, 111b: Clamping device moving device
120, 121: Worm jack
CL: Distances between overlapping portions and first and second clamping devices
G: Gap
L: Overlapping portions
J: Joint portion
A: Travelling direction (rolling direction)
X: Welding line (joining line)
Y: Direction perpendicular to welding line
R: Velocity vector of contact arc of pressure roller
R1: Component of velocity vector R in direction of welding line X
R2: Component of velocity vector R in direction perpendicular to welding line X
α: Tilting angle

The invention claimed is:

1. A mash seam welding method comprising:
clamping two metal plates with first and second clamping devices, and placing the two metal plates to overlap each other at end portions thereof;
pressing overlapping portions of the two metal plates with a pair of electrode wheels, including an upper electrode wheel and a lower electrode wheel, while flowing welding current to continuously weld the overlapping portions and join the two metal plates,
wherein:
when the pair of electrode wheels contact joining end surfaces of the overlapping portions, feeding one of the pair of electrode wheels by position control while feeding the other one of the pair of electrode wheels by pressing force control to join the joining end surfaces of the overlapping portions, and
after the joining end surfaces are welded, switching the one of the pair of electrode wheels from the position control to the pressing force control to set both of the pair of electrode wheels to the pressing force control, and
in the pressing force control, controlling respective pressing forces applied to the pair of electrode wheels individually so that upper and lower welding forces acting upon the overlapping portions are equal to each other during a time when the overlapping portions are continuously welded while the welding current flows.

2. The mash seam welding method according to claim 1, wherein the two metal plates are at least 2 mm thick.

3. The mash seam welding method according to claim 1, wherein the one of the pair of electrode wheels is controlled to be fed by position control and brought into contact with the joining end surfaces of the overlapping portions and welding is started, and after the joining end surfaces are welded, control is switched to the pressing force control,
wherein the other one of the pair of electrode wheels is controlled to be fed by position control and brought into contact with the joining end surfaces of the overlapping portions, and when or immediately after the other one of the pair of electrode wheels contacts one of the joining end surfaces, control is switched to the pressing force control and welding is started, and wherein after the joining end surfaces are welded, the pair of electrode wheels are fed while being synchronized with each other, and during the feeding, the pressing force control is performed so that the upper and lower welding forces acting upon the overlapping portions are equal to each other.

4. The mash seam welding method according to claim 1, wherein the other one of the pair of electrode wheels is controlled to be fed and brought into contact with a first of the joining end surfaces of the overlapping portions while a position thereof is maintained by the pressing force control and by urging a support portion of the electrode wheel against a machine fixed end, and after the one of the pair of electrode wheels contacts a second of the joining end surfaces, welding is started while the position of the other one of the pair of electrode wheels is controlled by the pressing force control, and after the joining end surfaces are welded, control is switched to the pressing force control in which a constant welding force is applied to the overlapping portions, wherein the other one of the pair of electrode wheels is controlled to be fed by position control and brought into contact with the first of the joining end surfaces of the overlapping portions, and when or immediately after the one of the pair of electrode wheels contacts the second of the joining end surfaces, control is switched to the pressing force control and welding is started, and wherein after the joining end surfaces are welded, the pair of electrode wheels are fed while being synchronized with each other, and during the feeding, the pressing force control is performed so that the upper and lower welding forces acting upon the overlapping portions are equal to each other.

5. The mash seam welding method according to claim 1, wherein distances between the overlapping portions and the first and second clamping devices are equal to each other and adjusted depending on thicknesses of the metal plates.

6. The mash seam welding method according to claim 1, wherein the pair of electrode wheels are positively driven and torque control is performed to change drive torques of the pair of electrode wheels depending on thicknesses of the metal plates.

7. The mash seam welding method according to claim 1, further comprising:

rolling a joint portion of the metal plates with a pair of pressure rollers, including an upper pressure roller and a lower pressure roller, after the two metal plates are joined, wherein axes of the pair pressure rollers are tilted in a horizontal plane with respect to a straight line perpendicular to a joining line of the joint portion, and steps of the joint portion are rolled in a direction of movement of the pair of pressure rollers while the pressure rollers are positively driven.

8. A mash seam welding apparatus comprising:

first and second clamping devices that clamp two metal plates and place the two metal plates to overlap each other at end portions thereof;

a pair of electrode wheels, including an upper electrode wheel and a lower electrode wheel, to flow welding current to continuously weld the overlapping portions and join the two metal plates;

upper and lower pressing devices that respectively apply pressing forces to the pair of electrode wheels, and a control device that, after the pair of electrode wheels contact joining end surfaces of the overlapping portions, feeds one of the pair of electrode wheels by position control while feeding the other one of the pair of electrode wheels by pressing force control to join the joining end surfaces of the overlapping portions, and, after the joining end surfaces have been welded, switches one of the pair of upper and lower electrode wheels from the position control to the pressing force control to set both of the pair of electrode wheels to the pressing force control, and in the pressing force control, the respective pressing forces are applied individually to the pair of electrode wheels by the upper and lower pressing devices so that upper and lower welding forces acting upon the overlapping portions are equal to each other.

9. The mash seam welding apparatus according to claim 8, wherein the upper and lower pressing devices are hydraulic or pneumatic cylinder devices.

10. The mash seam welding apparatus according to claim 8, further comprising:

distance adjusting devices that adjust respective distances between the overlapping portions and the first and second clamping devices, wherein the distances between the overlapping portions and the first and second clamping devices are equal to each other and adjusted depending on thicknesses of the metal plates.

11. The mash seam welding apparatus according to claim 8, further comprising:

a pair of pressure roller pressing devices that roll a joint portion of the metal plates with a pair of pressure rollers, including an upper pressure roller and a lower pressure roller, after the two metal plates are joined, wherein axes of the pair of pressure rollers are tilted in a horizontal plane with respect to a straight line perpendicular to a joining line of the joint portion.

12. A mash seam welding method, comprising:

clamping two metal plates with first and second clamping devices;

placing the two metal plates to overlap each other at end portions thereof;

contacting a joining end of the overlap with a pair of electrode wheels, including an upper electrode wheel and a lower electrode wheel, which sandwich the joining end;

when the pair of electrode wheels contact the joining end of the overlap, feeding the pair of electrode wheels while one of the pair of electrode wheels maintains a position at a pass line with respect to the first and second clamping devices and while the other one of the pair of electrode wheels presses the joining end while applying a welding current; and after the joining end is welded, feeding the pair of electrode wheels while individually controlling respective pressing forces applied to the pair of electrode wheels so that upper and lower welding forces acting upon the overlap are equal to each other while applying the welding current to continuously weld the overlap.

13. The mash seam welding method according to claim 12, wherein distances between the overlapping portions and the first and second clamping devices are equal to each other.

14. The mash seam welding method according to claim 13, wherein the distances between the overlapping portions and the first and second clamping devices are adjusted depending on thicknesses of the metal plates.

15. The mash seam welding method according to claim 12, wherein the pair of electrode wheels are positively driven and torque control is performed to change drive torques of the pair of electrode wheels depending on thicknesses of the metal plates.

16. The mash seam welding method according to claim 12, further comprising:
- rolling a joint portion of the metal plates with a pair of pressure rollers, including an upper pressure roller and a lower pressure roller, after the two metal plates are joined,
- wherein axes of the pair pressure rollers are tilted in a horizontal plane with respect to a straight line perpendicular to a joining line of the joint portion, and steps of the joint portion are rolled in a direction of movement of the pair of pressure rollers while the pressure rollers are positively driven.

* * * * *